US010869058B2

(12) United States Patent
Yang

(10) Patent No.: US 10,869,058 B2
(45) Date of Patent: Dec. 15, 2020

(54) METHOD AND CIRCUIT OF ASSIGNING SELECTED DEPTH VALUES TO RGB SUBPIXELS AND RECOVERING SELECTED DEPTH VALUES FROM RGB SUBPIXELS FOR COLORED DEPTH FRAME PACKING AND DEPACKING

(71) Applicant: NATIONAL CHENG KUNG UNIVERSITY, Tainan (TW)

(72) Inventor: Jar-Ferr Yang, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 0 days.

(21) Appl. No.: 16/380,767

(22) Filed: Apr. 10, 2019

(65) Prior Publication Data

US 2019/0320202 A1 Oct. 17, 2019

(30) Foreign Application Priority Data

Apr. 12, 2018 (TW) .............................. 107112600 A

(51) Int. Cl.
*H04N 19/597* (2014.01)
*H04N 19/186* (2014.01)
*H04N 19/46* (2014.01)
*H04N 19/182* (2014.01)

(52) U.S. Cl.
CPC ......... *H04N 19/597* (2014.11); *H04N 19/182* (2014.11); *H04N 19/186* (2014.11); *H04N 19/46* (2014.11); *H04N 2213/005* (2013.01)

(58) Field of Classification Search
CPC .... H04N 19/597; H04N 19/182; H04N 19/46; H04N 19/186; H04N 2213/005

USPC ......... 375/240.02, 240.12; 382/154; 345/605
See application file for complete search history.

(56) References Cited

U.S. PATENT DOCUMENTS

2015/0093020 A1* 4/2015 Yang .................... G06F 16/583
382/154

OTHER PUBLICATIONS

Yang, "Centralized Texture-Depth Packing (CTDP) SEI Message", Feb. 12, 2015, JCT3V (Year: 2015).*
Yang, "Depth Enhancement Methods for Centralized Texture-Depth Packing Formats", Oct. 2016, ZTE Communications, Oct. 2016, Vo. 14 No. 4 (Year: 2016).*

(Continued)

*Primary Examiner* — Albert Kir
(74) *Attorney, Agent, or Firm* — Muncy, Geissler, Olds & Lowe, P.C.

(57) ABSTRACT

A method comprises: obtaining two depth values from each of a first pixel depth value and a fourth pixel depth value, and obtaining one depth value from each of a second pixel depth value and a third pixel depth value; and assigning the two depth values obtained from the first pixel depth value to the R-subpixel and B-subpixel values of the first pixel, assigning the depth value obtained from the second pixel depth value to the R-subpixel, G-subpixel and B-subpixel values of the second pixel, assigning the depth value obtained from the third pixel depth value to the R-subpixel, G-subpixel and B-subpixel values of the third pixel, and assigning the two depth values obtained from the fourth pixel depth value to the G-subpixel value of the first pixel and the R-subpixel, G-subpixel and B-subpixel values of the fourth pixel.

3 Claims, 20 Drawing Sheets

(56) References Cited

OTHER PUBLICATIONS

Jar-Ferr Yang, et al., "Centralized Texture Depth Packing SEI Message for HEVC and AVC", Joint Collaborative Team on Video Coding (JCT-VC) pf Out-T SG 16 WP 2 and ISO/IEC JTC 1/SC 29/WG11—31st Meeting, San Diego., CA, USA, Apr. 13-20, 2018, pp. 1-19, JCTVC-AE0022r1.

Wei-Jong Yang et al., "An Assigned Color Depth Packing Method With Centralized Texture Depth Packing Formats for 3D VR Broadcasting Services", IEEE Journal on Emerging and Selected Topics in Circuits and Systems, vol. 9, No. 1, Mar. 2019, pp. 122-132.

* cited by examiner

RGB format

YUV(YCbCr) format

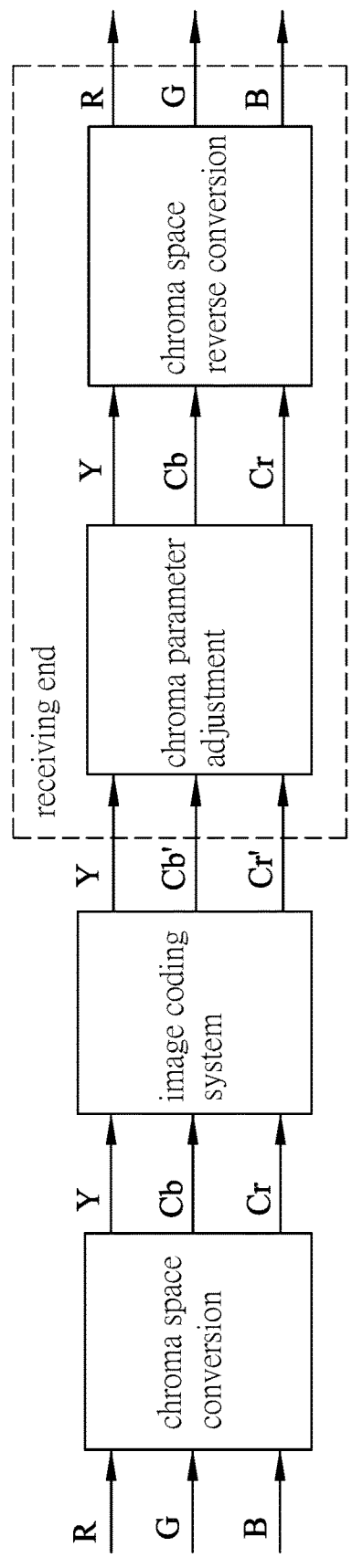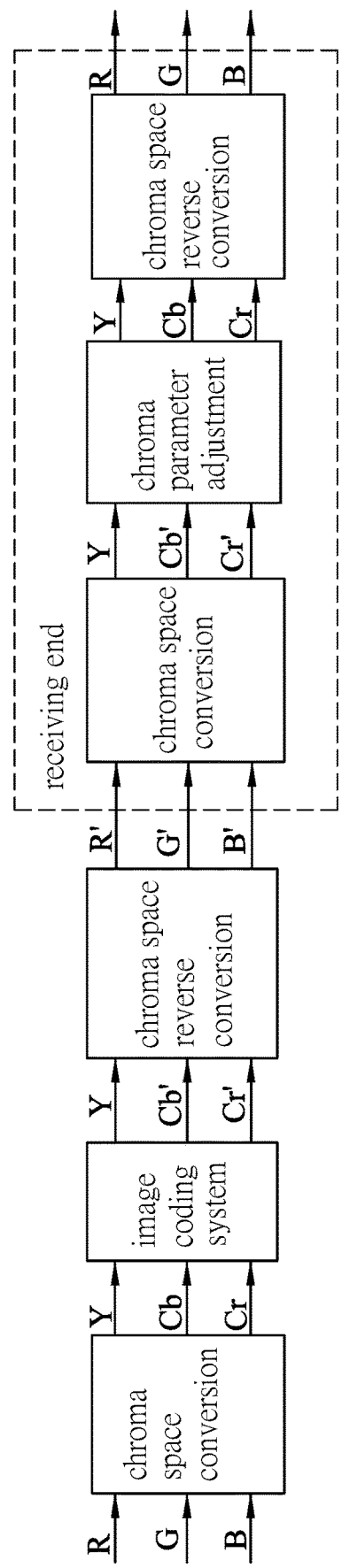
FIG. 5A
FIG. 5B

U01 obtain two depth values from each of the first pixel depth value and the fourth pixel depth value, and obtain one depth value from each of the second pixel depth value and the third pixel depth value, wherein the six depth values obtained from the first pixel depth value, the second pixel depth value, the third pixel depth value and the fourth pixel depth value have interleaved positions

U02 assign one of the two depth values obtained from the first pixel depth value to an R-subpixel value of the first pixel in a converted RGB format, assign the other one of the two depth values obtained from the first pixel depth value to a B-subpixel value of the first pixel in the converted RGB format, assign the depth value obtained from the second pixel depth value to an R-subpixel value, a G-subpixel value and a B-subpixel value of the second pixel in the converted RGB format, assign the depth value obtained from the third pixel depth value to an R-subpixel value, a G-subpixel value and a B-subpixel value of the third pixel in the converted RGB format, assign one of the two depth values obtained from the fourth pixel depth value to a G-subpixel value of the first pixel in the converted RGB format, and assign the other one of the two depth values obtained from the fourth pixel depth value to an R-subpixel value, a G-subpixel value and a B-subpixel value of the fourth pixel in the converted RGB format

FIG. 7A

X01: obtain the R-subpixel value, the G-subpixel value and the B-subpixel value of the first pixel of the group of four pixels in the RGB format, obtain the R-subpixel value, the G-subpixel value and the B-subpixel value of the second pixel of the group of four pixels in the RGB format, obtain the R-subpixel value of the third pixel of the group of four pixels in the RGB format, and obtain the B-subpixel value of the fourth pixel of the group of four pixels in the RGB format X02: assign the R-subpixel value of the first pixel to a geomertrical position in the first pixel depth value corresponding to the R-subpixel value of the first pixel, assign the G-subpixel value of the first pixel to a geomertrical position in the third pixel depth value corresponding to the G-subpixel value of the third pixel, assign the B-subpixel value of the first pixel to a geomertrical position in the first pixel depth value corresponding to the B-subpixel value of the first pixel, assign the R-subpixel value of the second pixel to a geomertrical position in the fourth pixel depth value corresponding to the R-subpixel value of the fourth pixel, assign the G-subpixel value of the second pixel to a geomertrical position in the second pixel depth value corresponding to the G-subpixel value of the second pixel, assign the B-subpixel value of the second pixel to a geomertrical position in the second pixel depth value corresponding to the B-subpixel value of the second pixel, assign the R-subpixel value of the third pixel to a geomertrical position in the third pixel depth value corresponding to the R-subpixel value of the third pixel, and assign the B-subpixel value of the fourth pixel to a geomertrical position in the fourth pixel depth value corresponding to the B-subpixel value of the fourth pixel

FIG. 8C

Z01 obtain the R-subpixel value, the G-subpixel value and the B-subpixel value of the first pixel of the group of four pixels in the RGB format, obtain the B-subpixel value of the second pixel of the group of four pixels in the RGB format, obtain the R-subpixel value, the G-subpixel value and the B-subpixel value of the third pixel of the group of four pixels in the RGB format, and obtain the B-subpixel value of the fourth pixel of the group of four pixels in the RGB format

Z02 assign the R-subpixel value of the first pixel to a geomertrical position in the first pixel depth value corresponding to the R-subpixel value of the first pixel, assign the G-subpixel value of the first pixel to a geomertrical position in the first pixel depth value corresponding to the G-subpixel value of the first pixel, assign the B-subpixel value of the first pixel to a geomertrical position in the second pixel depth value corresponding to the R-subpixel value of the second pixel, assign the B-subpixel value of the second pixel to a geomertrical position in the second pixel depth value corresponding to the B-subpixel value of the second pixel, assign the R-subpixel value of the third pixel to a geomertrical position in the third pixel depth value corresponding to the R-subpixel value of the third pixel, assign the G-subpixel value of the third pixel to a geomertrical position in the third pixel depth value corresponding to the G-subpixel value of the third pixel, assign the B-subpixel value of the third pixel to a geomertrical position in the fourth pixel depth value corresponding to the R-subpixel value of the fourth pixel, and assign the B-subpixel value of the fourth pixel to a geomertrical position in the fourth pixel depth value corresponding to the B-subpixel value of the fourth pixel

FIG. 9C

METHOD AND CIRCUIT OF ASSIGNING SELECTED DEPTH VALUES TO RGB SUBPIXELS AND RECOVERING SELECTED DEPTH VALUES FROM RGB SUBPIXELS FOR COLORED DEPTH FRAME PACKING AND DEPACKING

CROSS REFERENCE TO RELATED APPLICATIONS

This Non-provisional application claims priority under 35 U.S.C. § 119(a) on Patent Application No(s). 107112600 filed in Taiwan, Republic of China on Apr. 12, 2018, the entire contents of which are hereby incorporated by reference.

BACKGROUND

Technology Field

The present disclosure relates to a method and circuit of assigning selected depth values to RGB subpixels and recovering the selected depth values from the RGB subpixels for colored depth frame packing and depacking.

Description of Related Art

Most human visible colors can be presented by mixing red, green and blue (R, G, B). However, the human visual system is more sensitive to luminance and less sensitive to chrominance. Moreover, the vector space constructed by the three primary colors cannot process the image intensity (brightness), such as softening, sharpening, and the likes. Besides, the RGB format image data usually occupies a larger bandwidth in transmission and larger memory space in storage. Therefore, it is necessary to transform the RGB format image data into YUV (or YCbCr) format image data to achieve high efficient image transmission.

In the conventional art, the video or image compression system can convert the adjacent four pixels of the RGB sub-pixels into adjacent four pixels (also known as YUV 444 format or YCbCr 4:4:4 format) of the YUV (or YCbCr) sub-pixels before data transmission, and then the receiving end can convert the YUV format image data back to the RGB format image data. FIGS. 1A and 1B show the conversions of the depth vertical pixels and the depth horizontal pixels in the conventional H.265 video compression system. Referring to FIGS. 1A and 1B in view of the matrix and inverse matrix equations (1) and (2) as shown in the following Tables 1 and 2, excluding the calculated error, the conversion and inverse conversion of the image data between the RGB format and the YUV 444 format does not cause distortion.

TABLE 1 conversion from RGB to YUV $$\begin{bmatrix} Y_i \\ U_i \\ V_i \end{bmatrix} = \begin{bmatrix} 0.2568 & 0.5041 & 0.0979 \\ -0.1482 & -0.2910 & 0.4392 \\ 0.4392 & -0.3678 & -0.0714 \end{bmatrix} \begin{bmatrix} R_i \\ G_i \\ B_i \end{bmatrix} + \begin{bmatrix} 16 \\ 128 \\ 128 \end{bmatrix} \quad (1)$$

TABLE 2 inverse conversion from YUV to RGB $$\begin{bmatrix} R_i \\ G_i \\ B_i \end{bmatrix} = \begin{bmatrix} 1.1644 & 0.0001 & 1.5960 \\ 1.1644 & -0.3917 & -0.8130 \\ 1.1644 & 2.0173 & 0.0001 \end{bmatrix} \begin{bmatrix} Y_i - 16 \\ U_i - 128 \\ V_i - 128 \end{bmatrix} \quad (2)$$

However, in order to achieve high efficient video transmission, in some embodiments, the video or image compression system preserves the four luminance values (Y) of the four pixels of the YUV format, and the four chrominance values (U and V or Cb and Cr) are processed by subsampling so as to leave only the U, V chrominance values of two pixels (also known as YUV 422 format or YCbCr 4:2:2 format), or the U, V chrominance values of one pixel (also known as YUV 420 format or YCbCr 4:2:0 format). Thus, the transmission of image data of YUV422 or 420 format can occupy less bandwidth in transmission and less memory space in storage, thereby achieving high efficient video compression and transmission.

FIGS. 2A and 2B show the YUV444 format, YUV422 format, and YUV420 format of the depth vertical and horizontal packages, respectively. The black UV Chroma values are indicated in the two illustrations has been routed by the different sampling. Because the YUV 420 format consumes the least amount of bandwidth and memory, it is the most commonly used format for video or image compression systems.

When the receiving end of the image decompression system receives the YUV420 (or YUV 422) format image data, the lacked U, V chrominance values are filled with the remained neighboring U, V chrominance values so as to obtain the approximate YUV444 format image data, which are then converted to the RGB format image data. For example, in the YUV 420 format, the decompression system fills the U chrominance values ($U_2$, $U_3$, $U_4$) of the second pixel, the third pixel, and the fourth pixel, respectively, with the U chrominance value ($U_1$) of the first pixel, and fills the V chrominance values ($V_2$, $V_3$, $V_4$) of the second pixel, the third pixel, and the fourth pixel, respectively, with the V chrominance value ($V_1$) of the first pixel. Then, the four pixels in the YUV format are converted to RGB format pixels according to the above-mentioned equation (2). In the above case, only the $R_1$, $G_1$ and $B_1$ can be completely recovered, and the other R, G and B values will have distortions of different levels due to the filled $U_1$ and $V_1$.

In the YUV 422 format, the decompression system fills $U_2$ and $U_4$ with $U_1$ and $U_3$, respectively, and fills $V_2$ and $V_4$ with $V_1$ and $V_3$, respectively. Then, the four pixels in the YUV format are converted to RGB format according to the above-mentioned equation (2). In the above case, only the $R_1$, $G_1$, $B_1$, $R_3$, $G_3$ and $B_3$ can be completely recovered. The $R_2$, $G_2$ and $B_2$ are filled with $U_1$ and $V_1$, so the correction of $R_2$, $G_2$ and $B_2$ cannot be garmented. The $R_4$, $G_4$ and $B_4$ are filled with $U_3$ and $V_3$, so the correction of $R_4$, $G_4$ and $B_4$ cannot be garmented.

Since the RGB format expresses the depth frame values of relative positions, once the depth frame packing utilizes the conversion between RGB format and YUV format in the compression and decompression system and the coding and decoding system utilizes the YUV 420 format or YUV 422 format, the filled U and V values are different, and the incontrollable depth frame error may occur around the area with larger depth gap while converting back to the RGB format.

The above-mentioned conversion and inverse conversion method for processing the RGB format and YUV format image data in the conventional art have been used by the industry for a long time. Although the parameter values in tables 1 and 2 may have a slight change, the conversion and inverse conversion are carried out by the matrix with the three variables (R, G, B or Y, U, V), and are only focused on the transmission efficiency with regardless other factors.

SUMMARY

An objective of this disclosure is to provide a method and circuit of assigning selected depth values to RGB subpixels and recovering the selected depth values from the RGB subpixels for colored depth frame packing and depacking in the conventional video compression and decompression system. In this disclosure, the processes of assigning selected depth values to RGB subpixels and recovering the selected depth values from the RGB subpixels can be applied to the packing and depacking processes of the conventional video compression and decompression system, thereby directly recovering multiple depth values of image data from the received RGB format. Accordingly, the distortion around the area with dramatic depth gap can be improved.

This disclosure provides a method of assigning selected depth values to RGB subpixels for a colored depth frame packing and depacking. The RGB format comprises an R subpixel, a G subpixel and a B subpixel in order. The RGB depth frame comprises a group of four pixels, and the R subpixels, G subpixels and B subpixels of the group of four pixels are vertically or horizontally arranged. The group of four pixels comprises a first pixel, a second pixel, a third pixel and a fourth pixel. The first pixel is located neighboring the second pixel and the third pixel, and the fourth pixel is located neighboring the second pixel and the third pixel. The geometrical positions of the first pixel, the second pixel, the third pixel and the fourth pixel correspondingly have a first pixel depth value, a second pixel depth value, a third pixel depth value and a fourth pixel depth value, respectively. The method comprises: obtaining two depth values from each of the first pixel depth value and the fourth pixel depth value, and obtaining one depth value from each of the second pixel depth value and the third pixel depth value, wherein the six depth values obtained from the first pixel depth value, the second pixel depth value, the third pixel depth value and the fourth pixel depth value have interleaved positions; and assigning one of the two depth values obtained from the first pixel depth value to an R-subpixel value of the first pixel in a converted RGB format, assigning the other one of the two depth values obtained from the first pixel depth value to a B-subpixel value of the first pixel in the converted RGB format, assigning the depth value obtained from the second pixel depth value to an R-subpixel value, a G-subpixel value and a B-subpixel value of the second pixel in the converted RGB format, assigning the depth value obtained from the third pixel depth value to an R-subpixel value, a G-subpixel value and a B-subpixel value of the third pixel in the converted RGB format, assigning one of the two depth values obtained from the fourth pixel depth value to a G-subpixel value of the first pixel in the converted RGB format, and assigning the other one of the two depth values obtained from the fourth pixel depth value to an R-subpixel value, a G-subpixel value and a B-subpixel value of the fourth pixel in the converted RGB format.

This disclosure also provides a circuit for performing the above-mentioned method. The circuit comprises an obtaining unit and a depositing unit. The obtaining unit is configured for obtaining two depth values from each of the first pixel depth value and the fourth pixel depth value, and obtaining one depth value from each of the second pixel depth value and the third pixel depth value. The six depth values obtained from the first pixel depth value, the second pixel depth value, the third pixel depth value and the fourth pixel depth value have interleaved positions. The depositing unit is configured for assigning one of the two depth values obtained from the first pixel depth value to an R-subpixel value of the first pixel in a converted RGB format, assigning the other one of the two depth values obtained from the first pixel depth value to a B-subpixel value of the first pixel in the converted RGB format, assigning the depth value obtained from the second pixel depth value to an R-subpixel value, a G-subpixel value and a B-subpixel value of the second pixel in the converted RGB format, assigning the depth value obtained from the third pixel depth value to an R-subpixel value, a G-subpixel value and a B-subpixel value of the third pixel in the converted RGB format, assigning one of the two depth values obtained from the fourth pixel depth value to a G-subpixel value of the first pixel in the converted RGB format, and assigning the other one of the two depth values obtained from the fourth pixel depth value to an R-subpixel value, a G-subpixel value and a B-subpixel value of the fourth pixel in the converted RGB format.

This disclosure further discloses a method of recovering selected depth values from RGB subpixels for a colored depth frame packing and depacking. The RGB format comprises an R subpixel, a G subpixel and a B subpixel in order. The RGB depth frame comprises a group of four pixels, and the R subpixels, G subpixels and B subpixels of the group of four pixels are vertically or horizontally arranged. The group of four pixels comprises a first pixel, a second pixel, a third pixel and a fourth pixel. The first pixel is located neighboring the second pixel and the third pixel, and the fourth pixel is located neighboring the second pixel and the third pixel. The geometrical positions of the first pixel, the second pixel, the third pixel and the fourth pixel correspondingly have a first pixel depth value, a second pixel depth value, a third pixel depth value and a fourth pixel depth value, respectively. The method comprises: obtaining the R-subpixel value, the G-subpixel value and the B-subpixel value of the first pixel of the group of four pixels in the RGB format, obtaining the G-subpixel value of the second pixel of the group of four pixels in the RGB format, obtaining the G-subpixel value of the third pixel of the group of four pixels in the RGB format, and obtaining the B-subpixel value of the fourth pixel of the group of four pixels in the RGB format; and assigning the R-subpixel value of the first pixel to a geometrical position in the first pixel depth value corresponding to the R-subpixel value of the first pixel, assigning the G-subpixel value of the first pixel to a geometrical position in the fourth pixel depth value corresponding to the R-subpixel value of the fourth pixel, assigning the B-subpixel value of the first pixel to a geometrical position in the first pixel depth value corresponding to the B-subpixel value of the first pixel, assigning the G-subpixel value of the second pixel to a geometrical position in the second pixel depth value corresponding to the G-subpixel value of the second pixel, assigning the G-subpixel value of the third pixel to a geometrical position in the third pixel depth value corresponding to the G-subpixel value of the third pixel, and assigning the B-subpixel value of the fourth pixel to a geometrical position in the fourth pixel depth value corresponding to the B-subpixel value of the fourth pixel.

This disclosure also provides a circuit for performing the above-mentioned method. The circuit comprises an obtaining unit and a depositing unit. The obtaining unit is configured for obtaining the R-subpixel value, the G-subpixel value and the B-subpixel value of the first pixel of the group of four pixels in the RGB format, obtaining the G-subpixel value of the second pixel of the group of four pixels in the RGB format, obtaining the G-subpixel value of the third pixel of the group of four pixels in the RGB format, and obtaining the B-subpixel value of the fourth pixel of the group of four pixels in the RGB format. The depositing unit is configured for assigning the R-subpixel value of the first pixel to a geometrical position in the first pixel depth value corresponding to the R-subpixel value of the first pixel, assigning the G-subpixel value of the first pixel to a geometrical position in the fourth pixel depth value corresponding to the R-subpixel value of the fourth pixel, assigning the B-subpixel value of the first pixel to a geometrical position in the first pixel depth value corresponding to the B-subpixel value of the first pixel, assigning the G-subpixel value of the second pixel to a geometrical position in the second pixel depth value corresponding to the G-subpixel value of the second pixel, assigning the G-subpixel value of the third pixel to a geometrical position in the third pixel depth value corresponding to the G-subpixel value of the third pixel, and assigning the B-subpixel value of the fourth pixel to a geometrical position in the fourth pixel depth value corresponding to the B-subpixel value of the fourth pixel.

This disclosure further discloses a method of assigning selected depth values to RGB subpixels for a colored depth frame packing and depacking. The RGB format comprises an R subpixel, a G subpixel and a B subpixel in order. The RGB depth frame comprises a group of four pixels, and the R subpixels, G subpixels and B subpixels of the group of four pixels are vertically or horizontally arranged. The group of four pixels comprises a first pixel, a second pixel, a third pixel and a fourth pixel. The first pixel is located neighboring the second pixel and the third pixel, and the fourth pixel is located neighboring the second pixel and the third pixel. The geometrical positions of the first pixel, the second pixel, the third pixel and the fourth pixel correspondingly have a first pixel depth value, a second pixel depth value, a third pixel depth value and a fourth pixel depth value, respectively. The method comprises: obtaining two depth values from each of the first pixel depth value, the second pixel depth value, the third pixel depth value and the fourth pixel depth value; and assigning one of the two depth values obtained from the first pixel depth value to an R-subpixel value of the first pixel in a converted RGB format, assigning the other one of the two depth values obtained from the first pixel depth value to a B-subpixel value of the first pixel in the converted RGB format, assigning one of the two depth values obtained from the second pixel depth value to a G-subpixel value of the second pixel in the converted RGB format, assigning the other one of the two depth values obtained from the second pixel depth value to a B-subpixel value of the second pixel in the converted RGB format, assigning one of the two depth values obtained from the third pixel depth value to an R-subpixel value, a G-subpixel value and a B-subpixel value of the third pixel in the converted RGB format, assigning the other one of the two depth values obtained from the third pixel depth value to a G-subpixel value of the first pixel in the converted RGB format, assigning one of the two depth values obtained from the fourth pixel depth value to an R-subpixel value of the second pixel in the converted RGB format, and assigning the other one of the two depth values obtained from the fourth pixel depth value to an R-subpixel value, a G-subpixel value and a B-subpixel value of the fourth pixel in the converted RGB format.

This disclosure also provides a circuit for performing the above-mentioned method. The circuit comprises an obtaining unit and a depositing unit. The obtaining unit is configured for obtaining two depth values from each of the first pixel depth value, the second pixel depth value, the third pixel depth value and the fourth pixel depth value. The depositing unit is configured for assigning one of the two depth values obtained from the first pixel depth value to an R-subpixel value of the first pixel in a converted RGB format, assigning the other one of the two depth values obtained from the first pixel depth value to a B-subpixel value of the first pixel in the converted RGB format, assigning one of the two depth values obtained from the second pixel depth value to a G-subpixel value of the second pixel in the converted RGB format, assigning the other one of the two depth values obtained from the second pixel depth value to a B-subpixel value of the second pixel in the converted RGB format, assigning one of the two depth values obtained from the third pixel depth value to an R-subpixel value, a G-subpixel value and a B-subpixel value of the third pixel in the converted RGB format, assigning the other one of the two depth values obtained from the third pixel depth value to a G-subpixel value of the first pixel in the converted RGB format, assigning one of the two depth values obtained from the fourth pixel depth value to an R-subpixel value of the second pixel in the converted RGB format, and assigning the other one of the two depth values obtained from the fourth pixel depth value to an R-subpixel value, a G-subpixel value and a B-subpixel value of the fourth pixel in the converted RGB format.

This disclosure further discloses a method of recovering selected depth values from RGB subpixels for a colored depth frame packing and depacking. The RGB format comprises an R subpixel, a G subpixel and a B subpixel in order. The RGB depth frame comprises a group of four pixels, and the R subpixels, G subpixels and B subpixels of the group of four pixels are vertically or horizontally arranged. The group of four pixels comprises a first pixel, a second pixel, a third pixel and a fourth pixel. The first pixel is located neighboring the second pixel and the third pixel, and the fourth pixel is located neighboring the second pixel and the third pixel. The geometrical positions of the first pixel, the second pixel, the third pixel and the fourth pixel correspondingly have a first pixel depth value, a second pixel depth value, a third pixel depth value and a fourth pixel depth value, respectively. The method comprises: obtaining the R-subpixel value, the G-subpixel value and the B-subpixel value of the first pixel of the group of four pixels in the RGB format, obtaining the R-subpixel value, the G-subpixel value and the B-subpixel value of the second pixel of the group of four pixels in the RGB format, obtaining the R-subpixel value of the third pixel of the group of four pixels in the RGB format, and obtaining the B-subpixel value of the fourth pixel of the group of four pixels in the RGB format; and assigning the R-subpixel value of the first pixel to a geometrical position in the first pixel depth value corresponding to the R-subpixel value of the first pixel, assigning the G-subpixel value of the first pixel to a geometrical position in the third pixel depth value corresponding to the G-subpixel value of the third pixel, assigning the B-subpixel value of the first pixel to a geometrical position in the first pixel depth value corresponding to the B-subpixel value of the first pixel, assigning the R-subpixel value of the second pixel to a geometrical position in the fourth pixel depth value corresponding to the R-subpixel value of the fourth pixel, assigning the G-subpixel value of the second pixel to a geometrical position in the second pixel depth value corresponding to the G-subpixel value of the second pixel, assigning the B-subpixel value of the second pixel to a geometrical position in the second pixel depth value corresponding to the B-subpixel value of the second pixel, assigning the R-subpixel value of the third pixel to a geometrical position in the third pixel depth value corresponding to the R-subpixel value of the third pixel, and assigning the B-subpixel value of the fourth pixel to a geometrical position in the fourth pixel depth value corresponding to the B-subpixel value of the fourth pixel.

This disclosure also provides a circuit for performing the above-mentioned method. The circuit comprises an obtaining unit and a depositing unit. The obtaining unit is configured for obtaining the R-subpixel value, the G-subpixel value and the B-subpixel value of the first pixel of the group of four pixels in the RGB format, obtaining the R-subpixel value, the G-subpixel value and the B-subpixel value of the second pixel of the group of four pixels in the RGB format, obtaining the R-subpixel value of the third pixel of the group of four pixels in the RGB format, and obtaining the B-subpixel value of the fourth pixel of the group of four pixels in the RGB format. The depositing unit is configured for assigning the R-subpixel value of the first pixel to a geometrical position in the first pixel depth value corresponding to the R-subpixel value of the first pixel, assigning the G-subpixel value of the first pixel to a geometrical position in the third pixel depth value corresponding to the G-subpixel value of the third pixel, assigning the B-subpixel value of the first pixel to a geometrical position in the first pixel depth value corresponding to the B-subpixel value of the first pixel, assigning the R-subpixel value of the second pixel to a geometrical position in the fourth pixel depth value corresponding to the R-subpixel value of the fourth pixel, assigning the G-subpixel value of the second pixel to a geometrical position in the second pixel depth value corresponding to the G-subpixel value of the second pixel, assigning the B-subpixel value of the second pixel to a geometrical position in the second pixel depth value corresponding to the B-subpixel value of the second pixel, assigning the R-subpixel value of the third pixel to a geometrical position in the third pixel depth value corresponding to the R-subpixel value of the third pixel, and assigning the B-subpixel value of the fourth pixel to a geometrical position in the fourth pixel depth value corresponding to the B-subpixel value of the fourth pixel.

This disclosure further discloses a method of assigning selected depth values to RGB subpixels for a colored depth frame packing and depacking. The RGB format comprises an R subpixel, a G subpixel and a B subpixel in order. The RGB depth frame comprises a group of four pixels, and the R subpixels, G subpixels and B subpixels of the group of four pixels are vertically or horizontally arranged. The group of four pixels comprises a first pixel, a second pixel, a third pixel and a fourth pixel. The first pixel is located neighboring the second pixel and the third pixel, and the fourth pixel is located neighboring the second pixel and the third pixel. The geometrical positions of the first pixel, the second pixel, the third pixel and the fourth pixel correspondingly have a first pixel depth value, a second pixel depth value, a third pixel depth value and a fourth pixel depth value, respectively. The method comprises: obtaining two depth values from each of the first pixel depth value, the second pixel depth value, the third pixel depth value and the fourth pixel depth value; and assigning one of the two depth values obtained from the first pixel depth value to an R-subpixel value of the first pixel in a converted RGB format, assigning the other one of the two depth values obtained from the first pixel depth value to a G-subpixel value of the first pixel in the converted RGB format, assigning one of the two depth values obtained from the second pixel depth value to a B-subpixel value of the first pixel in the converted RGB format, assigning the other one of the two depth values obtained from the second pixel depth value to an R-subpixel value, a G-subpixel value and a B-subpixel value of the second pixel in the converted RGB format, assigning one of the two depth values obtained from the third pixel depth value to an R-subpixel value of the third pixel in the converted RGB format, assigning the other one of the two depth values obtained from the third pixel depth value to a G-subpixel value of the third pixel in the converted RGB format, assigning one of the two depth values obtained from the fourth pixel depth value to a B-subpixel value of the third pixel in the converted RGB format, and assigning the other one of the two depth values obtained from the fourth pixel depth value to an R-subpixel value, a G-subpixel value and a B-subpixel value of the fourth pixel in the converted RGB format.

This disclosure also provides a circuit for performing the above-mentioned method. The circuit comprises an obtaining unit and a depositing unit. The obtaining unit is configured for obtaining two depth values from each of the first pixel depth value, the second pixel depth value, the third pixel depth value and the fourth pixel depth value. The depositing unit is configured for assigning one of the two depth values obtained from the first pixel depth value to an R-subpixel value of the first pixel in a converted RGB format, assigning the other one of the two depth values obtained from the first pixel depth value to a G-subpixel value of the first pixel in the converted RGB format, assigning one of the two depth values obtained from the second pixel depth value to a B-subpixel value of the first pixel in the converted RGB format, assigning the other one of the two depth values obtained from the second pixel depth value to an R-subpixel value, a G-subpixel value and a B-subpixel value of the second pixel in the converted RGB format, assigning one of the two depth values obtained from the third pixel depth value to an R-subpixel value of the third pixel in the converted RGB format, assigning the other one of the two depth values obtained from the third pixel depth value to a G-subpixel value of the third pixel in the converted RGB format, assigning one of the two depth values obtained from the fourth pixel depth value to a B-subpixel value of the third pixel in the converted RGB format, and assigning the other one of the two depth values obtained from the fourth pixel depth value to an R-subpixel value, a G-subpixel value and a B-subpixel value of the fourth pixel in the converted RGB format.

This disclosure further discloses a method of recovering selected depth values from RGB subpixels for a colored depth frame packing and depacking. The RGB format comprises an R subpixel, a G subpixel and a B subpixel in order. The RGB depth frame comprises a group of four pixels, and the R subpixels, G subpixels and B subpixels of the group of four pixels are vertically or horizontally arranged. The group of four pixels comprises a first pixel, a second pixel, a third pixel and a fourth pixel. The first pixel is located neighboring the second pixel and the third pixel, and the fourth pixel is located neighboring the second pixel and the third pixel. The geometrical positions of the first pixel, the second pixel, the third pixel and the fourth pixel correspondingly have a first pixel depth value, a second pixel depth value, a third pixel depth value and a fourth pixel depth value, respectively. The method comprises: obtaining the R-subpixel value, the G-subpixel value and the B-subpixel value of the first pixel of the group of four pixels in the RGB format, obtaining the B-subpixel value of the second pixel of the group of four pixels in the RGB format, obtaining the R-subpixel value, the G-subpixel value and the B-subpixel value of the third pixel of the group of four pixels in the RGB format, and obtaining the B-subpixel value of the fourth pixel of the group of four pixels in the RGB format; and assigning the R-subpixel value of the first pixel to a geometrical position in the first pixel depth value corresponding to the R-subpixel value of the first pixel, assigning the G-subpixel value of the first pixel to a geometrical position in the first pixel depth value corresponding to the G-subpixel value of the first pixel, assigning the B-subpixel value of the first pixel to a geometrical position in the second pixel depth value corresponding to the R-subpixel value of the second pixel, assigning the B-subpixel value of the second pixel to a geometrical position in the second pixel depth value corresponding to the B-subpixel value of the second pixel, assigning the R-subpixel value of the third pixel to a geometrical position in the third pixel depth value corresponding to the R-subpixel value of the third pixel, assigning the G-subpixel value of the third pixel to a geometrical position in the third pixel depth value corresponding to the G-subpixel value of the third pixel, assigning the B-subpixel value of the third pixel to a geometrical position in the fourth pixel depth value corresponding to the R-subpixel value of the fourth pixel, and assigning the B-subpixel value of the fourth pixel to a geometrical position in the fourth pixel depth value corresponding to the B-subpixel value of the fourth pixel.

This disclosure also provides a circuit for performing the above-mentioned method. The circuit comprises an obtaining unit and a depositing unit. The obtaining unit is configured for obtaining the R-subpixel value, the G-subpixel value and the B-subpixel value of the first pixel of the group of four pixels in the RGB format, obtaining the B-subpixel value of the second pixel of the group of four pixels in the RGB format, obtaining the R-subpixel value, the G-subpixel value and the B-subpixel value of the third pixel of the group of four pixels in the RGB format, and obtaining the B-subpixel value of the fourth pixel of the group of four pixels in the RGB format. The depositing unit is configured for assigning the R-subpixel value of the first pixel to a geometrical position in the first pixel depth value corresponding to the R-subpixel value of the first pixel, assigning the G-subpixel value of the first pixel to a geometrical position in the first pixel depth value corresponding to the G-subpixel value of the first pixel, assigning the B-subpixel value of the first pixel to a geometrical position in the second pixel depth value corresponding to the R-subpixel value of the second pixel, assigning the B-subpixel value of the second pixel to a geometrical position in the second pixel depth value corresponding to the B-subpixel value of the second pixel, assigning the R-subpixel value of the third pixel to a geometrical position in the third pixel depth value corresponding to the R-subpixel value of the third pixel, assigning the G-subpixel value of the third pixel to a geometrical position in the third pixel depth value corresponding to the G-subpixel value of the third pixel, assigning the B-subpixel value of the third pixel to a geometrical position in the fourth pixel depth value corresponding to the R-subpixel value of the fourth pixel, and assigning the B-subpixel value of the fourth pixel to a geometrical position in the fourth pixel depth value corresponding to the B-subpixel value of the fourth pixel.

This disclosure further discloses a method of assigning selected depth values to RGB subpixels for a colored depth frame packing and depacking. The RGB format comprises an R subpixel, a G subpixel and a B subpixel in order. The RGB depth frame comprises a group of four pixels, and the R subpixels, G subpixels and B subpixels of the group of four pixels are vertically or horizontally arranged. The group of four pixels comprises a first pixel, a second pixel, a third pixel and a fourth pixel. The first pixel is located neighboring the second pixel and the third pixel, and the fourth pixel is located neighboring the second pixel and the third pixel. The geometrical positions of the first pixel, the second pixel, the third pixel and the fourth pixel correspondingly have a first pixel depth value, a second pixel depth value, a third pixel depth value and a fourth pixel depth value, respectively. The method comprises: obtaining one depth value from each of the first pixel depth value, the second pixel depth value, the third pixel depth value and the fourth pixel depth value, wherein the two depth values obtained from the first pixel depth value and the third pixel depth value have interleaved positions, and the two depth values obtained from the second pixel depth value and the fourth pixel depth value have interleaved positions; and assigning the depth value obtained from the first pixel depth value to an R-subpixel value, a G-subpixel value and a B-subpixel value of the first pixel in a converted RGB format, assigning the depth value obtained from the second pixel depth value to an R-subpixel value, a G-subpixel value and a B-subpixel value of the second pixel in the converted RGB format, assigning the depth value obtained from the third pixel depth value to an R-subpixel value, a G-subpixel value and a B-subpixel value of the third pixel in the converted RGB format, and assigning the depth value obtained from the fourth pixel depth value to an R-subpixel value, a G-subpixel value and a B-subpixel value of the fourth pixel in the converted RGB format.

This disclosure also provides a circuit for performing the above-mentioned method. The circuit comprises an obtaining unit and a depositing unit. The obtaining unit is configured for obtaining one depth value from each of the first pixel depth value, the second pixel depth value, the third pixel depth value and the fourth pixel depth value, wherein the two depth values obtained from the first pixel depth value and the third pixel depth value have interleaved positions, and the two depth values obtained from the second pixel depth value and the fourth pixel depth value have interleaved positions. The depositing unit is configured for assigning the depth value obtained from the first pixel depth value to an R-subpixel value, a G-subpixel value and a B-subpixel value of the first pixel in a converted RGB format, assigning the depth value obtained from the second pixel depth value to an R-subpixel value, a G-subpixel value and a B-subpixel value of the second pixel in the converted RGB format, assigning the depth value obtained from the third pixel depth value to an R-subpixel value, a G-subpixel value and a B-subpixel value of the third pixel in the converted RGB format, assigning the depth value obtained from the fourth pixel depth value to an R-subpixel value, a G-subpixel value and a B-subpixel value of the fourth pixel in the converted RGB format.

This disclosure further discloses a method of recovering selected depth values from RGB subpixels for a colored depth frame packing and depacking. The RGB format comprises an R subpixel, a G subpixel and a B subpixel in order.

The RGB depth frame comprises a group of four pixels, and the R subpixels, G subpixels and B subpixels of the group of four pixels are vertically or horizontally arranged. The group of four pixels comprises a first pixel, a second pixel, a third pixel and a fourth pixel. The first pixel is located neighboring the second pixel and the third pixel, and the fourth pixel is located neighboring the second pixel and the third pixel. The geometrical positions of the first pixel, the second pixel, the third pixel and the fourth pixel correspondingly have a first pixel depth value, a second pixel depth value, a third pixel depth value and a fourth pixel depth value, respectively. The method comprises: obtaining the R-subpixel value of the first pixel of the group of four pixels in the RGB format, obtaining the G-subpixel value of the second pixel of the group of four pixels in the RGB format, obtaining the G-subpixel value of the third pixel of the group of four pixels in the RGB format, and obtaining the B-subpixel value of the fourth pixel of the group of four pixels in the RGB format; and assigning the R-subpixel value of the first pixel to a geometrical position in the first pixel depth value corresponding to the R-subpixel value of the first pixel, assigning the G-subpixel value of the second pixel to a geometrical position in the second pixel depth value corresponding to the G-subpixel value of the second pixel, assigning the G-subpixel value of the third pixel to a geometrical position in the third pixel depth value corresponding to the G-subpixel value of the third pixel, and assigning the B-subpixel value of the fourth pixel to a geometrical position in the fourth pixel depth value corresponding to the B-subpixel value of the fourth pixel.

This disclosure also provides a circuit for performing the above-mentioned method. The circuit comprises an obtaining unit and a depositing unit. The obtaining unit is configured for obtaining the R-subpixel value of the first pixel of the group of four pixels in the RGB format, obtaining the G-subpixel value of the second pixel of the group of four pixels in the RGB format, obtaining the G-subpixel value of the third pixel of the group of four pixels in the RGB format, and obtaining the B-subpixel value of the fourth pixel of the group of four pixels in the RGB format. The depositing unit is configured for assigning the R-subpixel value of the first pixel to a geometrical position in the first pixel depth value corresponding to the R-subpixel value of the first pixel, assigning the G-subpixel value of the second pixel to a geometrical position in the second pixel depth value corresponding to the G-subpixel value of the second pixel, assigning the G-subpixel value of the third pixel to a geometrical position in the third pixel depth value corresponding to the G-subpixel value of the third pixel, and assigning the B-subpixel value of the fourth pixel to a geometrical position in the fourth pixel depth value corresponding to the B-subpixel value of the fourth pixel.

As mentioned above, in the method and circuit of assigning selected depth values to RGB subpixels and recovering the selected depth values from the RGB subpixels for colored depth frame packing and depacking of this disclosure, the procedures of the conversion and inverse conversion between RGB format and YCbCr format in the conventional video compression system can be still used. Moreover, when the method and circuit of assigning selected depth values to RGB subpixels and recovering the selected depth values from the RGB subpixels applied to the packing and depacking of the conventional video compression and transmission system, multiple depth values can be directly recovered from the received RGB format without any adjustment. Compared with the conventional technology, which replaces the lacked chrominance values with the remained neighboring chrominance values, this disclosure can directly recover multiple depth values of the image data from the received RGB format, thereby improving the distortion around the area having large (or dramatic) depth gap.

BRIEF DESCRIPTION OF THE DRAWINGS

The disclosure will become more fully understood from the detailed description and accompanying drawings, which are given for illustration only, and thus are not limitative of the present disclosure, and wherein:

FIGS. 5A and 5B are schematic diagrams showing the conversion and inverse conversion in color space between RGB format and YCbCr format in the video coding system according to different embodiments of this disclosure;

FIG. 7A is a flow chart showing a method of assigning selected depth values to RGB subpixels for colored depth frame packing and depacking according to another embodiment of the disclosure;

FIG. 8C is a flow chart showing a method of recovering the selected depth values from the RGB subpixels for colored depth frame packing and depacking according to another embodiment of the disclosure;

FIG. 9C is a flow chart showing a method of recovering the selected depth values from the RGB subpixels for colored depth frame packing and depacking according to another embodiment of the disclosure.

DETAILED DESCRIPTION OF THE DISCLOSURE

Figure 1A:
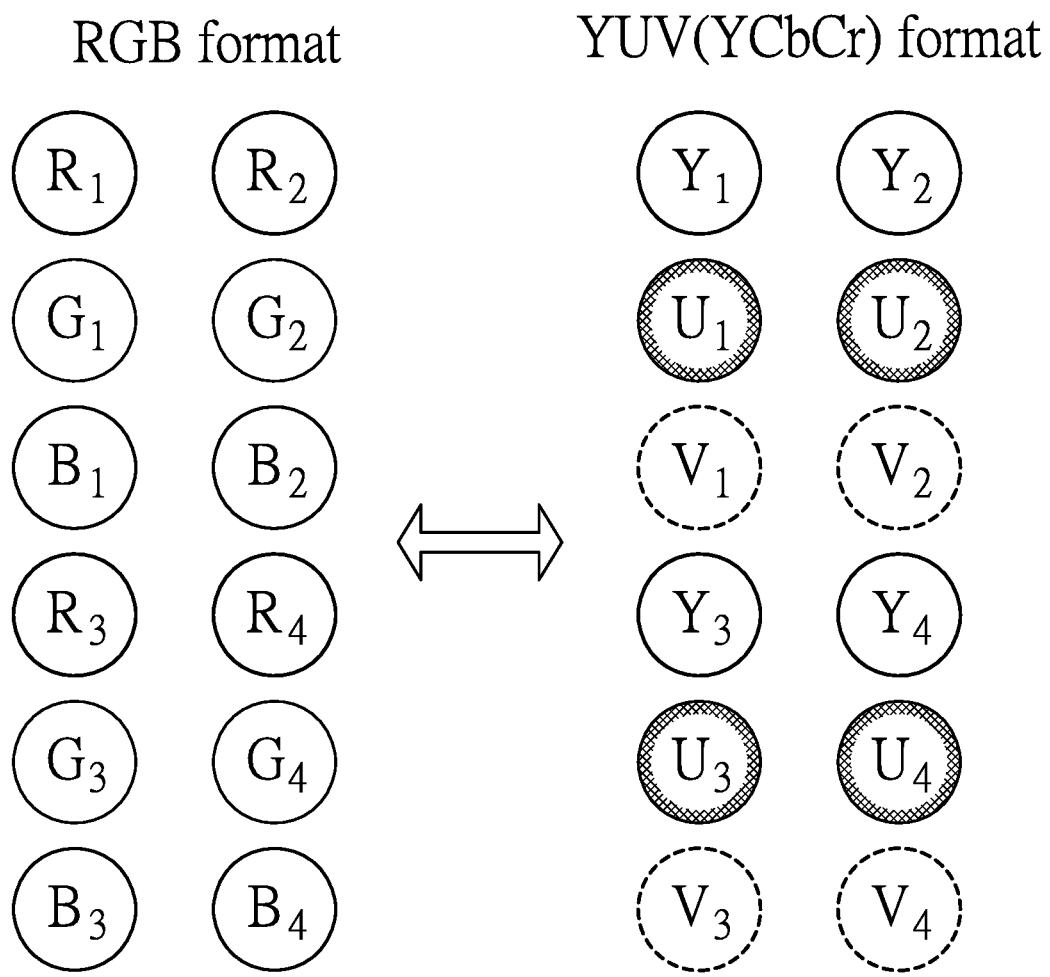
FIGS. 1A and 1B are schematic diagrams showing the conversions between RGB format and YUV (YCbCr) format of the subpixels of the depth vertical pixels and the depth horizontal pixels, respectively.
Figure 1B:
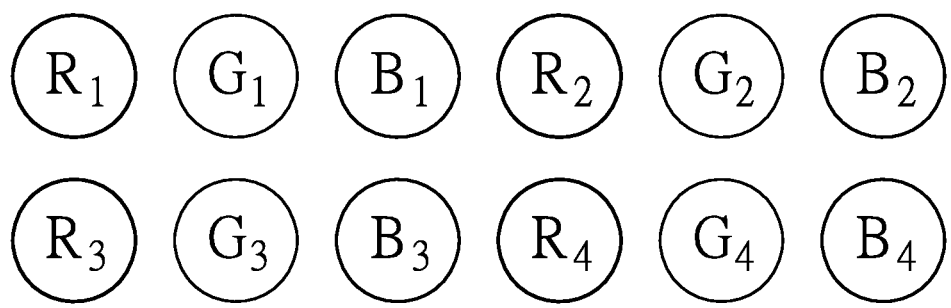
Figure 1B:
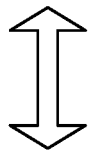
Figure 1B:
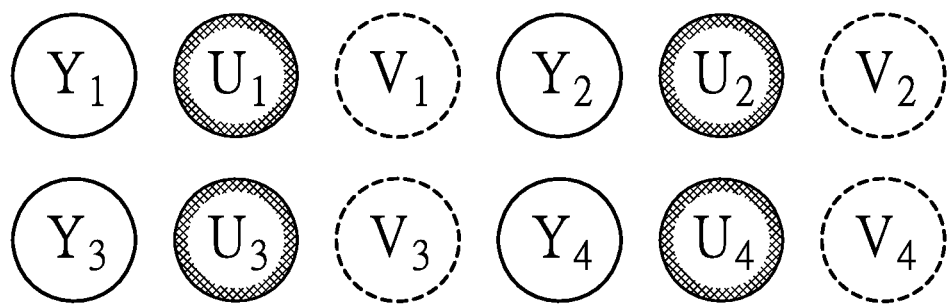
Figure 2A:
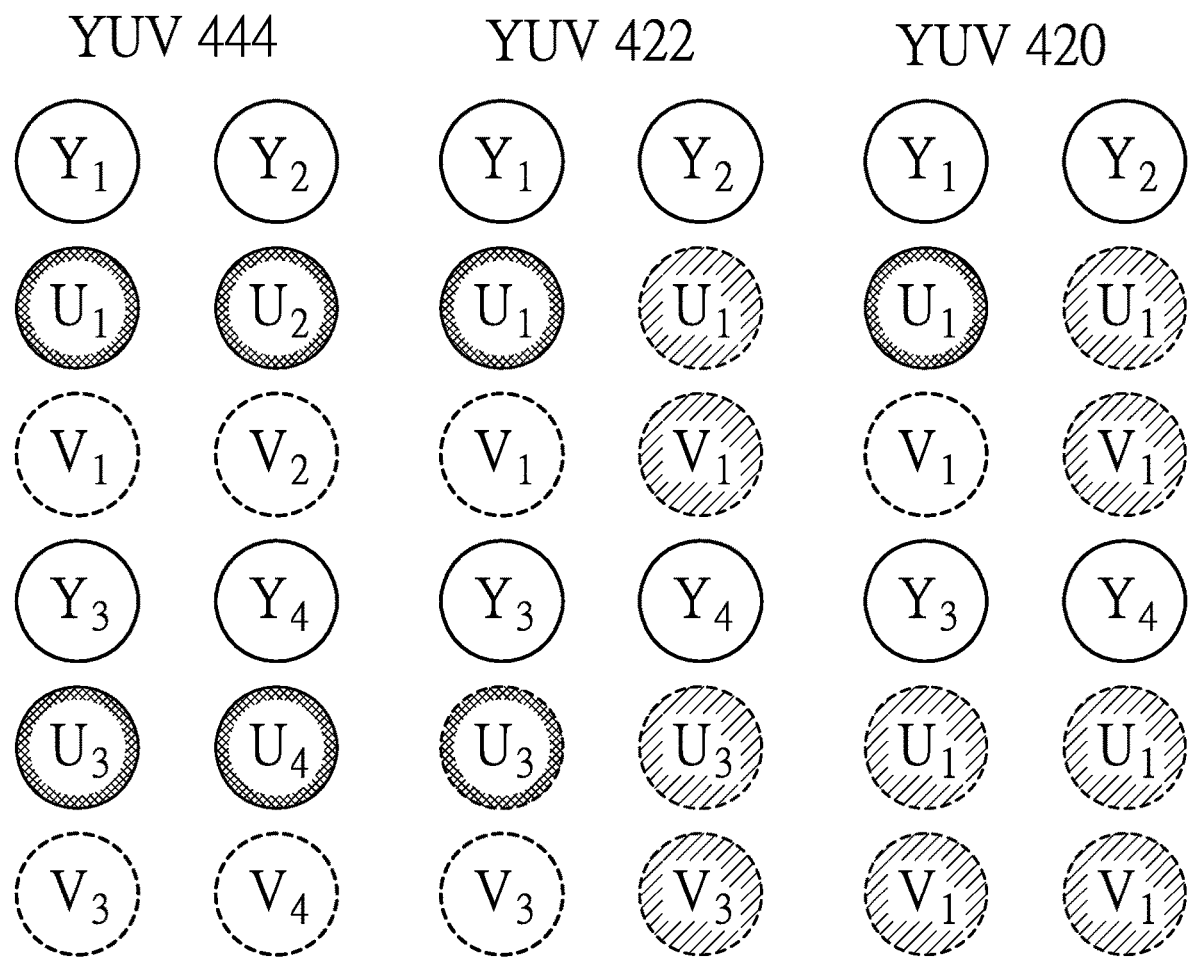
FIGS. 2A and 2B are schematic diagrams showing the depth vertical packages and the depth horizontal packages transmitted in YUV444 format, YUV422 format, and YUV420 format.
Figure 2B:
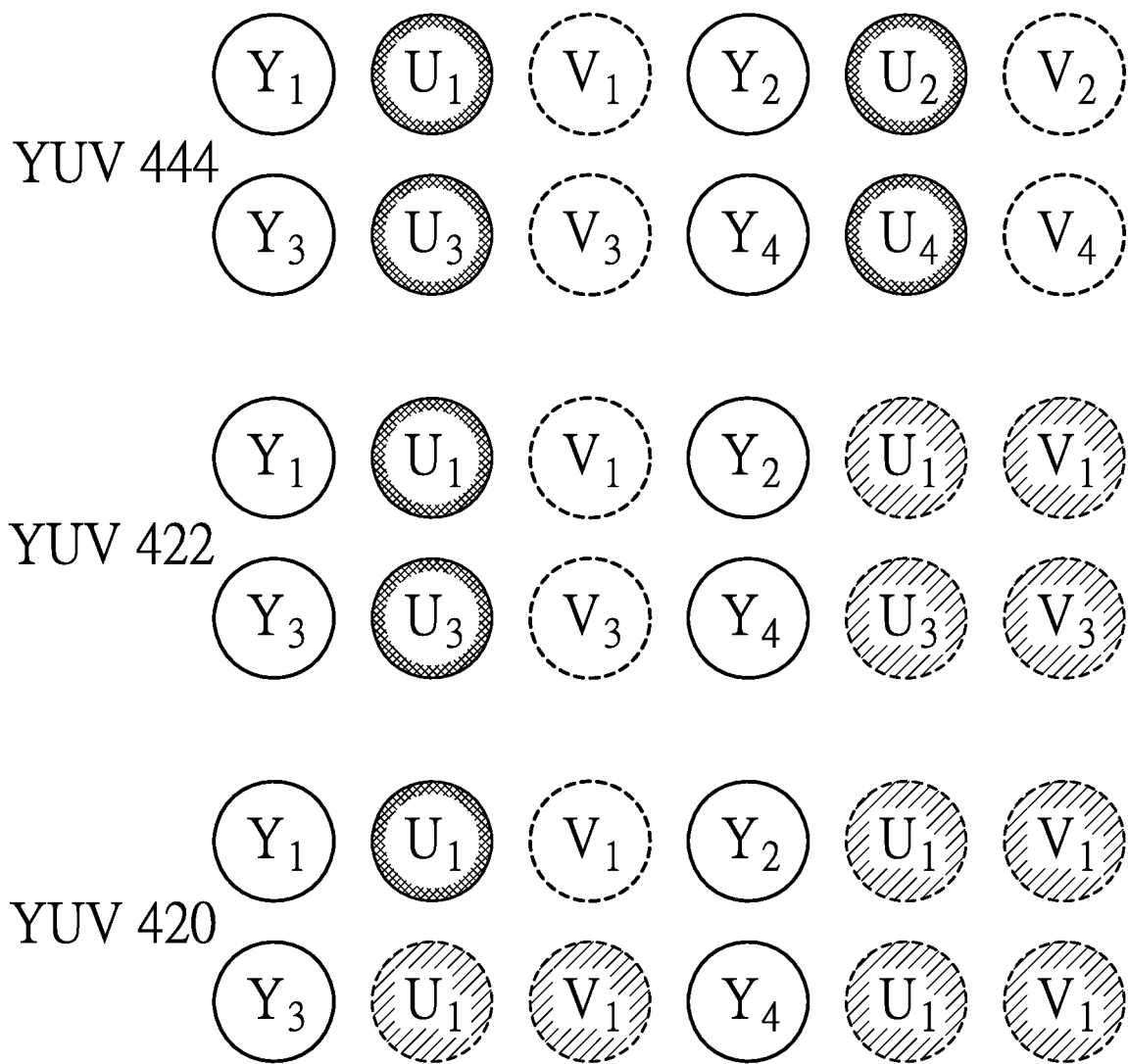

The present disclosure will be apparent from the following detailed description, which proceeds with reference to the accompanying drawings, wherein the same references relate to the same elements.

The method and circuit of assigning selected depth values to RGB subpixels (conversion) and recovering the selected depth values from the RGB subpixels (inverse conversion) of this disclosure can be applied to the packing and depacking of 3D depth system. In addition, the assigning method, the recovering method and the circuits thereof of the present disclosure can be applied to the compression and transmission of gray scale image signals. This disclosure can be applied to the above-mentioned high performance video compression and decompression system, and be preferably applied to the packing and depacking techniques of the 3D image system disclosed by the inventors in U.S. patent application Ser. Nos. 14/504,901, 14/504,936, 14/505,117 and 14/505,153, wherein each of the above references is incorporated herein in its entirety by reference.

In the conventional high performance video compression and decompression system, the image data are transformed from the RGB format to the YCbCr (YUV) format, and then transmitted to the receiving end. After the receiving end receives the image data in YCbCr (YUV) format, the image data are transformed from the YCbCr (YUV) format to the RGB format. This disclosure still utilizes the above packing and depacking procedures. In order to achieve a better conversion to recover the original depth values, this disclosure will assign (deposit) the selected depth values in the corresponding geometrical positions of the RGB subpixels in a group of four pixels of the depth frame to the corresponding RGB subpixels, and then convert the RGB format to the YCbCr 4:2:2, YCbCr 4:2:0 or YCbCr 4:0:0 format. The image data is then coded and transmitted. After the receiving end receives the image data in YCbCr 4:2:2, YCbCr 4:2:0 or YCbCr 4:0:0 format, the image data in YCbCr 4:2:2, YCbCr 4:2:0 or YCbCr 4:0:0 format are decompressed and converted to the RGB format. Afterwards, the recovering (inverse conversion) method of this disclosure is performed to recover the depth values so as to obtain the above selected depth values. This procedures can improve the distortion around the area having large (or dramatic) depth gap. Accordingly, the assigning method of this disclosure is the procedure of assigning (depositing) the selected depth values to the positions of the RGB subpixels, and the recovering method of this disclosure is the procedure of recovering the selected depth values from the RGB format, which is decompressed and inverse converted in chrominance space. Different embodiments will be described hereinafter for illustrating the method and circuit of assigning selected depth values to RGB subpixels and recovering the selected depth values from the RGB subpixels for colored depth frame packing and depacking of this disclosure.

In the following descriptions, the coding and decoding system adopts YCbCr 4:0:0 format.

Figure 3A:
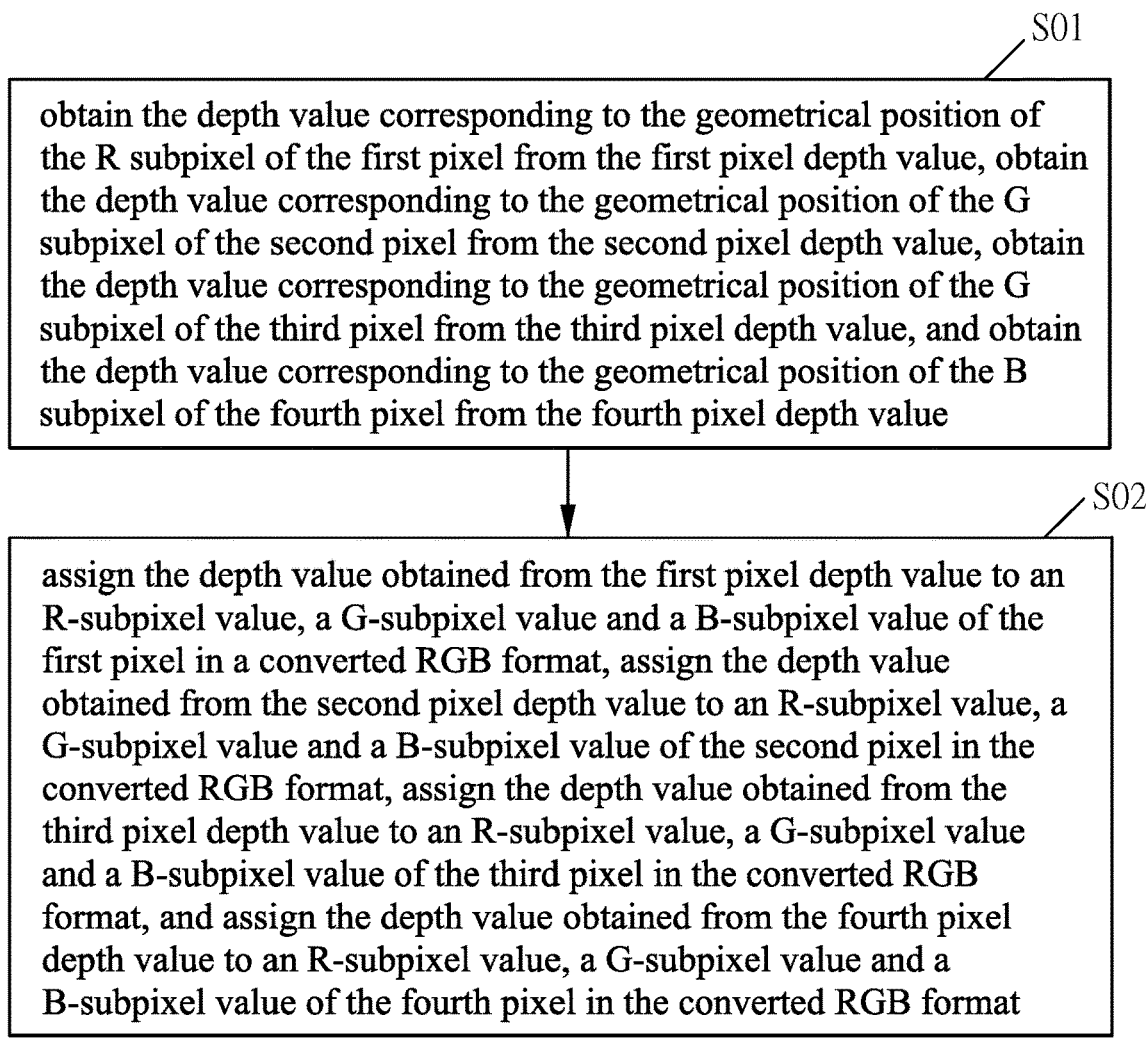
FIG. 3A is a flow chart showing a method of assigning selected depth values to RGB subpixels for colored depth frame packing and depacking according to an embodiment of the disclosure.
Figure 3B:
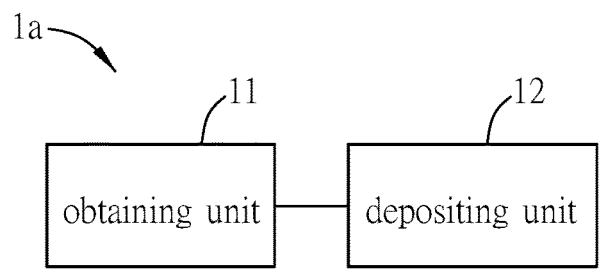
FIG. 3B is a schematic block diagram showing a circuit of assigning selected depth values to RGB subpixels for colored depth frame packing and depacking according to an embodiment of the disclosure.

FIG. 3A is a flow chart showing a method of assigning selected depth values to RGB subpixels for colored depth frame packing and depacking according to an embodiment of the disclosure, and FIG. 3B is a schematic block diagram showing a circuit 1a of assigning selected depth values to RGB subpixels for colored depth frame packing and depacking according to an embodiment of the disclosure.

The gray-level image data is a depth frame, which can be originally in the RGB format. The RGB format includes an R subpixel, a G subpixel and a B subpixel. The image data in the RGB format may include at least a group of four pixels. In other words, each group includes four neighboring pixels. Therefore, the pixels of all groups in the image data can be converted to the YCbCr format before the coding and transmitting processes. The four pixels of each group can be arranged in vertical or in horizontal and can be a first pixel, a second pixel, a third pixel and a fourth pixel. The first pixel is arranged neighboring the second pixel and the third pixel, and the fourth pixel is arranged neighboring the second pixel and the third pixel. In this embodiment, four pixels in one group includes twelve subpixels. The R, G and B subpixels of each pixel are arranged in vertical, which means that the R, G and B subpixels of each pixel are arranged in one column. The R, G and B subpixels of each pixel are arranged in horizontal, which means that the R, G and B subpixels of each pixel are arranged in one row. The geometrical positions of the first pixel, the second pixel, the third pixel and the fourth pixel correspondingly have a first pixel depth value, a second pixel depth value, a third pixel depth value and a fourth pixel depth value, respectively. Since each pixel has multiple subpixels arranged in horizontal or in vertical, the first pixel depth value, the second pixel depth value, the third pixel depth value and the fourth pixel depth value, which have geometrical positions corresponding to the first pixel, the second pixel, the third pixel and the fourth pixel, respectively, are corresponding to the three depth values of the R subpixel, the G subpixel and the B subpixel.

The conversion method of FIG. 3A can be applied to the four pixels arranged in vertical and/or in horizontal, wherein the coding and decoding system adopts YCbCr 4:0:0 format. As shown in FIG. 3A, the method of assigning selected depth values to RGB subpixels for a colored depth frame packing and depacking comprises a step S01 and a step S02. The step S01 is to obtain one depth value from each of the first pixel depth value, the second pixel depth value, the third pixel depth value and the fourth pixel depth value, wherein the two depth values obtained from the first pixel depth value and the third pixel depth value have interleaved positions, and the two depth values obtained from the second pixel depth value and the fourth pixel depth value have interleaved positions. To be noted, the depth values having "interleaved positions" mean that the depth values are not located at the same column or row. The step S02 is to assign the depth value obtained from the first pixel depth value to an R-subpixel value, a G-subpixel value and a B-subpixel value of the first pixel in a converted RGB format, to assign the depth value obtained from the second pixel depth value to an R-subpixel value, a G-subpixel value and a B-subpixel value of the second pixel in the converted RGB format, to assign the depth value obtained from the third pixel depth value to an R-subpixel value, a G-subpixel value and a B-subpixel value of the third pixel in the converted RGB format, and to assign the depth value obtained from the fourth pixel depth value to an R-subpixel value, a G-subpixel value and a B-subpixel value of the fourth pixel in the converted RGB format. The step S01 is to obtain the depth value corresponding to the geometrical position of the R subpixel of the first pixel from the first pixel depth value, to obtain the depth value corresponding to the geometrical position of the G subpixel of the second pixel from the second pixel depth value, to obtain the depth value corresponding to the geometrical position of the G subpixel of the third pixel from the third pixel depth value, and to obtain the depth value corresponding to the geometrical position of the B subpixel of the fourth pixel from the fourth pixel depth value.

In addition, as shown in FIG. 3B, the circuit 1a of this embodiment comprises an obtaining unit 11 and a depositing unit 12. The obtaining unit 11 is configured for obtaining one depth value from each of the first pixel depth value, the second pixel depth value, the third pixel depth value and the fourth pixel depth value. The two depth values obtained from the first pixel depth value and the third pixel depth value have interleaved positions, and the two depth values obtained from the second pixel depth value and the fourth pixel depth value have interleaved positions. The depositing unit 12 is configured for assigning the depth value obtained from the first pixel depth value to an R-subpixel value, a G-subpixel value and a B-subpixel value of the first pixel in a converted RGB format, assigning the depth value obtained from the second pixel depth value to an R-subpixel value, a G-subpixel value and a B-subpixel value of the second pixel in the converted RGB format, assigning the depth value obtained from the third pixel depth value to an R-subpixel value, a G-subpixel value and a B-subpixel value of the third pixel in the converted RGB format, assigning the depth value obtained from the fourth pixel depth value to an R-subpixel value, a G-subpixel value and a B-subpixel value of the fourth pixel in the converted RGB format. In this embodiment, the obtaining unit 11 and the depositing unit 12 can be carried out by hardware circuits or firmware. In addition, the circuit 1a may comprise a memory unit (not shown), which is electrically connected with the obtaining unit 11 and the depositing unit 12, for storing the subpixel values and depth values before and after the assigning step and/or the recovering step. In one embodiment, the circuit 1a may include, for example, an adder, a subtractor, a multiplier, and/or a divider.

Figure 4A:
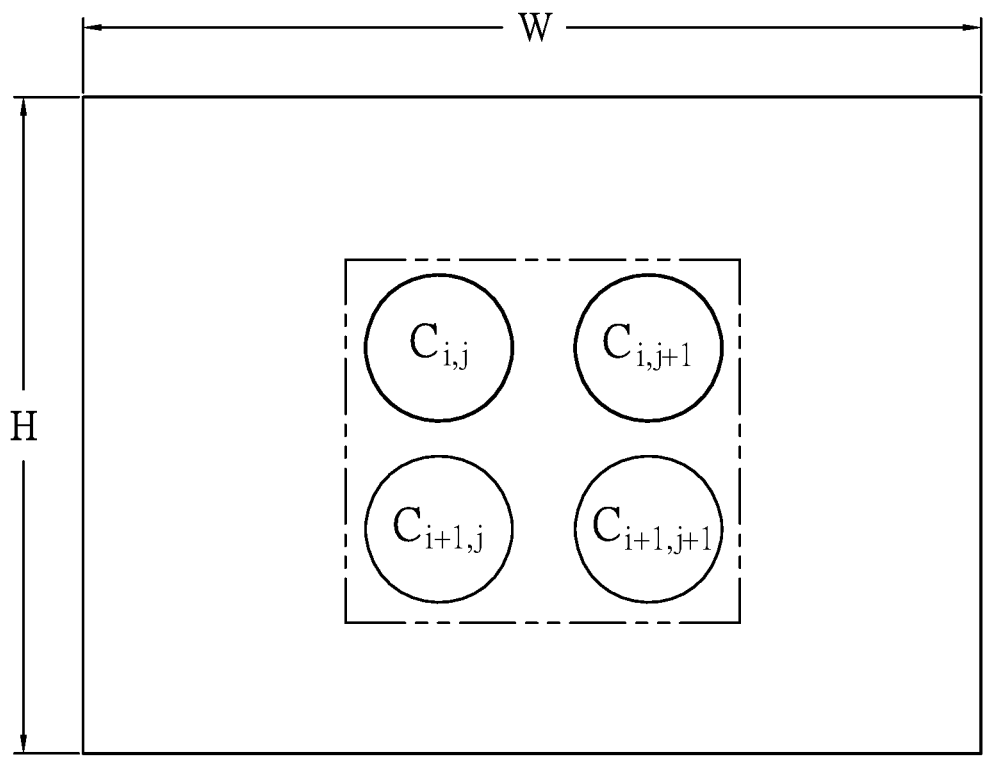
FIG. 4A is a schematic diagram showing a group of four pixels in the depth frame according to an embodiment of the disclosure.
Figure 4B:
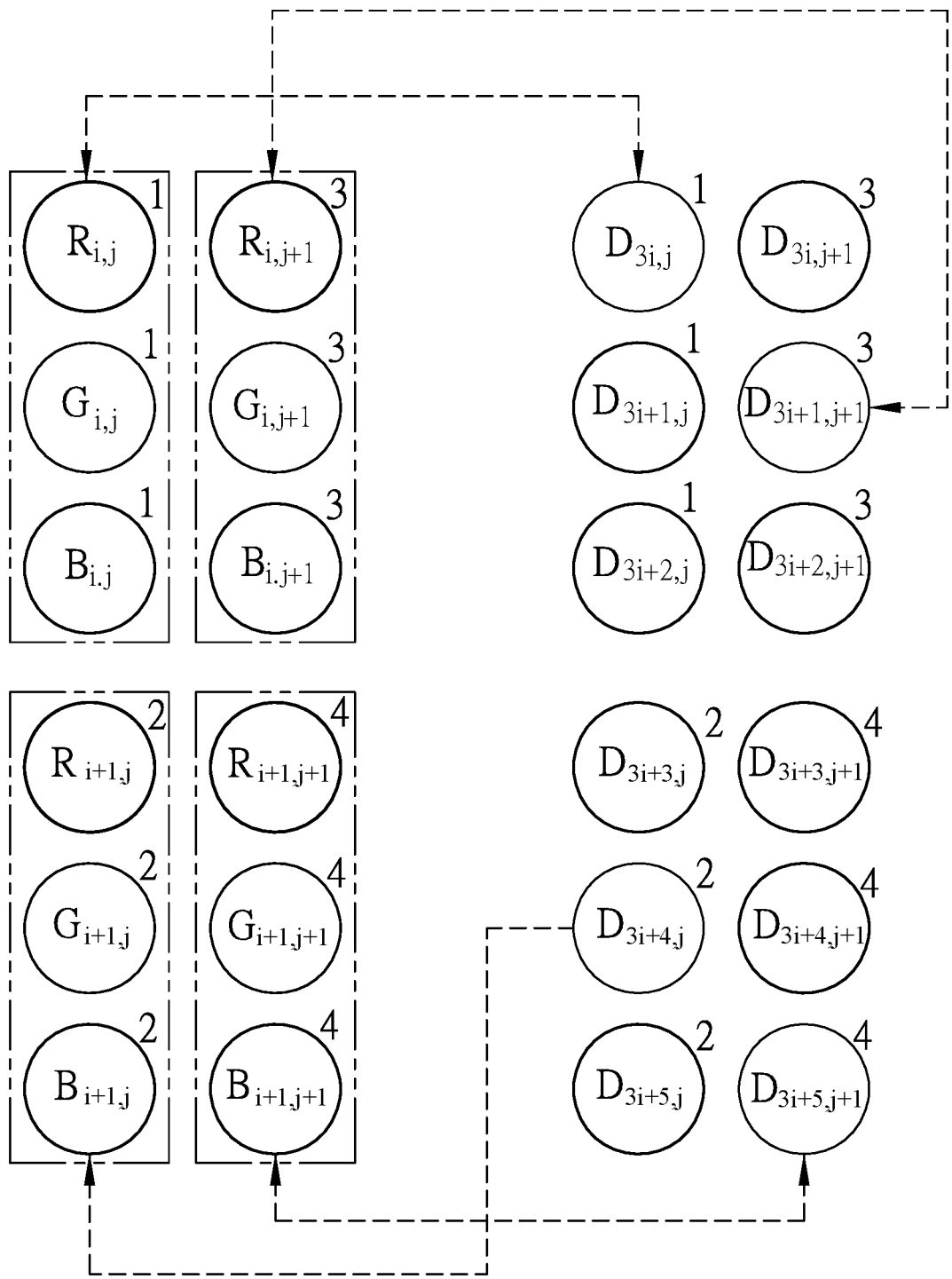
FIGS. 4B and 4C are schematic diagrams showing the RGB format of the group of four pixels and the corresponding depth values of the geometrical positions thereof according to an embodiment of the disclosure.
Figure 4C:
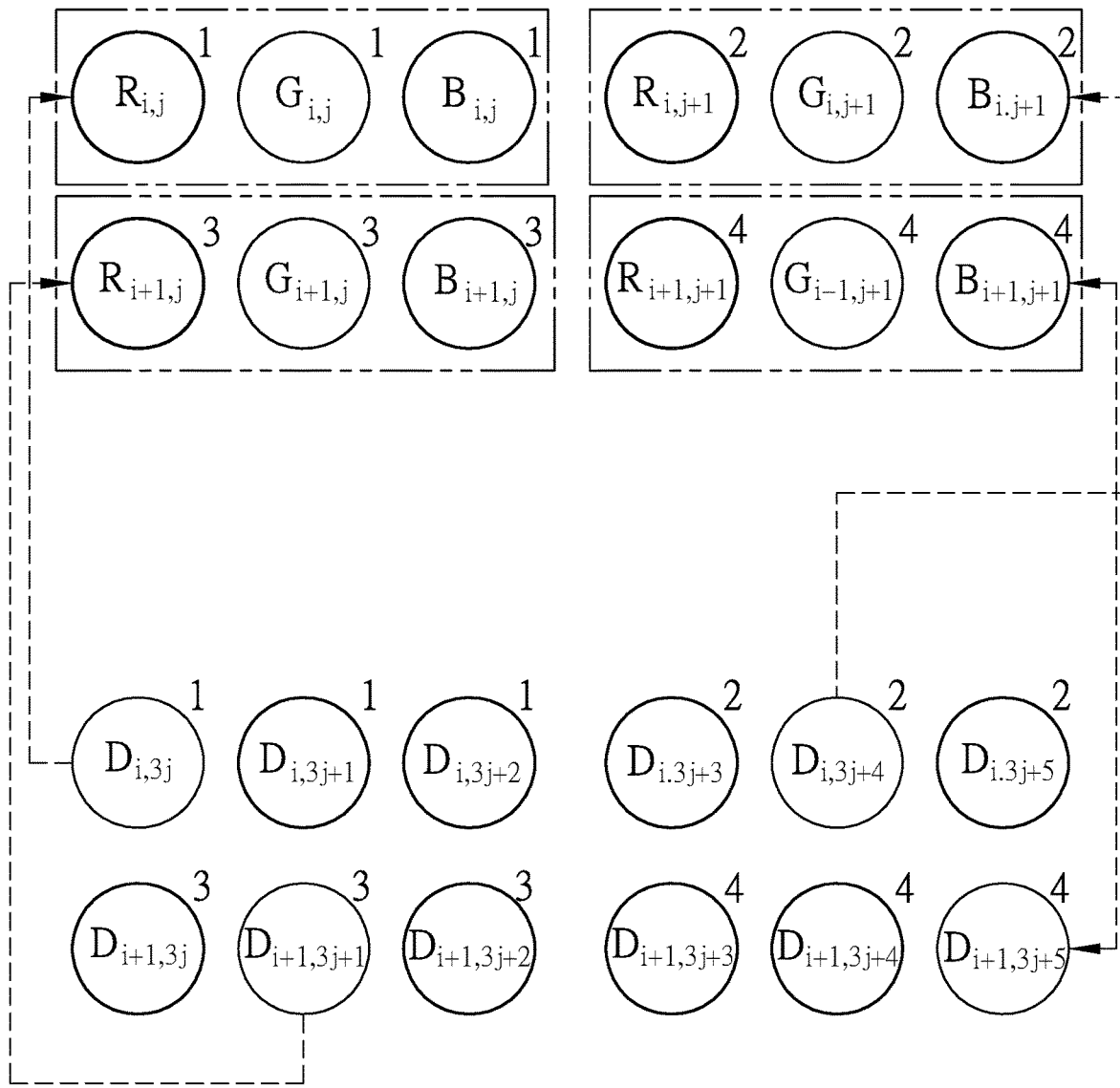

FIG. 4A is a schematic diagram showing a group of four pixels in the depth frame according to an embodiment of the disclosure, and FIGS. 4B and 4C are schematic diagrams showing the RGB format of the group of four pixels and the corresponding depth values of the geometrical positions thereof according to an embodiment of the disclosure. In this embodiment, FIG. 4B shows four pixels arranged in vertical and four pixel depth values, and FIG. 4C shows four pixels arranged in horizontal and four pixel depth values.

As shown in FIG. 4A, the size (resolution) of the depth frame is, for example, H× W. Each group of four pixels comprises four neighboring pixels $\{C_{i,j}, C_{i+1,j}, C_{i,j+1}, C_{i+1,j+1}\}$, and each pixel comprises three subpixels (e.g. R, G and B subpixels). The R, G and B subpixels of each pixel can be arranged in vertical as shown in FIG. 4B, wherein the first pixel comprises $\{R_{i,j}, G_{i,j}, B_{i,j}\}$, the second pixel comprises $\{R_{i+1,j}, G_{i+1,j}, B_{i+1,j}\}$, the third pixel comprises $\{R_{i,j+1}, G_{i,j+1}, B_{i,j+1}\}$, and the fourth pixel comprises $\{R_{i+1,j+1}, G_{i+1,j+1}, B_{i+1,j+1}\}$. Alternatively, the R, G and B subpixels of each pixel can be arranged in horizontal as shown in FIG. 4C, wherein the first pixel comprises $\{R_{i,j}, G_{i,j}, B_{i,j}\}$, the second pixel comprises $\{R_{i,j+1}, G_{i,j+1}, B_{i,j+1}\}$, the third pixel comprises $\{R_{i+1,j}, G_{i+1,j}, B_{i+1,j}\}$, the fourth pixel comprises $\{R_{i+1,j+1}, G_{i+1,j+1}, B_{i+1,j+1}\}$. The geometrical positions of the first pixel, the second pixel, the third pixel and the fourth pixel correspondingly have a first pixel depth value, a second pixel depth value, a third pixel depth value and a fourth pixel depth value, respectively. Since each pixel comprises three subpixels, each pixel depth value corresponding to the geometrical position also comprises three depth values. In the vertical arrangement (FIG. 4B), the first pixel depth value is $\{D_{3i,j}, D_{3i+1,j}, D_{3i+2,j}\}$, the second pixel depth value is $\{D_{3i+3,j}, D_{3i+4,j}, D_{3i+5,j}\}$, the third pixel depth value is $\{D_{3i,j+1}, D_{3i+1,j+1}, D_{3i+2,j+1}\}$, and the fourth pixel depth value is $\{D_{3i+3,j+1}, D_{3i+4,j}, D_{3i+5,j}\}$. Accordingly, the size thereof becomes 3H×W. In the horizontal arrangement (FIG. 4C), the first pixel depth value is $\{D_{i,3j}, D_{i,3j+1}, D_{i,3j+2})\}$, the second pixel depth value is $\{D_{i,3j+3}, D_{i,3j+4}, D_{i,3j+5}\}$, the third pixel depth value is $\{D_{i+1,3j}, D_{i+1,3j+1}, D_{i+1,3j+2})\}$, and the fourth pixel depth value is $\{D_{i+1,3j+3}, D_{i+1,3j+4}, D_{i+1,3j+5}\}$. Accordingly, the size thereof becomes H×3W. Herein, i=0, 2, 4 . . . , (H−2), and j=0, 2, 4 . . . , (W−2).

Referring to FIG. 4B, in the RGB format, the first pixel comprises three subpixels (1) arranged in vertical at the up-left corner, the second pixel comprises three subpixels (2) arranged in vertical at the down-left corner, the third pixel comprises three subpixels (3) arranged in vertical at the up-right corner, and the fourth pixel comprises three subpixels (4) arranged in vertical at the down-right corner. Referring to FIG. 4C, in the RGB format, the first pixel comprises three subpixels (1) arranged in horizontal at the up-left corner, the second pixel comprises three subpixels (2) arranged in horizontal at the up-right corner, the third pixel comprises three subpixels (3) arranged in horizontal at the down-left corner, and the fourth pixel comprises three subpixels (4) arranged in horizontal at the down-right corner. This disclosure is not limited thereto. In some embodiments, the positions of the first to fourth pixels can be changed, and any configuration, which matches the rules that the first pixel is located neighboring the second pixel and the third pixel and the fourth pixel is located neighboring the second pixel and the third pixel, is acceptable.

Specifically, when the coding and decoding system adopts the YCbCr 4:0:0 format, in the four pixels of the embodiment as shown in FIGS. 4B and 4C, the obtaining unit 11 obtains the depth value ($D_{3i,j}$ in FIG. 4B, and $D_{i,3j}$ in FIG. 4C) of the geometrical position corresponding to the R subpixel of the first pixel from the first pixel depth value, the depth value ($D_{3i+4,j}$ in FIG. 4B, and $D_{i,3j+4}$ in FIG. 4C) of the geometrical position corresponding to the G subpixel of the second pixel from the second pixel depth value, the depth value ($D_{3i+1,j+1}$ in FIG. 4B, and $D_{i+1,3j+1}$ in FIG. 4C) of the geometrical position corresponding to the G subpixel of the third pixel from the third pixel depth value, and the depth value ($D_{3i+5,j+1}$ in FIG. 4B, and $D_{i+1,3j+5}$ in FIG. 4C) of the geometrical position corresponding to the B subpixel of the fourth pixel from the fourth pixel depth value. In other words, four depth values $D_{3i,j}$, $D_{3i+4,j}$, $D_{3i+1,j+1}$ and $D_{3i+5,j+1}$ are obtained from the vertically arranged pixel depth values, or four depth values $D_{i,3j}$, $D_{i,3j+4}$, $D_{i+1,3j+1}$ and $D_{i+1,3j+5}$ are obtained from the horizontally arranged pixel depth values. In this case, the depth values $D_{3i,j}$ and $D_{3i+1,j+1}$ have interleaved positions, and the depth values $D_{i,3j+4}$ and $D_{i+1,3j+5}$ have interleaved positions. In other words, only four depth values are selected from the vertically or horizontally arranged pixel depth values, and then used in the following packing and depacking processes.

Next, the depositing unit 12 is configured for assigning the depth value obtained from the first pixel depth value to an R-subpixel value, a G-subpixel value and a B-subpixel value of the first pixel in a converted RGB format, assigning the depth value obtained from the second pixel depth value to an R-subpixel value, a G-subpixel value and a B-subpixel value of the second pixel in the converted RGB format, assigning the depth value obtained from the third pixel depth value to an R-subpixel value, a G-subpixel value and a B-subpixel value of the third pixel in the converted RGB format, assigning the depth value obtained from the fourth pixel depth value to an R-subpixel value, a G-subpixel value and a B-subpixel value of the fourth pixel in the converted RGB format. Specifically, in the packing step for the case of FIG. 4B (vertical arrangement), the four selected depth values are assigned (deposited) to the twelve RGB subpixels as follow:

$$R_{i,j}=G_{i,j}=B_{i,j}=D_{3i,j}, \quad (1)$$

$$R_{i+1,j}=G_{i+1,j}=B_{i+1,j}=D_{3i+4,j}, \quad (2)$$

$$R_{i,j+1}=G_{i,j+1}=B_{i,j+1}=D_{3i+1,j+1}, \quad (3)$$

$$R_{i+1,j+1}=G_{i+1,j+1}=B_{i+1,j+1}=D_{3i+5,j+1} \quad (4)$$

Alternatively, in the packing step for the case of FIG. 4C (horizontal arrangement), the four selected depth values are assigned (deposited) to the twelve RGB subpixels as follow:

$$R_{i,j}=G_{i,j}=B_{i,j}=D_{i,3j}, \quad (5)$$

$$R_{i,j+1}=G_{i,j+1}=B_{i,j+1}=D_{i,3j+4}, \quad (6)$$

$$R_{i+1,j}=G_{i+1,j}=B_{i+1,j}=D_{i+1,3j+1}, \quad (7)$$

$$R_{i+1,j+1}=G_{i+1,j+1}=B_{i+1,j+1}=D_{i+1,3j+5} \quad (8)$$

Accordingly, the twelve subpixel values in the converted RGB format can be obtained according to the selected four depth values.

FIGS. 5A and 5B are schematic diagrams showing the conversion and inverse conversion in color space between RGB format and YCbCr format in the video coding system according to different embodiments of this disclosure.

Referring to FIGS. 4B and 4C in view of FIGS. 5A and 5B, since the above equations (1)~(4) or (5)~(8) are to assign the same depth value to the RGB subpixel values of one pixel, all Chroma parameter values (Cb, Cr) will be equal to 128 after processed by the conversion matrix of RGB to YCbCr Chroma space conversion (Table 1). Accordingly, the four RGB format pixels having the selected depth values can be converted to obtain four YCbCr format data of $\{Y_{i,j}, 128, 128\}$, $\{Y_{i,j+1}, 128, 128\}$, $\{Y_{i+1,j}, 128, 128\}$ and $\{Y_{i+1,j+1}, 128, 128\}$. Normally, as shown in FIG. 5A, with ignoring the coding error, the four YCbCr format data of $\{Y_{i,j}, 128, 128\}$, $\{Y_{i,j+1}, 128, 128\}$, $\{Y_{i+1,j}, 128, 128\}$ and $\{Y_{i+1,j+1}, 128, 128\}$ can be processed by the image coding system to obtain four encoded data of $\{Y_{i,j}, Cb'_{i,j}, Cr'_{i,j}\}$, $\{Y_{i,j+1}, Cb'_{i,j}, Cr'_{i,j}\}$, $\{Y_{i+1,j}, Cb'_{i,j}, Cr'_{i,j}\}$ and $\{Y_{i+1,j+1}, Cb'_{i,j}, Cr'_{i,j}\}$.

After the receiving end receives these data followed by the decompression process, four data of $\{Y_{i,j}, Cb'_{i,j}, Cr'_{i,j}\}$, $\{Y_{i,j+1}, Cb'_{i,j}, Cr'_{i,j}\}$, $\{Y_{i+1,j}, Cb'_{i,j}, Cr'_{i,j}\}$ and $\{Y_{i+1,j+1}, Cb'_{i,j}, Cr'_{i,j}\}$ can be obtained (see FIG. 5A). Then, the Chroma parameters are adjusted to recover and obtain the four original YCbCr format data. Afterwards, the inverse conversion matrix of YCbCr to RGB Chroma space conversion (Table 2) is applied to the obtained four original YCbCr format data for recovering the original four groups of RGB format subpixels (totally 12 subpixels) of $\{R_{i,j}, G_{i,j}, B_{i,j}\}$, $\{R_{i+1,j}, G_{i+1,j}, B_{i+1,j}\}$, $\{R_{i,j+1}, G_{i,j+1}, B_{i,j+1}\}$ and $\{R_{i+1,j+1}, G_{i+1,j+1}, B_{i+1,j+1}\}$. To be noted, the recovered twelve subpixel values can satisfy the above equations (1)~(4) and (5)~(8) and comprise the above-mentioned four selected depth values ($D_{3i,j}$, $D_{3i+4,j}$, $D_{3i+1,j+1}$ and $D_{3i+5,j+1}$ in the vertical arrangement, and $D_{i,3j}$, $D_{i,3j+4}$, $D_{i+1,3j+1}$ and $D_{i+1,3j+5}$ in the horizontal arrangement).

Normally, as shown in FIG. 5B, with ignoring the coding error, the four YCbCr format data of $\{Y_{i,j}, 128, 128\}$, $\{Y_{i,j+1}, 128, 128\}$, $\{Y_{i+1,j}, 128, 128\}$ and $\{Y_{i+1,j+1}, 128, 128\}$ can be processed by the image coding system to obtain four encoded data of $\{Y_{i,j}, Cb'_{i,j}, Cr'_{i,j}\}$, $\{Y_{i,j}+1, Cb'_{i,j}, Cr'_{i,j}\}$, $\{Y_{i+1,j}, Cb'_{i,j}, Cr'_{i,j}\}$ and $\{Y_{i+1,j+1}, Cb'_{i,j}, Cr'_{i,j}\}$. After the Chroma space conversion (from YCbCr to RGB), four groups of R'G'B' format data can be obtained (see FIG. 5B). Accordingly, the receiving end cannot directly obtain the above four data of $\{Y_{i,j}, Cb'_{i,j}, Cr'_{i,j}\}$, $\{Y_{i,j+1}, Cb'_{i,j}, Cr'_{i,j}\}$, $\{Y_{i+1,j}, Cb'_{i,j}, Cr'_{i,j}\}$ and $\{Y_{i+1,j+1}, Cb'_{i,j}, Cr'_{i,j}\}$ during the decomprssion procedure, but can obtain the converted four groups of R'G'B' format data only. Thus, an additional Chroma space conversion for converting the R'G'B' format data to the YCb'Cr' format data is performed in advance for obtaining $\{Y_{i,j}, Cb'_{i,j}, Cr'_{i,j}\}$, $\{Y_{i,j+1}, Cb'_{i,j}, Cr'_{i,j}\}$, $\{Y_{i+1,j}, Cb'_{i,j}, Cr'_{i,j}\}$ and $\{Y_{i+1,j+1}, Cb'_{i,j}, Cr'_{i,j}\}$. Then, the Chroma parameters are adjusted to recover and obtain the four original YCbCr format data of $\{Y_{i,j}, 128, 128\}$, $\{Y_{i,j+1}, 128, 128\}$, $\{Y_{i+1,j}, 128, 128\}$ and $\{Y_{i+1,j+1}, 128, 128\}$. Afterwards, the inverse conversion matrix of YCbCr to RGB Chroma space conversion is applied to the obtained four original YCbCr format data for recovering the original four groups of RGB format subpixels (totally 12 subpixels) of $\{R_{i,j}, G_{i,j}, B_{i,j}\}$, $\{R_{i+1,j}, G_{i+1,j}, B_{i+1,j}\}$, $\{R_{i,j+1}, G_{i,j+1}, B_{i,j+1}\}$ and $\{R_{i+1,j+1}, G_{i+1,j+1}, B_{i+1,j+1}\}$. To be noted, the recovered twelve subpixel values can satisfy the above equations (1)~(4) and (5)~(8) and comprise the above-mentioned four selected depth values ($D_{3i,j}$, $D_{3i+4,j}$, $D_{3i+1,j+1}$ and $D_{3i+5,j+1}$ in the vertical arrangement, and $D_{i,3j}$, $D_{i,3j+4}$, $D_{i+1,3j+1}$ and $D_{i+1,3j+5}$ in the horizontal arrangement).

Accordingly, the four selected depth values can be directly obtained without adjustment by the method of recovering the selected depth values from the RGB subpixels for colored depth frame packing and depacking of this disclosure. The detailed content of the method of recovering the selected depth values from the RGB subpixels will be described hereinafter with reference to FIGS. 6A and 6B in view of FIGS. 4B and 4C.

Figure 6A:
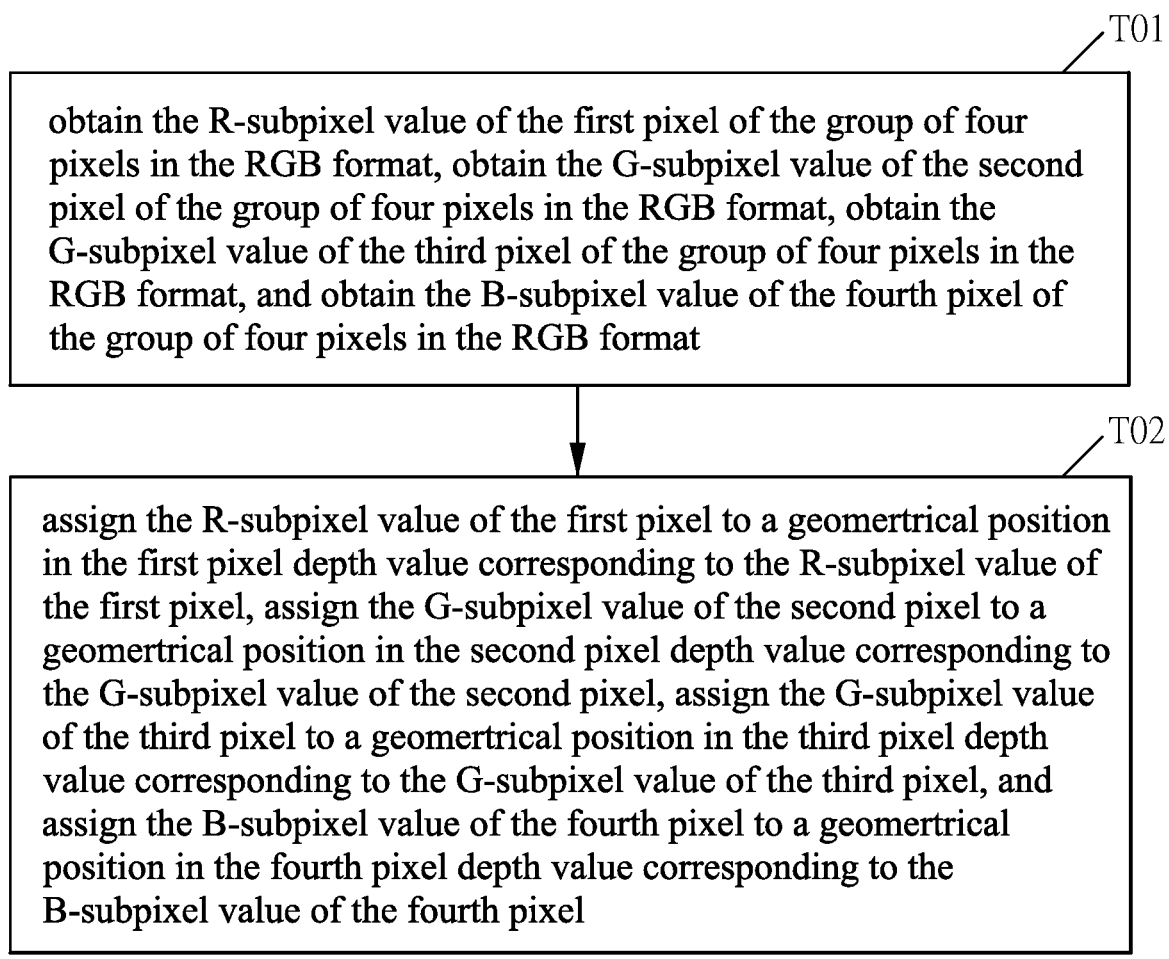
FIG. 6A is a flow chart showing a method of recovering the selected depth values from the RGB subpixels for colored depth frame packing and depacking according to an embodiment of this disclosure.
Figure 6B:
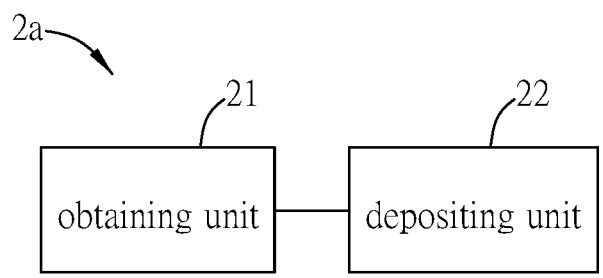
FIG. 6B is a block diagram showing a circuit of recovering the selected depth values from the RGB subpixels for colored depth frame packing and depacking according to an embodiment of this disclosure.

FIG. 6A is a flow chart showing a method of recovering the selected depth values from the RGB subpixels for colored depth frame packing and depacking according to an embodiment of this disclosure, and FIG. 6B is a block diagram showing a circuit 2a of recovering the selected depth values from the RGB subpixels for colored depth frame packing and depacking according to an embodiment of this disclosure. The recovering method of FIG. 6A can be applied to the four pixels arranged in vertical or in horizontal, wherein the coding and decoding system adopts YCbCr 4:0:0 format. The recovering (inverse conversion) method of FIG. 6A is corresponding to the assigning (conversion) method of FIG. 3A.

As mentioned above, after the processes of the video compression and decompression system and the Chroma space conversion and inverse conversion as shown in FIGS.

5A and 5B, the twelve original RGB format subpixels of $\{R_{i,j}, G_{i,j}, B_{i,j}\}$, $\{R_{i+1,j}, G_{i+1,j}, B_{i+1,j}\}$, $\{R_{i,j+1}, G_{i,j+1}, B_{i,j+1}\}$ and $\{R_{i+1,j+1}, G_{i+1,j+1}, B_{i+1,j+1}\}$ can be obtained. The twelve subpixel values can satisfy the above equations (1)~(4) and (5)~(8) and comprise the above-mentioned four selected depth values ($D_{3i,j}$, $D_{3i+4,j}$, $D_{3i+1,j+1}$ and $D_{3i+5,j+1}$ in the vertical arrangement, and $D_{i,3j}$, $D_{i,3j+4}$, $D_{i+1,3j+1}$ and $D_{i+1,3j+5}$ in the horizontal arrangement). Accordingly, the method of recovering the selected depth values from the RGB subpixels of this disclosure can recover the obtained RGB format data to obtain four selected depth values.

As shown in FIG. 6A, the method of recovering the selected depth values from the RGB subpixels for colored depth frame packing and depacking comprises a step T01 and a step T02. The step T01 is to obtain the R-subpixel value of the first pixel of the group of four pixels in the RGB format, to obtain the G-subpixel value of the second pixel of the group of four pixels in the RGB format, to obtain the G-subpixel value of the third pixel of the group of four pixels in the RGB format, and to obtain the B-subpixel value of the fourth pixel of the group of four pixels in the RGB format. The step T02 is to assign the R-subpixel value of the first pixel to a geometrical position in the first pixel depth value corresponding to the R-subpixel value of the first pixel, to assign the G-subpixel value of the second pixel to a geometrical position in the second pixel depth value corresponding to the G-subpixel value of the second pixel, to assign the G-subpixel value of the third pixel to a geometrical position in the third pixel depth value corresponding to the G-subpixel value of the third pixel, and to assign the B-subpixel value of the fourth pixel to a geometrical position in the fourth pixel depth value corresponding to the B-subpixel value of the fourth pixel.

Specifically, when the coding and decoding system adopts the YCbCr 4:0:0 format, in the four pixels of the embodiment as shown in FIG. 6B, the circuit 2a comprises an obtaining unit 21 and a depositing unit 22. The obtaining unit 21 is electrically connected with the depositing unit 22. The obtaining unit 21 is configured for obtaining the R-subpixel value of the first pixel of the group of four pixels in the RGB format, obtaining the G-subpixel value of the second pixel of the group of four pixels in the RGB format, obtaining the G-subpixel value of the third pixel of the group of four pixels in the RGB format, and obtaining the B-subpixel value of the fourth pixel of the group of four pixels in the RGB format. The depositing unit 22 is configured for assigning the R-subpixel value of the first pixel to a geometrical position in the first pixel depth value corresponding to the R-subpixel value of the first pixel, assigning the G-subpixel value of the second pixel to a geometrical position in the second pixel depth value corresponding to the G-subpixel value of the second pixel, assigning the G-subpixel value of the third pixel to a geometrical position in the third pixel depth value corresponding to the G-subpixel value of the third pixel, and assigning the B-subpixel value of the fourth pixel to a geometrical position in the fourth pixel depth value corresponding to the B-subpixel value of the fourth pixel. In this embodiment, the obtaining unit 21 and the depositing unit 22 can be carried out by hardware circuits or firmware. In addition, the circuit 2a may comprise a memory unit (not shown), which is electrically connected with the obtaining unit 21 and the depositing unit 22, for storing the subpixel values and depth values before and after the assigning step and/or the recovering step. In one embodiment, the circuit 2a may include, for example, an adder, a subtractor, a multiplier, and/or a divider.

The recovering method will be described hereinafter with reference to FIGS. 4B and 4C. Specifically, in the depacking step for the case of FIG. 4B (vertical arrangement), the subpixel values of the twelve RGB subpixels obtained by the Chroma space inverse conversion of the receiving end can be recovered to obtain the four selected depth values as follow:

$$D_{3i,j}=R_{i,j}, \quad (9)$$

$$D_{3i+4,j}=G_{i+1,j}, \quad (10)$$

$$D_{3i+1,j+1}=G_{i,j+1}, \quad (11)$$

$$D_{3i+5,j+1}=B_{i+1,j+1}. \quad (12)$$

In the depacking step for the case of FIG. 4C (horizontal arrangement), the subpixel values of the twelve RGB subpixels obtained by the Chroma space inverse conversion of the receiving end can be recovered to obtain the four selected depth values as follow:

$$D_{i,3j}=R_{i,j}, \quad (13)$$

$$D_{i,3j+4}=G_{i,j+1}, \quad (14)$$

$$D_{i+1,3j+1}=G_{i+1,j}, \quad (15)$$

$$D_{i+1,3j+5}=B_{i+1,j+1} \quad (16)$$

Accordingly, the RGB format data obtained by the Chroma space inverse conversion of the receiving end can be directly recovered without any adjustment to obtain the above-mentioned four selected depth values. The other eight depth values can be obtained by interpolation method according to the four selected depth values and the related conversion information, thereby obtaining a better conversion to recover the original depth values. Compared with the conventional art, which replaces the lacked Chroma values by the remained neighboring Chroma values, this embodiment can directly recover multiple depth values of the image data from the obtained RGB format data, thereby improving the distortion around the area having large (or dramatic) depth gap. The detailed technical content of the interpolation method can be referred to Taiwan Patent Application No. 106135377 filed by the inventor of this disclosure, wherein the above reference is incorporated herein in its entirety by reference.

The embodiment in which the coding and decoding system adopts YCbCr 4:2:0 format will be described hereinafter.

FIG. 7A is a flow chart showing a method of assigning selected depth values to RGB subpixels for colored depth frame packing and depacking according to another embodiment of the disclosure.

The four pixels of each group can be arranged in vertical or in horizontal, and the four pixels comprises a first pixel, a second pixel, a third pixel and a fourth pixel. The first pixel is located neighboring the second pixel and the third pixel, and the fourth pixel is located neighboring the second pixel and the third pixel. In this embodiment, each group of four pixels totally comprises twelve subpixels. The R subpixel, the G subpixel and the B subpixel of each pixel can be arranged in vertical, which means that the R subpixel, the G subpixel and the B subpixel of each pixel of each pixel are disposed in the same column. Alternatively, the R subpixel, the G subpixel and the B subpixel of each pixel can be arranged in horizontal, which means that the R subpixel, the G subpixel and the B subpixel of each pixel of each pixel are disposed in the same row. In addition, the geometrical positions of the first pixel, the second pixel, the third pixel and the fourth pixel correspondingly have a first pixel depth value, a second pixel depth value, a third pixel depth value and a fourth pixel depth value, respectively. In other words, the geometrical position of the first pixel correspondingly has a first pixel depth value, the geometrical position of the second pixel correspondingly has a second pixel depth value, the geometrical position of the third pixel correspondingly has a third pixel depth value, and the geometrical position of the fourth pixel correspondingly has a fourth pixel depth value. Since each pixel has vertically or horizontally arranged subpixels, each of the first pixel depth value, the second pixel depth value, the third pixel depth value and the fourth pixel depth value at the geometrical positions corresponding to the first pixel, the second pixel, the third pixel and the fourth pixel has three depth values corresponding to the R subpixel, the G subpixel and the B subpixel.

The conversion method of FIG. 7A can be applied to the four pixels arranged in vertical or in horizontal, wherein the coding and decoding system adopts YCbCr 4:2:0 format. As shown in FIG. 7A, the method of assigning selected depth values to RGB subpixels for a colored depth frame packing and depacking comprises a step U01 and a step U02. The step U01 is to obtain two depth values from each of the first pixel depth value and the fourth pixel depth value, and to obtain one depth value from each of the second pixel depth value and the third pixel depth value, wherein the six depth values obtained from the first pixel depth value, the second pixel depth value, the third pixel depth value and the fourth pixel depth value have interleaved positions. To be noted, the depth values having "interleaved positions" mean that the depth values are not located at the same column or row. The step U02 is to assign one of the two depth values obtained from the first pixel depth value to an R-subpixel value of the first pixel in a converted RGB format, to assign the other one of the two depth values obtained from the first pixel depth value to a B-subpixel value of the first pixel in the converted RGB format, to assign the depth value obtained from the second pixel depth value to an R-subpixel value, a G-subpixel value and a B-subpixel value of the second pixel in the converted RGB format, to assign the depth value obtained from the third pixel depth value to an R-subpixel value, a G-subpixel value and a B-subpixel value of the third pixel in the converted RGB format, to assign one of the two depth values obtained from the fourth pixel depth value to a G-subpixel value of the first pixel in the converted RGB format, and to assign the other one of the two depth values obtained from the fourth pixel depth value to an R-subpixel value, a G-subpixel value and a B-subpixel value of the fourth pixel in the converted RGB format.

In the step U01 of obtaining the depth values, the depth values of the geometrical positions corresponding to the R subpixel and the B subpixel of the first pixel are obtained from the first pixel depth value, the depth value of the geometrical position corresponding to the G subpixel of the second pixel is obtained from the second pixel depth value, the depth value of the geometrical position corresponding to the G subpixel of the third pixel is obtained from the third pixel depth value, and the depth values of the geometrical positions corresponding to the R subpixel and the B subpixel of the fourth pixel are obtained from the fourth pixel depth value. In the step U02 of assigning to the converted RGB format, the depth value obtained from the first pixel depth value corresponding to the geometrical position of the R subpixel of the first pixel is assigned to the R-subpixel value of the first pixel in the converted RGB format, the depth value obtained from the first pixel depth value corresponding to the geometrical position of the B subpixel of the first pixel is assigned to the B-subpixel value of the first pixel in the converted RGB format, the depth value obtained from the second pixel depth value corresponding to the geometrical position of the G subpixel of the second pixel is assigned to the R-subpixel value, the G-subpixel value and the B-subpixel value of the second pixel in the converted RGB format, the depth value obtained from the third pixel depth value corresponding to the geometrical position of the G subpixel of the third pixel is assigned to the R-subpixel value, the G-subpixel value and the B-subpixel value of the third pixel in the converted RGB format, the depth value obtained from the fourth pixel depth value corresponding to the geometrical position of the R subpixel of the fourth pixel is assigned to the G-subpixel value of the first pixel in the converted RGB format, and the depth value obtained from the fourth pixel depth value corresponding to the geometrical position of the B subpixel of the fourth pixel is assigned to the R-subpixel value, the G-subpixel value and the B-subpixel value of the fourth pixel in the converted RGB format.

In addition, with reference to FIG. 3B, the obtaining unit 11 of the circuit 1a is configured for obtaining two depth values from each of the first pixel depth value and the fourth pixel depth value, and obtaining one depth value from each of the second pixel depth value and the third pixel depth value. The six depth values obtained from the first pixel depth value, the second pixel depth value, the third pixel depth value and the fourth pixel depth value have interleaved positions. The depositing unit 12 is configured for assigning one of the two depth values obtained from the first pixel depth value to an R-subpixel value of the first pixel in a converted RGB format, assigning the other one of the two depth values obtained from the first pixel depth value to a B-subpixel value of the first pixel in the converted RGB format, assigning the depth value obtained from the second pixel depth value to an R-subpixel value, a G-subpixel value and a B-subpixel value of the second pixel in the converted RGB format, assigning the depth value obtained from the third pixel depth value to an R-subpixel value, a G-subpixel value and a B-subpixel value of the third pixel in the converted RGB format, assigning one of the two depth values obtained from the fourth pixel depth value to a G-subpixel value of the first pixel in the converted RGB format, and assigning the other one of the two depth values obtained from the fourth pixel depth value to an R-subpixel value, a G-subpixel value and a B-subpixel value of the fourth pixel in the converted RGB format.

Figure 7B:
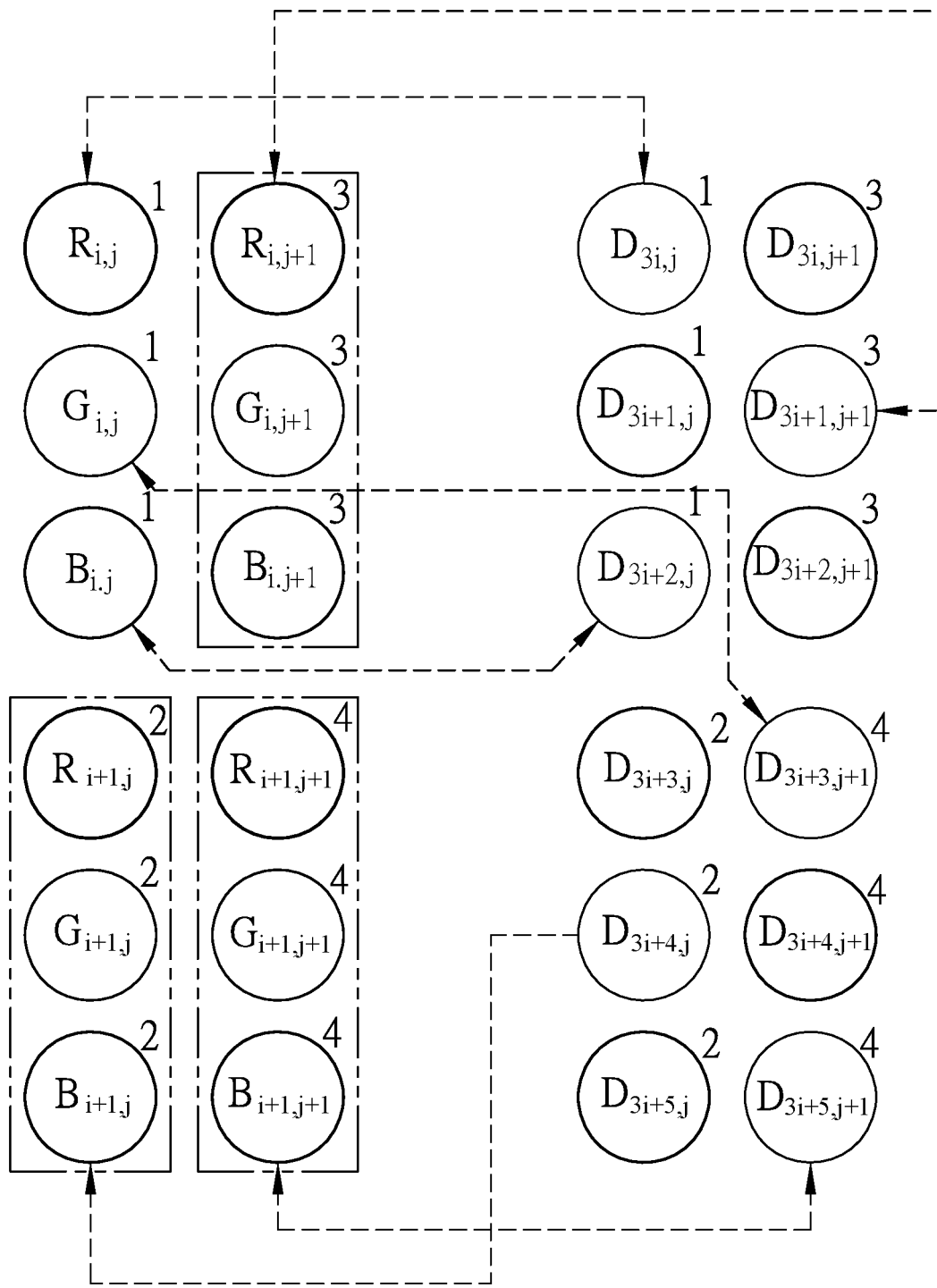
FIGS. 7B and 7C are schematic diagrams showing the RGB format of a group of four pixels and the corresponding depth values of the geometrical positions thereof according to another embodiment of the disclosure.
Figure 7C:
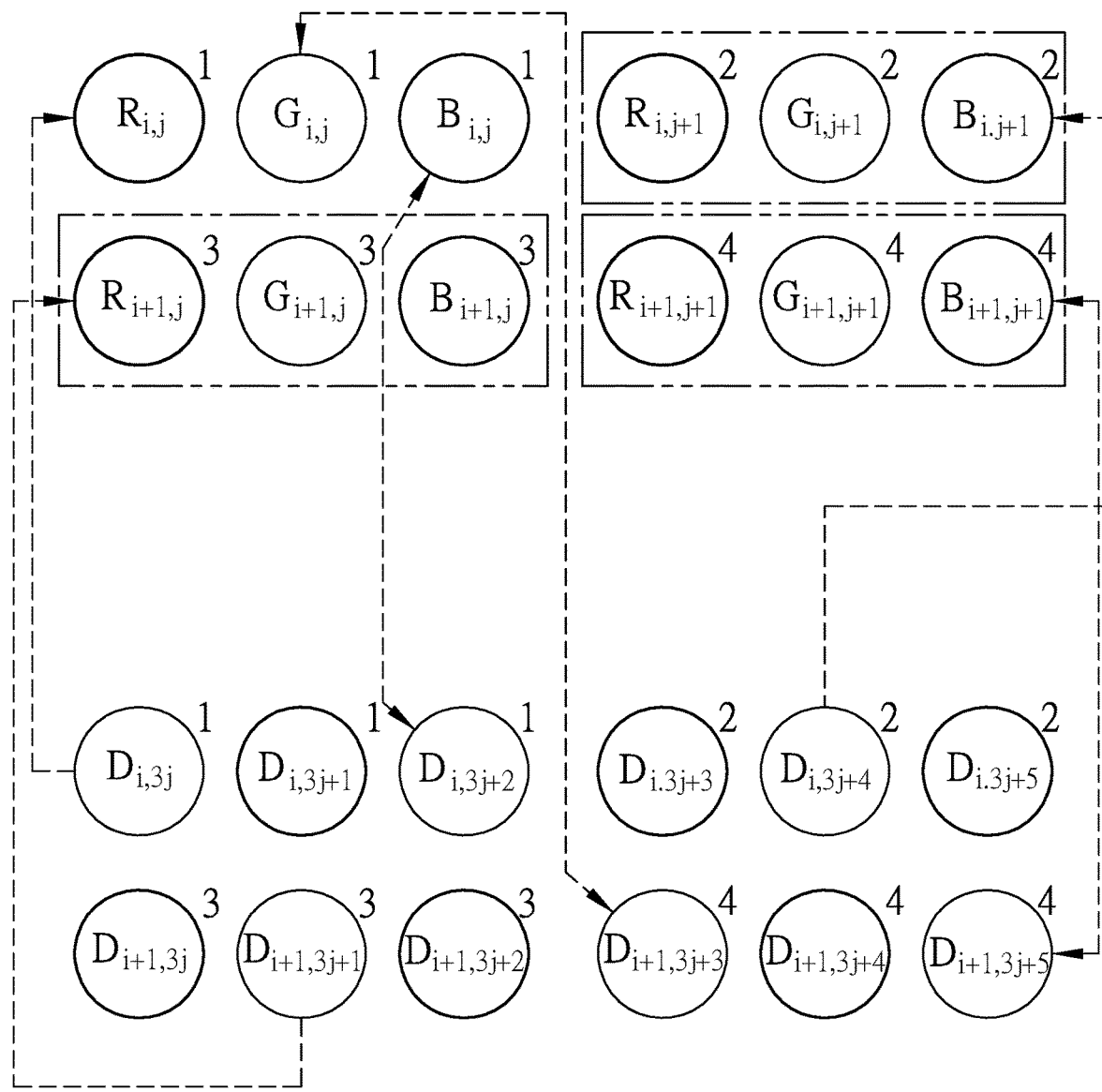

FIGS. 7B and 7C are schematic diagrams showing the RGB format of a group of four pixels and the corresponding depth values of the geometrical positions thereof according to another embodiment of the disclosure. In this embodiment, FIG. 7B shows four pixels arranged in vertical and four pixel depth values, and FIG. 7C shows four pixels arranged in horizontal and four pixel depth values.

In one group of four pixels of the depth frame, the R, G and B subpixels of each pixel are arranged in vertical as shown in FIG. 7B, wherein the first pixel comprises $\{R_{i,j}, G_{i,j}, B_{i,j}\}$, the second pixel comprises $\{R_{i+1,j}, G_{i+1,j}, B_{i+1,j}\}$, the third pixel comprises $\{R_{i,j+1}, G_{i,j+1}, B_{i,j+1}\}$, and the fourth pixel comprises $\{R_{i+1,j+1}, G_{i+1,j+1}, B_{i+1,j+1}\}$. Alternatively, the R, G and B subpixels of each pixel can be arranged in horizontal as shown in FIG. 7C, wherein the first pixel comprises $\{R_{i,j}, G_{i,j}, B_{i,j}\}$, the second pixel comprises $\{R_{i,j+1}, G_{i,j+1}, B_{i,j+1}\}$, the third pixel comprises $\{R_{i+1,j}, G_{i+1,j}, B_{i+1,j}\}$, and the fourth pixel comprises $\{R_{i+1,j+1},$ $G_{i+1,j+1}$, $B_{i+1,j+1}$}. The geometrical positions of the first pixel, the second pixel, the third pixel and the fourth pixel correspondingly have a first pixel depth value, a second pixel depth value, a third pixel depth value and a fourth pixel depth value, respectively. Since each pixel comprises three subpixels, each pixel depth value corresponding to the geometrical position also comprises three depth values. In the vertical arrangement (FIG. 7B), the first pixel depth value is {$D_{3i,j}$, $D_{3i+1,j}$, $D_{3i+2,j}$}, the second pixel depth value is {$D_{3i+3,j}$, $D_{3i+4,j}$, $D_{3i+5,j}$}, the third pixel depth value is {$D_{3i,j+1}$, $D_{3i+1,j+1}$, $D_{3i+2,j+1}$}, and the fourth pixel depth value is {$D_{3i+3,j+1}$, $D_{3i+4,j+1}$, $D_{3i+5,j+1}$}. Accordingly, the size thereof becomes 3H×W. In the horizontal arrangement (FIG. 7C), the first pixel depth value is {$D_{i,3j}$, $D_{i,3j+1}$, $D_{i,3j+2}$}, the second pixel depth value is {$D_{i,3j+3}$, $D_{i,3j+4}$, $D_{i,3j+5}$}, the third pixel depth value is {$D_{i+1,3j}$, $D_{i+1,3j+1}$, $D_{i+1,3j+2}$}, and the fourth pixel depth value is {$D_{i+1,3j+3}$, $D_{i+1,3j+4}$, $D_{i+1,3j+5}$}. Accordingly, the size thereof becomes H×3W. Herein, i=0, 2, 4 . . . , (H−2), and j=0, 2, 4 . . . , (W−2).

Specifically, when the coding and decoding system adopts the YCbCr 4:2:0 format, in the four pixels of the embodiment as shown in FIGS. 7B and 7C, the obtaining unit 11 obtains the depth values of the geometrical position corresponding to the R subpixel and the B subpixel of the first pixel from the first pixel depth value, the depth value of the geometrical position corresponding to the G subpixel of the second pixel from the second pixel depth value, the depth value of the geometrical position corresponding to the G subpixel of the third pixel from the third pixel depth value, and the depth values of the geometrical position corresponding to the R subpixel and the B subpixel of the fourth pixel from the fourth pixel depth value. In other words, six depth values $D_{3i,j}$, $D_{3i+2,j}$, $D_{3i+4,j}$, $D_{3i+1,j+1}$, $D_{3i+3,j+1}$ and $D_{3i+5,j+1}$ are obtained from the vertically arranged pixel depth values, or six depth values $D_{i,3j}$, $D_{i,3j+2}$, $D_{i,3j+4}$, $D_{i+1,3j+1}$, $D_{i+1,3j+3}$ and $D_{i+1,3j+5}$ are obtained from the horizontally arranged pixel depth values. In this case, the depth values $D_{3i,j}$, $D_{3i+2,j}$, $D_{3i+4,j}$, $D_{3i+1,j+1}$, $D_{3i+3,j+1}$ and $D_{3i+5,j+1}$ have interleaved positions, and the depth values $D_{i,3j}$, $D_{i,3j+2}$, $D_{i,3j+4}$, $D_{i+1,3j+1}$, $D_{i+1,3j+3}$ and $D_{i+1,3j+5}$ have interleaved positions. In other words, only six depth values are selected from the vertically or horizontally arranged pixel depth values, and then used in the following packing and depacking processes.

Next, the depositing unit 12 is configured for assigning the depth value obtained from the first pixel depth value corresponding to the geometrical position of the R subpixel of the first pixel to the R-subpixel value of the first pixel in the converted RGB format, assigning the depth value obtained from the first pixel depth value corresponding to the geometrical position of the B subpixel of the first pixel to the B-subpixel value of the first pixel in the converted RGB format, assigning the depth value obtained from the second pixel depth value corresponding to the geometrical position of the G subpixel of the second pixel to the R-subpixel value, the G-subpixel value and the B-subpixel value of the second pixel in the converted RGB format, assigning the depth value obtained from the third pixel depth value corresponding to the geometrical position of the G subpixel of the third pixel to the R-subpixel value, the G-subpixel value and the B-subpixel value of the third pixel in the converted RGB format, assigning the depth value obtained from the fourth pixel depth value corresponding to the geometrical position of the R subpixel of the fourth pixel to the G-subpixel value of the first pixel in the converted RGB format, and assigning the depth value obtained from the fourth pixel depth value corresponding to the geometrical position of the B subpixel of the fourth pixel to the R-subpixel value, the G-subpixel value and the B-subpixel value of the fourth pixel in the converted RGB format. Specifically, in the packing step for the case of FIG. 7B (vertical arrangement), the six selected depth values are assigned (deposited) to the twelve RGB subpixels as follow:

$$R_{i,j}=D_{3i,j}, \tag{17}$$

$$G_{i,j}=D_{3i+3,j+1}, \tag{18}$$

$$B_{i,j}=D_{3i+1,j}, \tag{19}$$

$$R_{i+1,j}=G_{i+1,j}=B_{i+1,j}=D_{3i+4,j}, \tag{20}$$

$$R_{i,j+1}=G_{i,j}+B_{i,j+1}=D_{3i+1,j+1}, \tag{21}$$

$$R_{i+1,j+1}=G_{i+1,j+1}=B_{i+1,j+1}=D_{3i+5,j+1}, \tag{22}$$

Alternatively, in the packing step for the case of FIG. 7C (horizontal arrangement), the six selected depth values are assigned (deposited) to the twelve RGB subpixels as follow:

$$R_{i,j}=D_{i,3j}, \tag{23}$$

$$G_{i,j}=D_{i+1,3j+3}, \tag{24}$$

$$B_{i,j}=D_{i,3j+2}, \tag{25}$$

$$R_{i,j+1}=G_{i,j}+=B_{i,j+1}=D_{i,3j+4}, \tag{26}$$

$$R_{i+1,j}=G_{i+1,j}=B_{i+1,j}=D_{i+1,3j+1}, \tag{27}$$

$$R_{i+1,j+1}=G_{i+1,j+1}=B_{i+1,j+1}=D_{i+1,3j+5}, \tag{28}$$

Accordingly, the twelve subpixel values in the assigned (converted) RGB format can be obtained according to the selected six depth values.

Referring to FIGS. 7B and 7C in view of FIGS. 5A and 5B, since the above equations (17)~(22) or (23)~(28) are to assign the same depth value to the RGB subpixel values of the second pixel, the third pixel and the fourth pixel, all Chroma parameter values (Cb, Cr) of these three groups will be equal to 128 after processed by the conversion matrix of RGB to YCbCr Chroma space conversion (Table 1). Accordingly, the four RGB format pixels having the selected depth values can be converted to obtain four YCbCr format data of {$Y_{i,j}$, $Cb_{i,j}$, $Cr_{i,j}$}, {$Y_{i,j+1}$, 128, 128}, {$Y_{i+1,j}$, 128, 128} and {$Y_{i+1,j+1}$, 128, 128}. Normally, as shown in FIG. 5A, with ignoring the coding error, the four YCbCr format data of {$Y_{i,j}$, $Cb_{i,j}$, $Cr_{i,j}$}, {$Y_{i,j+1}$, 128, 128}, {$Y_{i+1,j}$, 128, 128} and {$Y_{i+1,j+1}$, 128, 128} can be processed by the image coding system to obtain four encoded data of {$Y_{i,j}$, $Cb'_{i,j}$, $Cr'_{i,j}$}, {$Y_{i,j+1}$, $Cb'_{i,j}$, $Cr'_{i,j}$}, {$Y_{i+1,j}$, $Cb'_{i,j}$, $Cr'_{i,j}$} and {$Y_{i+1,j+1}$, $Cb'_{i,j}$, $Cr'_{i,j}$}. During the coding process, the image system provides two sampling modes including a direct subsampling mode and an average subsampling mode. In the direct subsampling mode, $Cb'_{i,j}=Cb_{i,j}$ and $Cr'_{i,j}=Cr_{i,j}$; in the average subsampling mode, $Cb'_{i,j}=Cb_{i,j}/4+96$ and $Cr'_{i,j}=Cr_{i,j}/4+96$.

After the receiving end receives these data followed by the decompression process, four data of {$Y_{i,j}$, $Cb'_{i,j}$, $Cr'_{i,j}$}, {$Y_{i,j+1}$, $Cb'_{i,j}$, $Cr'_{i,j}$}, {$Y_{i+1,j}$, $Cb'_{i,j}$, $Cr'_{i,j}$} and {$Y_{i+1,j+1}$, $Cb'_{i,j}$, $Cr'_{i,j}$} can be obtained (see FIG. 5A). Then, the Chroma parameters are adjusted to recover and obtain the four original YCbCr format data. If the coding system adopts the direct subsampling mode, the Chroma parameter adjustment in the depacking process can utilize the equations of $Cb_{i,j}=Cb'_{i,j}$ and $Cr_{i,j}=Cr'_{i,j}$ for obtaining the four original YCbCr format data of {$Y_{i,j}$, $Cb_{i,j}$, $Cr_{i,j}$}, {$Y_{i,j+1}$, 128, 128}, {$Y_{i+1,j+1}$, 128, 128} and {$Y_{i+1,j+1}$, 128, 128}. If the coding system adopts the average subsampling mode, the Chroma parameter adjustment in the depacking process can utilize the equations of $Cb_{i,j}=4Cb'_{i,j}-384$ and $Cr_{i,j}=4Cr'_{i,j}-384$ for obtaining the four original YCbCr format data. To be noted, the decoding system of the receiving end of FIG. 5A should be acknowledged of the selected sampling mode in the coding process (the direct subsampling mode or the average subsampling mode). Afterwards, the inverse conversion matrix of YCbCr to RGB Chroma space conversion (Table 2) is applied to the obtained four original YCbCr format data for recovering the original four groups of RGB format subpixels (totally 12 subpixels) of $\{R_{i,j}, G_{i,j}, B_{i,j}\}$, $\{R_{i+1,j}, G_{i+1,j}, B_{i+1,j}\}$, $\{R_{i,j+1}, G_{i,j+1}, B_{i,j+1}\}$ and $\{R_{i+1,j+1}, G_{i+1,j+1}, B_{i+1,j+1}\}$. To be noted, the recovered twelve subpixel values can satisfy the above equations (17)~(22) and (23)~(28) and comprise the above-mentioned six selected depth values ($D_{3i,j}, D_{3i+2,j}, D_{3i+4,j}, D_{3i+1,j+1}, D_{3i+3,j+1}$ and $D_{3i+5,j+1}$ in the vertical arrangement, and $D_{i,3j}, D_{i,3j+2}, D_{i,3j+4}, D_{i+1,3j+1}, D_{i+1,3j+3}$ and $D_{i+1,3j+5}$ in the horizontal arrangement).

Normally, as shown in FIG. 5B, with ignoring the coding error, the four YCbCr format data of $\{Y_{i,j}, Cb_{i,j}, Cr_{i,j}\}$, $\{Y_{i,j+1}, 128, 128\}$, $\{Y_{i+1,j}, 128, 128\}$ and $\{Y_{i+1,j+1}, 128, 128\}$ can be processed by the image coding system to obtain four encoded data of $\{Y_{i,j}, Cb'_{i,j}, Cr'_{i,j}\}$, $\{Y_{i,j+1}, Cb'_{i,j}, Cr'_{i,j}\}$, $\{Y_{i+1,j}, Cb'_{i,j}, Cr'_{i,j}\}$ and $\{Y_{i+1,j+1}, Cb'_{i,j}, Cr'_{i,j}\}$. During the coding process, the image system provides two sampling modes including a direct subsampling mode and an average subsampling mode. In the direct subsampling mode, $Cb'_{i,j}=Cb_{i,j}$ and $Cr'_{i,j}=Cr_{i,j}$; in the average subsampling mode, $Cb'_{i,j}=Cb_{i,j}/4+96$ and $Cr'_{i,j}=Cr_{i,j}/4+96$. After the Chroma space conversion (from YCbCr to RGB), four groups of R'G'B' format data can be obtained (see FIG. 5B).

Accordingly, the receiving end cannot directly obtain the above four data of $\{Y_{i,j}, Cb'_{i,j}, Cr'_{i,j}\}$, $\{Y_{i,j+1}, Cb'_{i,j}, Cr'_{i,j}\}$, $\{Y_{i+1,j}, Cb'_{i,j}, Cr'_{i,j}\}$ 與 $\{Y_{i+1,j+1}, Cb'_{i,j}, Cr'_{i,j}\}$ during the decomprssion procedure, but can obtain the converted four groups of R'G'B' format data only. Thus, an additional Chroma space conversion for converting the R'G'B' format data to the YCb'Cr' format data is performed in advance for obtaining $\{Y_{i,j}, Cb'_{i,j}, Cr'_{i,j}\}$, $\{Y_{i,j+1}, Cb'_{i,j}, Cr'_{i,j}\}$, $\{Y_{i+1,j}, Cb'_{i,j}, Cr'_{i,j}\}$ and $\{Y_{i+1,j+1}, Cb'_{i,j}, Cr'_{i,j}\}$. Then, the Chroma parameters are adjusted to recover and obtain the four original YCbCr format data. If the coding system adopts the direct subsampling mode, the Chroma parameter adjustment in the depacking process can utilize the equations of $Cb_{i,j}=Cb'_{i,j}$ and $Cr_{i,j}=Cr'_{i,j}$ for obtaining the four original YCbCr format data of $\{Y_{i,j}, Cb_{i,j}, Cr_{i,j}\}$, $\{Y_{i,j+1}, 128, 128\}$, $\{Y_{i+1,j}, 128, 128\}$ and $\{Y_{i+1,j+1}, 128, 128\}$. If the coding system adopts the average subsampling mode, the Chroma parameter adjustment in the depacking process can utilize the equations of $Cb_{i,j}=4Cb'_{i,j}-384$ and $Cr_{i,j}=4Cr'_{i,j}-384$ for obtaining the four original YCbCr format data. To be noted, the decoding system of the receiving end of FIG. 5B should be acknowledged of the selected sampling mode in the coding process (the direct subsampling mode or the average subsampling mode). Afterwards, the inverse conversion matrix of YCbCr to RGB Chroma space conversion is applied to the obtained four original YCbCr format data for recovering the original four groups of RGB format subpixels (totally 12 subpixels) of $\{R_{i,j}, G_{i,j}, B_{i,j}\}$, $\{R_{i+1,j}, G_{i+1,j}, B_{i+1,j}\}$, $\{R_{i,j+1}, G_{i,j+1}, B_{i,j+1}\}$ and $\{R_{i+1,j+1}, G_{i+1,j+1}, B_{i+1,j+1}\}$. To be noted, the recovered twelve subpixel values can satisfy the above equations (17)~(22) and (23)~(28) and comprise the above-mentioned six selected depth values ($D_{3i,j}, D_{3i+2,j}, D_{3i+4,j}, D_{3i+1,j+1}, D_{3i+3,j+1}$ and $D_{3i+5,j+1}$ in the vertical arrangement, and $D_{i,3j}, D_{i,3j+2}, D_{i,3j+4}, D_{i+1,3j+1}, D_{i+1,3j+3}$ and $D_{i+1,3j+5}$ in the horizontal arrangement).

Accordingly, the six selected depth values can be directly obtained without adjustment by the method of recovering the selected depth values from the RGB subpixels for colored depth frame packing and depacking of this disclosure. The detailed content of the method of recovering the selected depth values from the RGB subpixels will be described hereinafter with reference to FIGS. 7B and 7C in view of FIGS. 7D and 6B.

Figure 7D:
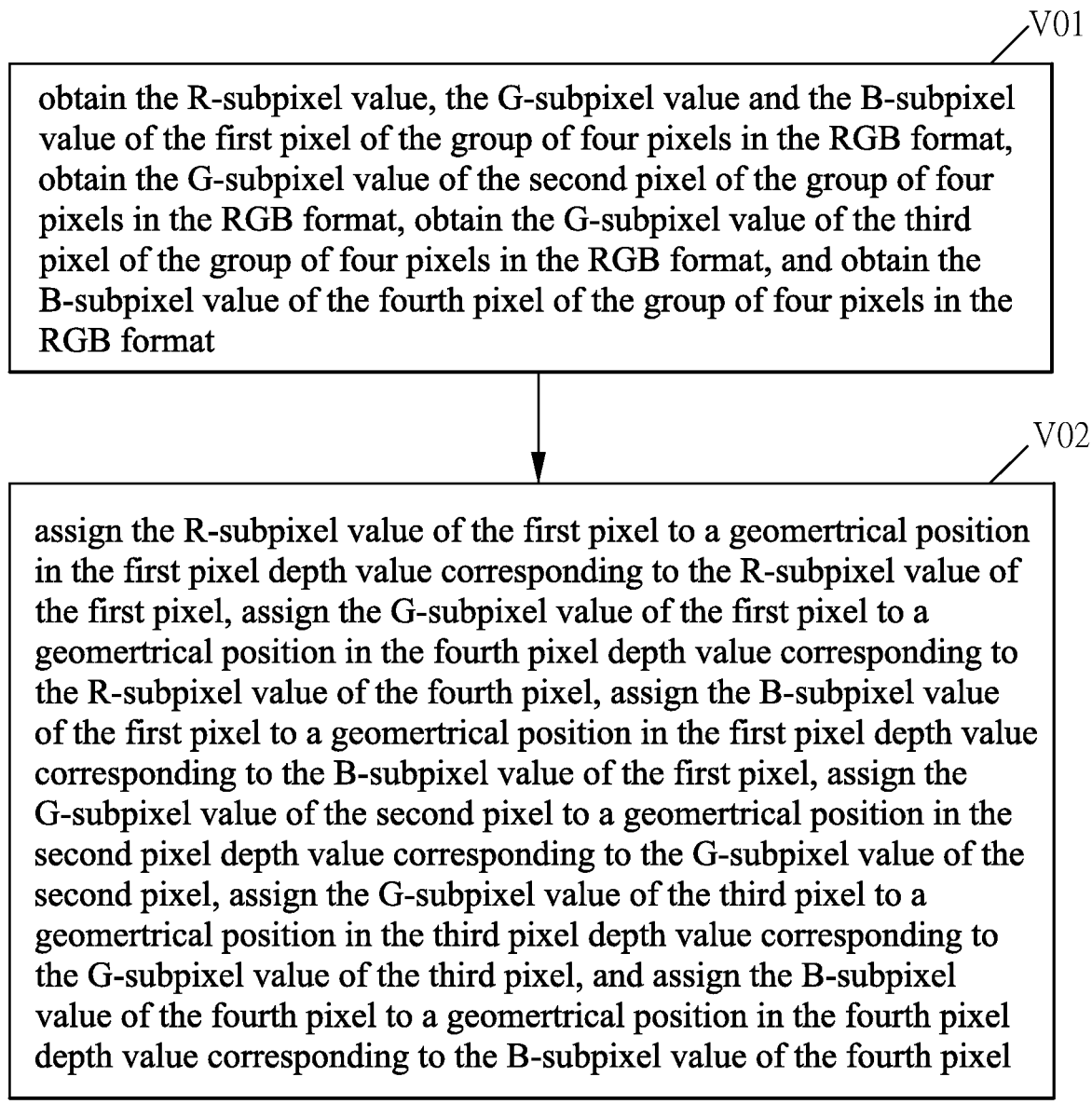
FIG. 7D is a flow chart showing a method of recovering the selected depth values from the RGB subpixels for colored depth frame packing and depacking according to another embodiment of the disclosure.

FIG. 7D is a flow chart showing a method of recovering the selected depth values from the RGB subpixels for colored depth frame packing and depacking according to another embodiment of the disclosure. The recovering method of FIG. 7D can be applied to the four pixels arranged in vertical or in horizontal, wherein the coding and decoding system adopts YCbCr 4:2:0 format. The recovering (inverse conversion) method of FIG. 7D is corresponding to the assigning (conversion) method of FIG. 7A.

As mentioned above, after the processes of the video compression and decompression system and the Chroma space conversion and inverse conversion as shown in FIGS. 5A and 5B, the twelve original RGB format subpixels of $\{R_{i,j}, G_{i,j}, B_{i,j}\}$, $\{R_{i+1,j}, G_{i+1,j}, B_{i+1,j}\}$, $\{R_{i,j+1}, G_{i,j+1}, B_{i,j+1}\}$ and $\{R_{i+1,j+1}, G_{i+1,j+1}, B_{i+1,j+1}\}$ can be obtained. The twelve subpixel values can satisfy the above equations (17)~(22) and (23)~(28) and comprise the above-mentioned six selected depth values ($D_{3i,j}, D_{3i+2,j}, D_{3i+4,j}, D_{3i+1,j+1}, D_{3i+3,j+1}$ and $D_{3i+5,j+1}$ in the vertical arrangement, and $D_{i,3j}, D_{i,3j+2}, D_{i,3j+4}, D_{i+1,3j+1}, D_{i+1,3j+3}$ and $D_{i+1,3j+5}$ in the horizontal arrangement). Accordingly, the method of recovering the selected depth values from the RGB subpixels of this disclosure can recover the obtained RGB format data to obtain six selected depth values.

As shown in FIG. 7D, the method of recovering the selected depth values from the RGB subpixels for colored depth frame packing and depacking comprises a step V01 and a step V02. The step V01 is to obtain the R-subpixel value, the G-subpixel value and the B-subpixel value of the first pixel of the group of four pixels in the RGB format, to obtain the G-subpixel value of the second pixel of the group of four pixels in the RGB format, to obtain the G-subpixel value of the third pixel of the group of four pixels in the RGB format, and to obtain the B-subpixel value of the fourth pixel of the group of four pixels in the RGB format. The step V02 is to assign the R-subpixel value of the first pixel to a geometrical position in the first pixel depth value corresponding to the R-subpixel value of the first pixel, to assign the G-subpixel value of the first pixel to a geometrical position in the fourth pixel depth value corresponding to the R-subpixel value of the fourth pixel, to assign the B-subpixel value of the first pixel to a geometrical position in the first pixel depth value corresponding to the B-subpixel value of the first pixel, to assign the G-subpixel value of the second pixel to a geometrical position in the second pixel depth value corresponding to the G-subpixel value of the second pixel, to assign the G-subpixel value of the third pixel to a geometrical position in the third pixel depth value corresponding to the G-subpixel value of the third pixel, and to assign the B-subpixel value of the fourth pixel to a geometrical position in the fourth pixel depth value corresponding to the B-subpixel value of the fourth pixel.

Specifically, when the coding and decoding system adopts the YCbCr 4:2:0 format, in the four pixels of the embodiment as shown in FIG. 6B, the obtaining unit 21 of the circuit 2a is configured for obtaining the R-subpixel value, the G-subpixel value and the B-subpixel value of the first pixel of the group of four pixels in the RGB format, obtaining the G-subpixel value of the second pixel of the group of four pixels in the RGB format, obtaining the G-subpixel value of the third pixel of the group of four pixels in the RGB format, and obtaining the B-subpixel value of the fourth pixel of the group of four pixels in the RGB format. The depositing unit 22 is configured for assigning the R-subpixel value of the first pixel to a geometrical position in the first pixel depth value corresponding to the R-subpixel value of the first pixel, assigning the G-subpixel value of the first pixel to a geometrical position in the fourth pixel depth value corresponding to the R-subpixel value of the fourth pixel, assigning the B-subpixel value of the first pixel to a geometrical position in the first pixel depth value corresponding to the B-subpixel value of the first pixel, assigning the G-subpixel value of the second pixel to a geometrical position in the second pixel depth value corresponding to the G-subpixel value of the second pixel, assigning the G-subpixel value of the third pixel to a geometrical position in the third pixel depth value corresponding to the G-subpixel value of the third pixel, and assigning the B-subpixel value of the fourth pixel to a geometrical position in the fourth pixel depth value corresponding to the B-subpixel value of the fourth pixel.

The recovering method will be described hereinafter with reference to FIGS. 7B and 7C. Specifically, in the depacking step for the case of FIG. 7B (vertical arrangement), the subpixel values of the twelve RGB subpixels obtained by the Chroma space inverse conversion of the receiving end can be recovered to obtain the six selected depth values as follow:

$$D_{3i,j}=R_{i,j}, \quad (29)$$

$$D_{3i+2,j}=B_{i,j}, \quad (30)$$

$$D_{3i+4,j}=G_{i+1,j}, \quad (31)$$

$$D_{3i+1,j+1}=G_{i,j+1}, \quad (32)$$

$$D_{3i+3,j+1}=G_{i,j}, \quad (33)$$

$$D_{3i+5,j+1}=B_{i+1,j+1}. \quad (34)$$

In the depacking step for the case of FIG. 7C (horizontal arrangement), the subpixel values of the twelve RGB subpixels obtained by the Chroma space inverse conversion of the receiving end can be recovered to obtain the six selected depth values as follow:

$$D_{i,3j}=R_{i,j}, \quad (35)$$

$$D_{i,3j+2}=B_{i,j}, \quad (36)$$

$$D_{i,3j+4}=G_{i,j+1}, \quad (37)$$

$$D_{i+1,3j+1}=G_{i+1}, \quad (38)$$

$$D_{i+1,3j+3}=G_{i,j}, \quad (39)$$

$$D_{i+1,3j+5}=B_{i+1,j+1} \quad (40)$$

Accordingly, the RGB format data obtained by the Chroma space inverse conversion of the receiving end can be directly recovered without any adjustment to obtain the above-mentioned six selected depth values. The other six depth values can be obtained by interpolation method according to the six selected depth values and the related conversion information, thereby obtaining a better conversion to recover the original depth values. Compared with the conventional art, which replaces the lacked Chroma values by the remained neighboring Chroma values, this embodiment can directly recover multiple depth values of the image data from the obtained RGB format data, thereby improving the distortion around the area having large (or dramatic) depth gap.

The embodiment in which the coding and decoding system adopts YCbCr 4:2:2 format will be described hereinafter. The embodiment of vertical arrangement will be described first.

Figure 8A:
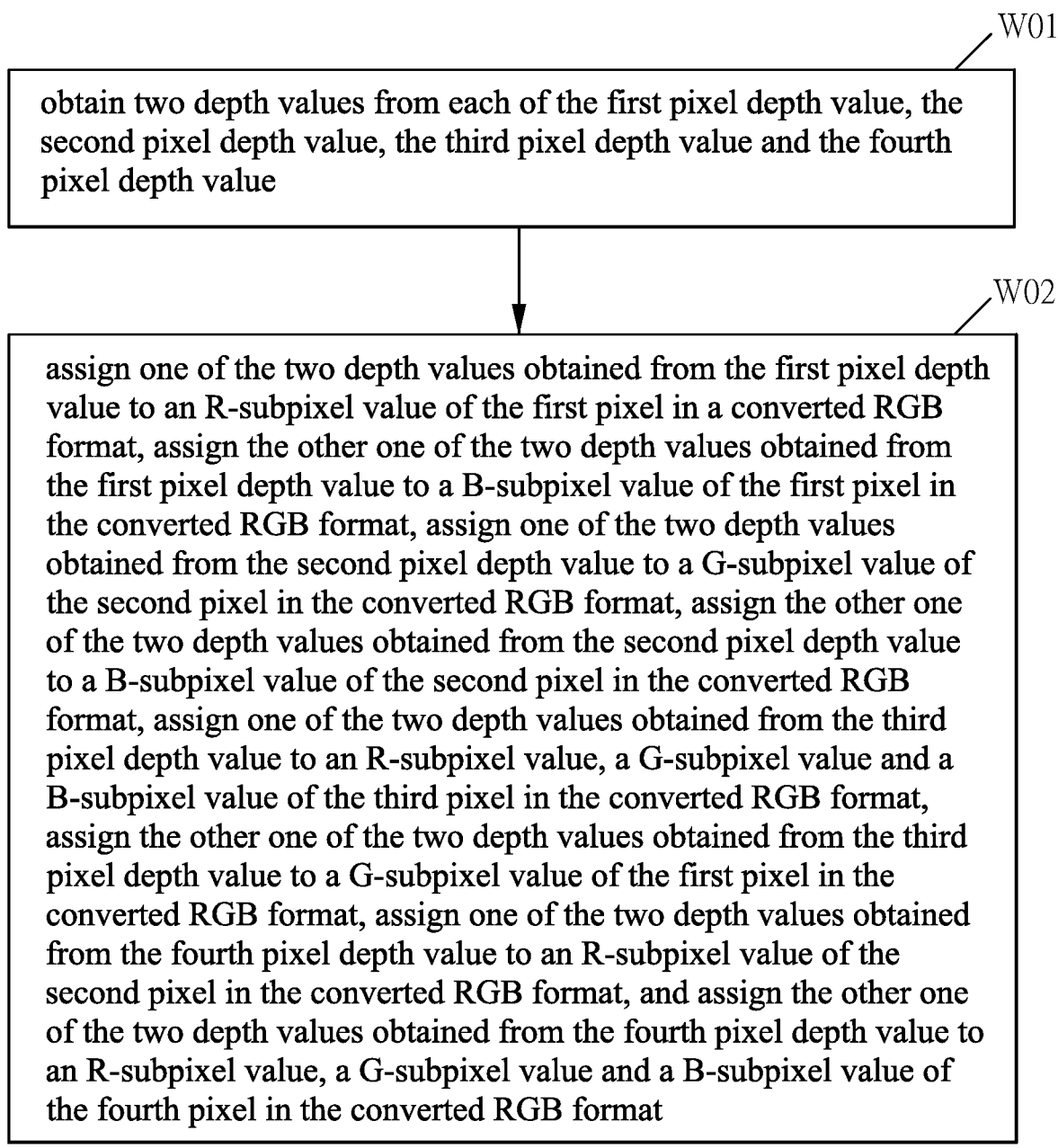
FIG. 8A is a flow chart showing a method of assigning selected depth values to RGB subpixels for colored depth frame packing and depacking according to another embodiment of the disclosure.

FIG. 8A is a flow chart showing a method of assigning selected depth values to RGB subpixels for colored depth frame packing and depacking according to another embodiment of the disclosure.

The four pixels comprises a first pixel, a second pixel, a third pixel and a fourth pixel. The first pixel is located neighboring the second pixel and the third pixel, and the fourth pixel is located neighboring the second pixel and the third pixel. In this embodiment, each group of four pixels totally comprises twelve subpixels. In addition, the geometrical positions of the first pixel, the second pixel, the third pixel and the fourth pixel correspondingly have a first pixel depth value, a second pixel depth value, a third pixel depth value and a fourth pixel depth value, respectively. In other words, the geometrical position of the first pixel correspondingly has a first pixel depth value, the geometrical position of the second pixel correspondingly has a second pixel depth value, the geometrical position of the third pixel correspondingly has a third pixel depth value, and the geometrical position of the fourth pixel correspondingly has a fourth pixel depth value. Since each pixel has vertically arranged subpixels, each of the first pixel depth value, the second pixel depth value, the third pixel depth value and the fourth pixel depth value at the geometrical positions corresponding to the first pixel, the second pixel, the third pixel and the fourth pixel has three depth values corresponding to the R subpixel, the G subpixel and the B subpixel.

The conversion method of FIG. 8A can be applied to the four pixels arranged in vertical, wherein the coding and decoding system adopts YCbCr 4:2:2 format. As shown in FIG. 8A, the method of assigning selected depth values to RGB subpixels for a colored depth frame packing and depacking comprises a step W01 and a step W02. The step W01 is to obtain two depth values from each of the first pixel depth value, the second pixel depth value, the third pixel depth value and the fourth pixel depth value. The step W02 is to assign one of the two depth values obtained from the first pixel depth value to an R-subpixel value of the first pixel in a converted RGB format, to assign the other one of the two depth values obtained from the first pixel depth value to a B-subpixel value of the first pixel in the converted RGB format, to assign one of the two depth values obtained from the second pixel depth value to a G-subpixel value of the second pixel in the converted RGB format, to assign the other one of the two depth values obtained from the second pixel depth value to a B-subpixel value of the second pixel in the converted RGB format, to assign one of the two depth values obtained from the third pixel depth value to an R-subpixel value, a G-subpixel value and a B-subpixel value of the third pixel in the converted RGB format, to assign the other one of the two depth values obtained from the third pixel depth value to a G-subpixel value of the first pixel in the converted RGB format, to assign one of the two depth values obtained from the fourth pixel depth value to an R-subpixel value of the second pixel in the converted RGB format, and to assign the other one of the two depth values obtained from the fourth pixel depth value to an R-subpixel value, a G-subpixel value and a B-subpixel value of the fourth pixel in the converted RGB format.

In the step W01 of obtaining the depth values, the depth values of the geometrical positions corresponding to the R subpixel and the B subpixel of the first pixel are obtained from the first pixel depth value, the depth values of the geometrical positions corresponding to the G subpixel and the B subpixel of the second pixel are obtained from the second pixel depth value, the depth values of the geometrical positions corresponding to the R subpixel and the G subpixel of the third pixel is obtained from the third pixel depth value, and the depth values of the geometrical positions corresponding to the R subpixel and the B subpixel of the fourth pixel are obtained from the fourth pixel depth value. In the step W02 of assigning to the converted RGB format, the depth value obtained from the first pixel depth value corresponding to the geometrical position of the R subpixel of the first pixel is assigned to the R-subpixel value of the first pixel in the converted RGB format, the depth value obtained from the first pixel depth value corresponding to the geometrical position of the B subpixel of the first pixel is assigned to the B-subpixel value of the first pixel in the converted RGB format, the depth value obtained from the second pixel depth value corresponding to the geometrical position of the G subpixel of the second pixel is assigned to the G-subpixel value of the second pixel in the converted RGB format, the depth value obtained from the second pixel depth value corresponding to the geometrical position of the B subpixel of the second pixel is assigned to the B-subpixel value of the second pixel in the converted RGB format, the depth value obtained from the third pixel depth value corresponding to the geometrical position of the R subpixel of the third pixel is assigned to the R-subpixel value, the G-subpixel value and the B-subpixel value of the third pixel in the converted RGB format, the depth value obtained from the third pixel depth value corresponding to the geometrical position of the G subpixel of the third pixel is assigned to the G-subpixel value of the first pixel in the converted RGB format, the depth value obtained from the fourth pixel depth value corresponding to the geometrical position of the R subpixel of the fourth pixel is assigned to the R-subpixel value of the second pixel in the converted RGB format, and the depth value obtained from the fourth pixel depth value corresponding to the geometrical position of the B subpixel of the fourth pixel is assigned to the R-subpixel value, the G-subpixel value and the B-subpixel value of the fourth pixel in the converted RGB format.

In addition, with reference to FIG. 3B, the obtaining unit 11 of the circuit 1a is configured for obtaining two depth values from each of the first pixel depth value, the second pixel depth value, the third pixel depth value and the fourth pixel depth value. The depositing unit 12 is configured for assigning one of the two depth values obtained from the first pixel depth value to an R-subpixel value of the first pixel in a converted RGB format, assigning the other one of the two depth values obtained from the first pixel depth value to a B-subpixel value of the first pixel in the converted RGB format, assigning one of the two depth values obtained from the second pixel depth value to a G-subpixel value of the second pixel in the converted RGB format, assigning the other one of the two depth values obtained from the second pixel depth value to a B-subpixel value of the second pixel in the converted RGB format, assigning one of the two depth values obtained from the third pixel depth value to an R-subpixel value, a G-subpixel value and a B-subpixel value of the third pixel in the converted RGB format, assigning the other one of the two depth values obtained from the third pixel depth value to a G-subpixel value of the first pixel in the converted RGB format, assigning one of the two depth values obtained from the fourth pixel depth value to an R-subpixel value of the second pixel in the converted RGB format, and assigning the other one of the two depth values obtained from the fourth pixel depth value to an R-subpixel value, a G-subpixel value and a B-subpixel value of the fourth pixel in the converted RGB format.

Figure 8B:
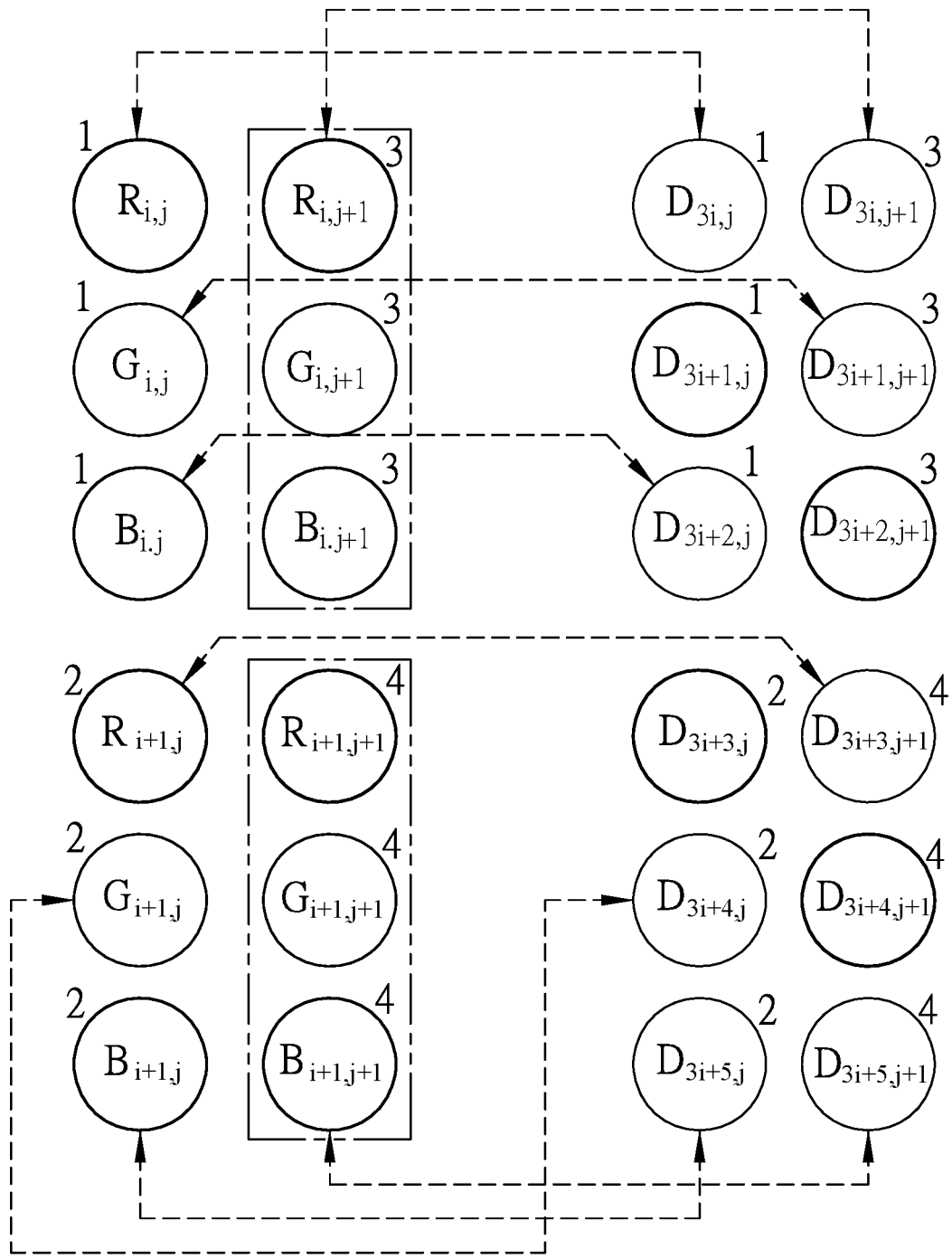
FIG. 8B is a schematic diagram showing the RGB format of a group of four pixels and the corresponding depth values of the geometrical positions thereof according to another embodiment of the disclosure.

FIG. 8B is a schematic diagram showing the RGB format of a group of four pixels and the corresponding depth values of the geometrical positions thereof according to another embodiment of the disclosure. In this embodiment, FIG. 8B shows four pixels arranged in vertical and four pixel depth values.

In one group of four pixels of the depth frame, the R, G and B subpixels of each pixel are arranged in vertical as shown in FIG. 8B, wherein the first pixel comprises $\{R_{i,j}, G_{i,j}, B_{i,j}\}$, the second pixel comprises $\{R_{i+1,j}, G_{i+1,j}, B_{i+1,j}\}$, the third pixel comprises $\{R_{i,j+1}, G_{i,j+1}, B_{i,j+1}\}$, and the fourth pixel comprises $\{R_{i+1,j+1}, G_{i+1,j+1}, B_{i+1,j+1}\}$. The geometrical positions of the first pixel, the second pixel, the third pixel and the fourth pixel correspondingly have a first pixel depth value, a second pixel depth value, a third pixel depth value and a fourth pixel depth value, respectively. Since each pixel comprises three subpixels, each pixel depth value corresponding to the geometrical position also comprises three depth values. In the vertical arrangement (FIG. 8B), the first pixel depth value is $\{D_{3i,j}, D_{3i+1,j}, D_{3i+2,j}\}$, the second pixel depth value is $\{D_{3i+3,j}, D_{3i+4,j}, D_{3i+2,j}\}$, the third pixel depth value is $\{D_{3i,j+1}, D_{3i+1,j+1}, D_{3i+2,j+1}\}$, and the fourth pixel depth value is $\{D_{3i+3,j+1}, D_{3i+4,j+1}, D_{3i+5,j+1}\}$. Accordingly, the size thereof becomes 3H×W. Herein, i=0, 2, 4 ..., (H−2), and j=0, 2, 4 ..., (W−2).

Specifically, when the coding and decoding system adopts the YCbCr 4:2:2 format, in the four pixels of the embodiment as shown in FIG. 8B, the obtaining unit 11 obtains the depth values of the geometrical position corresponding to the R subpixel and the B subpixel of the first pixel from the first pixel depth value, the depth values of the geometrical positions corresponding to the G subpixel and the B subpixel of the second pixel from the second pixel depth value, the depth values of the geometrical positions corresponding to the R subpixel and the G subpixel of the third pixel from the third pixel depth value, and the depth values of the geometrical position corresponding to the R subpixel and the B subpixel of the fourth pixel from the fourth pixel depth value. In other words, eight depth values $D_{3i,j}$, $D_{3i+2,j}$, $D_{3i+4,j}$, $D_{3i+5,j}$, $D_{3i,j+1}$, $D_{3i+1,j+1}$, $D_{3i+3,j+1}$ and $D_{3i+5,j+1}$ are obtained from the vertically arranged pixel depth values. In this case, only eight depth values are selected from the vertically arranged pixel depth values, and then used in the following packing and depacking processes.

Next, the depositing unit 12 is configured for assigning the depth value obtained from the first pixel depth value corresponding to the geometrical position of the R subpixel of the first pixel to the R-subpixel value of the first pixel in the converted RGB format, assigning the depth value obtained from the first pixel depth value corresponding to the geometrical position of the B subpixel of the first pixel to the B-subpixel value of the first pixel in the converted RGB format, assigning the depth value obtained from the second pixel depth value corresponding to the geometrical position of the G subpixel of the second pixel to the G-subpixel value of the second pixel in the converted RGB format, assigning the depth value obtained from the second pixel depth value corresponding to the geometrical position of the B subpixel of the second pixel to the B-subpixel value of the second pixel in the converted RGB format, assigning the depth value obtained from the third pixel depth value corresponding to the geometrical position of the R subpixel of the third pixel to the R-subpixel value, the G-subpixel value and the B-subpixel value of the third pixel in the converted RGB format, assigning the depth value obtained from the third pixel depth value corresponding to the geometrical position of the G subpixel of the third pixel to the G-subpixel value of the first pixel in the converted RGB format, assigning the depth value obtained from the fourth pixel depth value corresponding to the geometrical position of the R subpixel of the fourth pixel to the R-subpixel value of the second pixel in the converted RGB format, and assigning the depth value obtained from the fourth pixel depth value corresponding to the geometrical position of the B subpixel of the fourth pixel to the R-subpixel value, the G-subpixel value and the B-subpixel value of the fourth pixel in the converted RGB format. Specifically, in the packing step for the case of FIG. 8B (vertical arrangement), the eight selected depth values are assigned (deposited) to the twelve RGB subpixels as follow:

$$R_{i,j}=D_{3i,j}, \quad (41)$$

$$G_{i,j}=D_{3i+1,j+1}, \quad (42)$$

$$B_{i,j}=D_{3i+2,j}, \quad (43)$$

$$R_{i+1,j}=D_{3i+3,j+1}, \quad (44)$$

$$G_{i+1,j}=D_{3i+4,j}, \quad (45)$$

$$B_{i+1,j}=D_{3i+5,j}, \quad (46)$$

$$R_{i,j+1}=G_{i,j+1}=B_{i,j+1}=D_{3i,j+1}, \quad (47)$$

$$R_{i+1,j+1}=G_{i+1,j+1}=B_{i+1,j+1}=D_{3i+5,j+1}. \quad (48)$$

Accordingly, the twelve subpixel values in the assigned (converted) RGB format can be obtained according to the selected eight depth values.

Referring to FIG. 8B in view of FIGS. 5A and 5B, since the above equations (41)~(48) are to assign the same depth value to the RGB subpixel values of the third pixel and the fourth pixel, all Chroma parameter values (Cb, Cr) of these two groups will be equal to 128 after processed by the conversion matrix of RGB to YCbCr Chroma space conversion (Table 1). Accordingly, the four RGB format pixels having the selected depth values can be converted to obtain four YCbCr format data of $\{Y_{i,j}, Cb_{i,j}, Cr_{i,j}\}$, $\{Y_{i,j+1}, 128, 128\}$, $\{Y_{i+1,j}, Cb_{i+1,j}, Cr_{i+1,j}\}$ and $\{Y_{i+1,j+1}, 128, 128\}$. Normally, as shown in FIG. 5A, with ignoring the coding error, the four YCbCr format data of $\{Y_{i,j}, Cb_{i,j}, Cr_{i,j}\}$, $\{Y_{i,j+1}, 128, 128\}$, $\{Y_{i+1,j}, Cb_{i+1,j}, Cr_{i+1,j}\}$ and $\{Y_{i+1,j+1}, 128, 128\}$ can be processed by the image coding system to obtain four encoded data of $\{Y_{i,j}, Cb'_{i,j}, Cr'_{i,j}\}$, $\{Y_{i,j+1}, Cb'_{i,j}, Cr'_{i,j}\}$, $\{Y_{i+1,j}, Cb'_{i,j}, Cr'_{i,j}\}$ and $\{Y_{i+1,j+1}, Cb'_{i,j}, Cr'_{i,j}\}$. During the coding process, the image system provides two sampling modes including a direct subsampling mode and an average subsampling mode. In the direct subsampling mode, $Cb'_{i,j}=Cb_{i,j}$, $Cb'_{i+1,j}=Cb_{i+1,j}$, $Cr'_{i,j}=Cr_{i,j}$ and $Cr'_{i+1,j}=Cr_{i+1,j}$; in the average subsampling mode, $Cb'_{i,j}=Cb_{i,j}/2+64$, $Cb'_{i+1,j}=Cb_{i+1,j}/2+64$, $Cr'_{i,j}=Cr_{i,j}/2+64$ and $Cb'_{i+1,j}=Cb_{i+1,j}/2+64$.

After the receiving end receives these data followed by the decompression process, four data of $\{Y_{i,j}, Cb'_{i,j}, Cr'_{i,j}\}$, $\{Y_{i,j+1}, Cb'_{i,j}, Cr'_{i,j}\}$, $\{Y_{i+1,j}, Cb'_{i,j}, Cr'_{i,j}\}$ and $\{Y_{i+1,j+1}, Cb'_{i,j}, Cr'_{i,j}\}$ can be obtained (see FIG. 5A). Then, the Chroma parameters are adjusted to recover and obtain the four original YCbCr format data. If the coding system adopts the direct subsampling mode, the Chroma parameter adjustment in the depacking process can utilize the equations of $Cb_{i,j}=Cb'_{i,j}$, $Cb_{i+1,j}=Cb'_{i+1,j}$, $Cr_{i,j}=Cr'_{i,j}$ and $Cr_{i+1,j}=Cr'_{i+1,j}$ for obtaining the four original YCbCr format data of $\{Y_{i,j}, Cb_{i,j}, Cr_{i,j}\}$, $\{Y_{i,j+1}, 128, 128\}$, $\{Y_{i+1,j}, Cb_{i+1,j}, Cr_{i+1,j}\}$ and $\{Y_{i+1,j+1}, 128, 128\}$. If the coding system adopts the average subsampling mode, the Chroma parameter adjustment in the depacking process can utilize the equations of $Cb_{i,j}=2Cb'_{i,j}-128$, $Cb_{i+1,j}=2Cb'_{i+1,j}-128$, $Cr_{i,j}=2Cr'_{i,j}-128$ and $Cb_{i+1,j}=2Cb'_{i+1,j}-128$ for obtaining the four original YCbCr format data. To be noted, the decoding system of the receiving end of FIG. 5A should be acknowledged of the selected sampling mode in the coding process (the direct subsampling mode or the average subsampling mode). Afterwards, the inverse conversion matrix of YCbCr to RGB Chroma space conversion (Table 2) is applied to the obtained four original YCbCr format data for recovering the original four groups of RGB format subpixels (totally 12 subpixels) of $\{R_{i,j}, G_{i,j}, B_{i,j}\}$, $\{R_{i+1,j}, G_{i+1,j}, B_{i+1,j}\}$, $\{R_{i,j+1}, G_{i,j+1}, B_{i,j+1}\}$ and $\{R_{i+1,j+1}, G_{i+1,j+1}, B_{i+1,j+1}\}$. To be noted, the recovered twelve subpixel values can satisfy the above equations (41)~(48) and comprise the above-mentioned eight selected depth values $(D_{3i,j}, D_{3i+2,j}, D_{3i+4,j}, D_{3i+5,j}, D_{3i,j+1}, D_{3i+1,j+1}, D_{3i+3,j+1}$ and $D_{3i+5,j+1}$ in the vertical arrangement).

Normally, as shown in FIG. 5B, with ignoring the coding error, the four YCbCr format data of $\{Y_{i,j}, Cb_{i,j}, Cr_{i,j}\}$, $\{Y_{i,j+1}, 128, 128\}$, $\{Y_{i+1,j}, Cb_{i+1,j}, Cr_{i+1,j}\}$ and $\{Y_{i+1,j+1}, 128, 128\}$ can be processed by the image coding system to obtain four encoded data of $\{Y_{i,j}, Cb'_{i,j}, Cr'_{i,j}\}$, $\{Y_{i,j+1}, Cb'_{i,j}, Cr'_{i,j}\}$, $\{Y_{i+1,j}, Cb'_{i,j}, Cr'_{i,j}\}$ and $\{Y_{i+1,j+1}, Cb'_{i,j}, Cr'_{i,j}\}$. During the coding process, the image system provides two sampling modes including a direct subsampling mode and an average subsampling mode. In the direct subsampling mode, $Cb'_{i,j}=Cb_{i,j}$, $Cb'_{i+1,j}=Cb_{i+1,j}, Cr'_{i,j}=Cr_{i,j}$ and $Cr'_{i+1,j}=Cr_{i+1,j}$; in the average subsampling mode, $Cb'_{i,j}=Cb_{i,j}/2+64$, $Cb'_{i+1,j}=Cb_{i+1,j}/2+64$, $Cr'_{i,j}=Cr_{i,j}/2+64$ and $Cb'_{i+1,j}=Cb_{i+1,j}/2+64$. After the Chroma space conversion (from YCbCr to RGB), four groups of R'G'B' format data can be obtained (see FIG. 5B).

Accordingly, the receiving end cannot directly obtain the above four data of $\{Y_{i,j}, Cb'_{i,j}, Cr'_{i,j}\}$, $\{Y_{i,j+1}, Cb'_{i,j}, Cr'_{i,j}\}$, $\{Y_{i+1,j}, Cb'_{i,j}, Cr'_{i,j}\}$ and $\{Y_{i+1,j+1}, Cb'_{i,j}, Cr'_{i,j}\}$ during the decomprssion procedure, but can obtain the converted four groups of R'G'B' format data only. Thus, an additional Chroma space conversion for converting the R'G'B' format data to the YCb'Cr' format data is performed in advance for obtaining $\{Y_{i,j}, Cb'_{i,j}, Cr'_{i,j}\}$, $\{Y_{i,j+1}, Cb'_{i,j}, Cr'_{i,j}\}$, $\{Y_{i+1,j}, Cb'_{i,j}, Cr'_{i,j}\}$ and $\{Y_{i+1,j+1}, Cb'_{i,j}, Cr'_{i,j}\}$. Then, the Chroma parameters are adjusted to recover and obtain the four original YCbCr format data. If the coding system adopts the direct subsampling mode, the Chroma parameter adjustment in the depacking process can utilize the equations of $Cb_{i,j}=Cb'_{i,j}$, $Cb_{i+1,j}=Cb'_{i+1,j}$, $Cr_{i,j}=Cr'_{i,j}$ and $Cr_{i+1,j}=Cr'_{i+1,j}$ for obtaining the four original YCbCr format data of $\{Y_{i,j}, Cb_{i,j}, Cr_{i,j}\}$, $\{Y_{i,j+1}, 128, 128\}$, $\{Y_{i+1,j}, 128, 128\}$ and $\{Y_{i+1,j+1}, 128, 128\}$. If the coding system adopts the average subsampling mode, the Chroma parameter adjustment in the depacking process can utilize the equations of $Cb_{i,j}=2Cb'_{i,j}-128$, $Cb_{i+1,j}=2Cb'_{i+1,j}-128$, $Cr_{i,j}=2Cr'_{i,j}-128$ and $Cb_{i+1,j}=2Cb'_{i+1,j}-128$ for obtaining the four original YCbCr format data. To be noted, the decoding system of the receiving end of FIG. 5B should be acknowledged of the selected sampling mode in the coding process (the direct subsampling mode or the average subsampling mode). Afterwards, the inverse conversion matrix of YCbCr to RGB Chroma space conversion is applied to the obtained four original YCbCr format data for recovering the original four groups of RGB format subpixels (totally 12 subpixels) of $\{R_{i,j}, G_{i,j}, B_{i,j}\}$, $\{R_{i+1,j}, G_{i+1,j}, B_{i+1,j}\}$, $\{R_{i,j+1}, G_{i,j+1}, B_{i,j+1}\}$ and $\{R_{i+1,j+1}, G_{i+1,j+1}, B_{i+1,j+1}\}$. To be noted, the recovered twelve subpixel values can satisfy the above equations (41)~(48) and comprise the above-mentioned eight selected depth values ($D_{3i,j}$, $D_{3i+2,j}$, $D_{3i+4,j}$, $D_{3i+5,j}$, $D_{3i,j+1}$, $D_{3i+1,j+1}$, $D_{3i+3,j+1}$ and $D_{3i+5,j+1}$ in the vertical arrangement).

Accordingly, the eight selected depth values can be directly obtained without adjustment by the method of recovering the selected depth values from the RGB subpixels for colored depth frame packing and depacking of this disclosure. The detailed content of the method of recovering the selected depth values from the RGB subpixels will be described hereinafter with reference to FIG. 8B in view of FIGS. 8C and 6B.

FIG. 8C is a flow chart showing a method of recovering the selected depth values from the RGB subpixels for colored depth frame packing and depacking according to another embodiment of the disclosure. The recovering method of FIG. 8C can be applied to the four pixels arranged in vertical, wherein the coding and decoding system adopts YCbCr 4:2:2 format. The recovering (inverse conversion) method of FIG. 8C is corresponding to the assigning (conversion) method of FIG. 8A.

As mentioned above, after the processes of the video compression and decompression system and the Chroma space conversion and inverse conversion as shown in FIGS. 5A and 5B, the twelve original RGB format subpixels of $\{R_{i,j}, G_{i,j}, B_{i,j}\}$, $\{R_{i+1,j}, G_{i+1,j}, B_{i+1,j}\}$, $\{R_{i,j+1}, G_{i,j+1}, B_{i,j+1}\}$ and $\{R_{i+1,j+1}, G_{i+1,j+1}, B_{i+1,j+1}\}$ can be obtained. The twelve subpixel values can satisfy the above equations (41)~(48) and comprise the above-mentioned eight selected depth values ($D_{3i,j}$, $D_{3i+2,j}$, $D_{3i+4,j}$, $D_{3i+5,j}$, $D_{3i,j+1}$, $D_{3i+1,j+1}$, $D_{3i+3,j+1}$ and $D_{3i+5,j+1}$ in the vertical arrangement). Accordingly, the method of recovering the selected depth values from the RGB subpixels of this disclosure can recover the obtained RGB format data to obtain eight selected depth values.

As shown in FIG. 8C, the method of recovering the selected depth values from the RGB subpixels for colored depth frame packing and depacking comprises a step X01 and a step X02. The step X01 is to obtain the R-subpixel value, the G-subpixel value and the B-subpixel value of the first pixel of the group of four pixels in the RGB format, to obtain the R-subpixel value, the G-subpixel value and the B-subpixel value of the second pixel of the group of four pixels in the RGB format, to obtain the R-subpixel value of the third pixel of the group of four pixels in the RGB format, and to obtain the B-subpixel value of the fourth pixel of the group of four pixels in the RGB format. The step X02 is to assign the R-subpixel value of the first pixel to a geometrical position in the first pixel depth value corresponding to the R-subpixel value of the first pixel, to assign the G-subpixel value of the first pixel to a geometrical position in the third pixel depth value corresponding to the G-subpixel value of the third pixel, to assign the B-subpixel value of the first pixel to a geometrical position in the first pixel depth value corresponding to the B-subpixel value of the first pixel, to assign the R-subpixel value of the second pixel to a geometrical position in the fourth pixel depth value corresponding to the R-subpixel value of the fourth pixel, to assign the G-subpixel value of the second pixel to a geometrical position in the second pixel depth value corresponding to the G-subpixel value of the second pixel, to assign the B-subpixel value of the second pixel to a geometrical position in the second pixel depth value corresponding to the B-subpixel value of the second pixel, to assign the R-subpixel value of the third pixel to a geometrical position in the third pixel depth value corresponding to the R-subpixel value of the third pixel, and to assign the B-subpixel value of the fourth pixel to a geometrical position in the fourth pixel depth value corresponding to the B-subpixel value of the fourth pixel.

Specifically, when the coding and decoding system adopts the YCbCr 4:2:2 format, in the four pixels of the embodiment as shown in FIG. 6B, the obtaining unit 21 of the circuit 2a is configured for obtaining the R-subpixel value, the G-subpixel value and the B-subpixel value of the first pixel of the group of four pixels in the RGB format, obtaining the R-subpixel value, the G-subpixel value and the B-subpixel value of the second pixel of the group of four pixels in the RGB format, obtaining the R-subpixel value of the third pixel of the group of four pixels in the RGB format, and obtaining the B-subpixel value of the fourth pixel of the group of four pixels in the RGB format. The depositing unit 22 is configured for assigning the R-subpixel value of the first pixel to a geometrical position in the first pixel depth value corresponding to the R-subpixel value of the first pixel, assigning the G-subpixel value of the first pixel to a geometrical position in the third pixel depth value corresponding to the G-subpixel value of the third pixel, assigning the B-subpixel value of the first pixel to a geometrical position in the first pixel depth value corresponding to the B-subpixel value of the first pixel, assigning the R-subpixel value of the second pixel to a geometrical position in the fourth pixel depth value corresponding to the R-subpixel value of the fourth pixel, assigning the G-subpixel value of the second pixel to a geometrical position in the second pixel depth value corresponding to the G-subpixel value of the second pixel, assigning the B-subpixel value of the second pixel to a geometrical position in the second pixel depth value corresponding to the B-subpixel value of the second pixel, assigning the R-subpixel value of the third pixel to a geometrical position in the third pixel depth value corresponding to the R-subpixel value of the third pixel, and assigning the B-subpixel value of the fourth pixel to a geometrical position in the fourth pixel depth value corresponding to the B-subpixel value of the fourth pixel.

The recovering method will be described hereinafter with reference to FIG. 8B. Specifically, in the depacking step for the case of FIG. 8B (vertical arrangement), the subpixel values of the twelve RGB subpixels obtained by the Chroma space inverse conversion of the receiving end can be recovered to obtain the eight selected depth values as follow:

$$D_{3i,j} = R_{i,j}, \tag{49}$$

$$D_{3i+2,j} = B_{i,j}, \tag{50}$$

$$D_{3i+4,j} = G_{i+1,j}, \tag{51}$$

$$D_{3i+5,j} = B_{i+1,j} \tag{52}$$

$$D_{3i,j+1} = R_{i,j+1}, \tag{53}$$

$$D_{3i+1,j+1} = G_{i,j}, \tag{54}$$

$$D_{3i+3,j+1} = R_{i+1,j}, \tag{55}$$

$$D_{3i+5,j+1} = B_{i+1,j+1} \tag{56}$$

Accordingly, the RGB format data obtained by the Chroma space inverse conversion of the receiving end can be directly recovered without any adjustment to obtain the above-mentioned eight selected depth values. The other four depth values can be obtained by interpolation method according to the eight selected depth values and the related conversion information, thereby obtaining a better conversion to recover the original depth values. Compared with the conventional art, which replaces the lacked Chroma values by the remained neighboring Chroma values, this embodiment can directly recover multiple depth values of the image data from the obtained RGB format data, thereby improving the distortion around the area having large (or dramatic) depth gap.

The embodiment of horizontal arrangement in which the coding and decoding system adopts YCbCr 4:2:2 format will be described hereinafter.

Figure 9A:
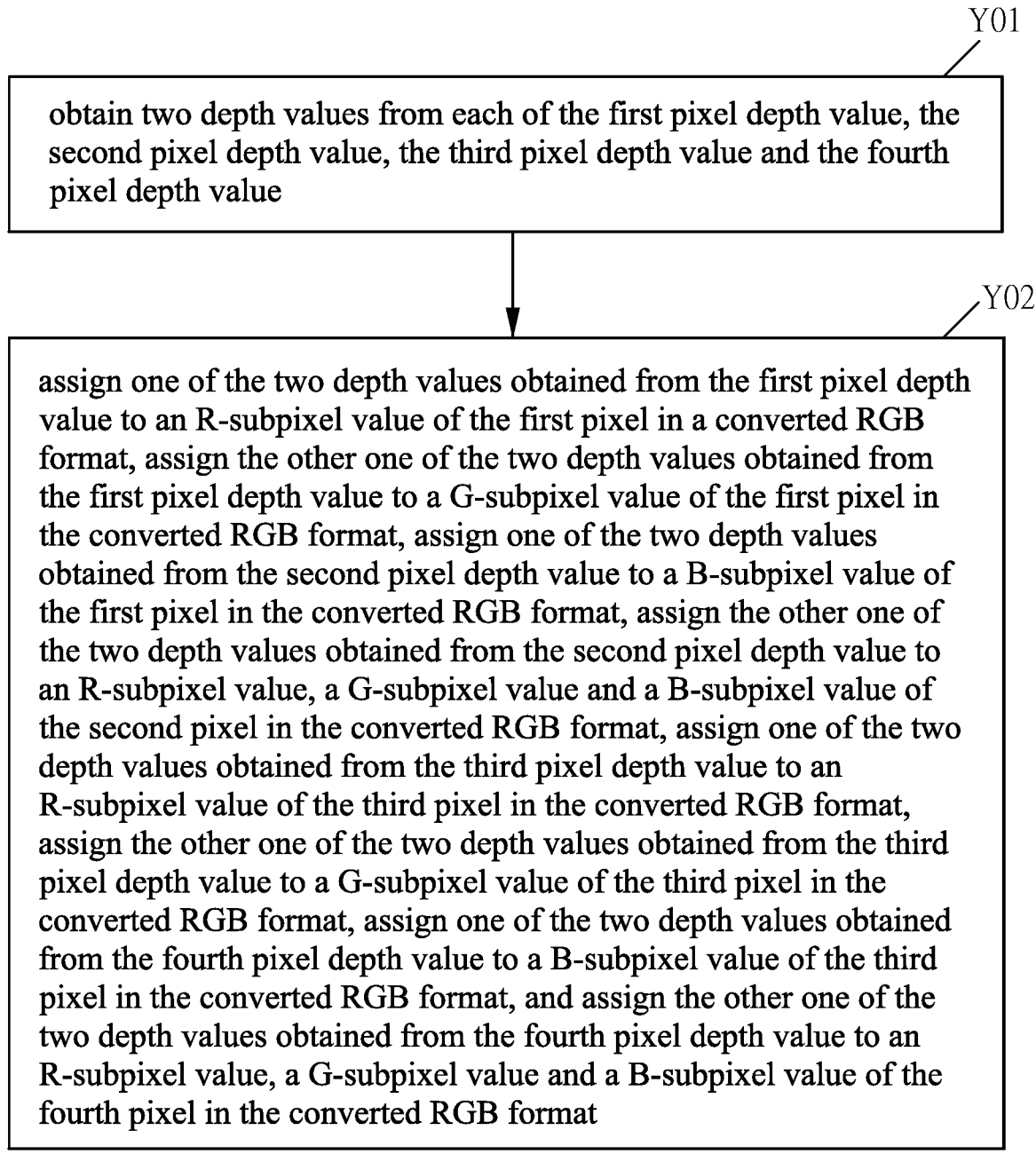
FIG. 9A is a flow chart showing a method of assigning selected depth values to RGB subpixels for colored depth frame packing and depacking according to another embodiment of the disclosure.

FIG. 9A is a flow chart showing a method of assigning selected depth values to RGB subpixels for colored depth frame packing and depacking according to another embodiment of the disclosure.

The four pixels of each group comprises a first pixel, a second pixel, a third pixel and a fourth pixel. The first pixel is located neighboring the second pixel and the third pixel, and the fourth pixel is located neighboring the second pixel and the third pixel. In this embodiment, each group of four pixels totally comprises twelve subpixels. In addition, the geometrical positions of the first pixel, the second pixel, the third pixel and the fourth pixel correspondingly have a first pixel depth value, a second pixel depth value, a third pixel depth value and a fourth pixel depth value, respectively. In other words, the geometrical position of the first pixel correspondingly has a first pixel depth value, the geometrical position of the second pixel correspondingly has a second pixel depth value, the geometrical position of the third pixel correspondingly has a third pixel depth value, and the geometrical position of the fourth pixel correspondingly has a fourth pixel depth value. Since each pixel has horizontally arranged subpixels, each of the first pixel depth value, the second pixel depth value, the third pixel depth value and the fourth pixel depth value at the geometrical positions corresponding to the first pixel, the second pixel, the third pixel and the fourth pixel has three depth values corresponding to the R subpixel, the G subpixel and the B subpixel.

The conversion method of FIG. 9A can be applied to the four pixels arranged in horizontal, wherein the coding and decoding system adopts YCbCr 4:2:2 format. As shown in FIG. 9A, the method of assigning selected depth values to RGB subpixels for a colored depth frame packing and depacking comprises a step Y01 and a step Y02. The step Y01 is to obtain two depth values from each of the first pixel depth value, the second pixel depth value, the third pixel depth value and the fourth pixel depth value. The step Y02 is to assign one of the two depth values obtained from the first pixel depth value to an R-subpixel value of the first pixel in a converted RGB format, to assign the other one of the two depth values obtained from the first pixel depth value to a G-subpixel value of the first pixel in the converted RGB format, to assign one of the two depth values obtained from the second pixel depth value to a B-subpixel value of the first pixel in the converted RGB format, to assign the other one of the two depth values obtained from the second pixel depth value to an R-subpixel value, a G-subpixel value and a B-subpixel value of the second pixel in the converted RGB format, to assign one of the two depth values obtained from the third pixel depth value to an R-subpixel value of the third pixel in the converted RGB format, to assign the other one of the two depth values obtained from the third pixel depth value to a G-subpixel value of the third pixel in the converted RGB format, to assign one of the two depth values obtained from the fourth pixel depth value to a B-subpixel value of the third pixel in the converted RGB format, and to assign the other one of the two depth values obtained from the fourth pixel depth value to an R-subpixel value, a G-subpixel value and a B-subpixel value of the fourth pixel in the converted RGB format.

In the step Y01 of obtaining the depth values, the depth values of the geometrical positions corresponding to the R subpixel and the G subpixel of the first pixel are obtained from the first pixel depth value, the depth values of the geometrical positions corresponding to the R subpixel and the B subpixel of the second pixel are obtained from the second pixel depth value, the depth values of the geometrical positions corresponding to the R subpixel and the G subpixel of the third pixel is obtained from the third pixel depth value, and the depth values of the geometrical positions corresponding to the R subpixel and the B subpixel of the fourth pixel are obtained from the fourth pixel depth value. In the step Y02 of assigning to the converted RGB format, the depth value obtained from the first pixel depth value corresponding to the geometrical position of the R subpixel of the first pixel is assigned to the R-subpixel value of the first pixel in the converted RGB format, the depth value obtained from the first pixel depth value corresponding to the geometrical position of the G subpixel of the first pixel is assigned to the G-subpixel value of the first pixel in the converted RGB format, the depth value obtained from the second pixel depth value corresponding to the geometrical position of the R subpixel of the second pixel is assigned to the B-subpixel value of the first pixel in the converted RGB format, the depth value obtained from the second pixel depth value corresponding to the geometrical position of the B subpixel of the second pixel is assigned to the R-subpixel value, the G-subpixel value and the B-subpixel value of the second pixel in the converted RGB format, the depth value obtained from the third pixel depth value corresponding to the geometrical position of the R subpixel of the third pixel is assigned to the R-subpixel value of the third pixel in the converted RGB format, the depth value obtained from the third pixel depth value corresponding to the geometrical position of the G subpixel of the third pixel is assigned to the G-subpixel value of the third pixel in the converted RGB format, the depth value obtained from the fourth pixel depth value corresponding to the geometrical position of the R subpixel of the fourth pixel is assigned to the B-subpixel value of the third pixel in the converted RGB format, and the depth value obtained from the fourth pixel depth value corresponding to the geometrical position of the B subpixel of the fourth pixel is assigned to the R-subpixel value, the G-subpixel value and the B-subpixel value of the fourth pixel in the converted RGB format.

In addition, with reference to FIG. 3B, the obtaining unit 11 of the circuit 1a is configured for obtaining two depth values from each of the first pixel depth value, the second pixel depth value, the third pixel depth value and the fourth pixel depth value. The depositing unit 12 is configured for assigning one of the two depth values obtained from the first pixel depth value to an R-subpixel value of the first pixel in a converted RGB format, assigning the other one of the two depth values obtained from the first pixel depth value to a G-subpixel value of the first pixel in the converted RGB format, assigning one of the two depth values obtained from the second pixel depth value to a B-subpixel value of the first pixel in the converted RGB format, assigning the other one of the two depth values obtained from the second pixel depth value to an R-subpixel value, a G-subpixel value and a B-subpixel value of the second pixel in the converted RGB format, assigning one of the two depth values obtained from the third pixel depth value to an R-subpixel value of the third pixel in the converted RGB format, assigning the other one of the two depth values obtained from the third pixel depth value to a G-subpixel value of the third pixel in the converted RGB format, assigning one of the two depth values obtained from the fourth pixel depth value to a B-subpixel value of the third pixel in the converted RGB format, and assigning the other one of the two depth values obtained from the fourth pixel depth value to an R-subpixel value, a G-subpixel value and a B-subpixel value of the fourth pixel in the converted RGB format.

Figure 9B:
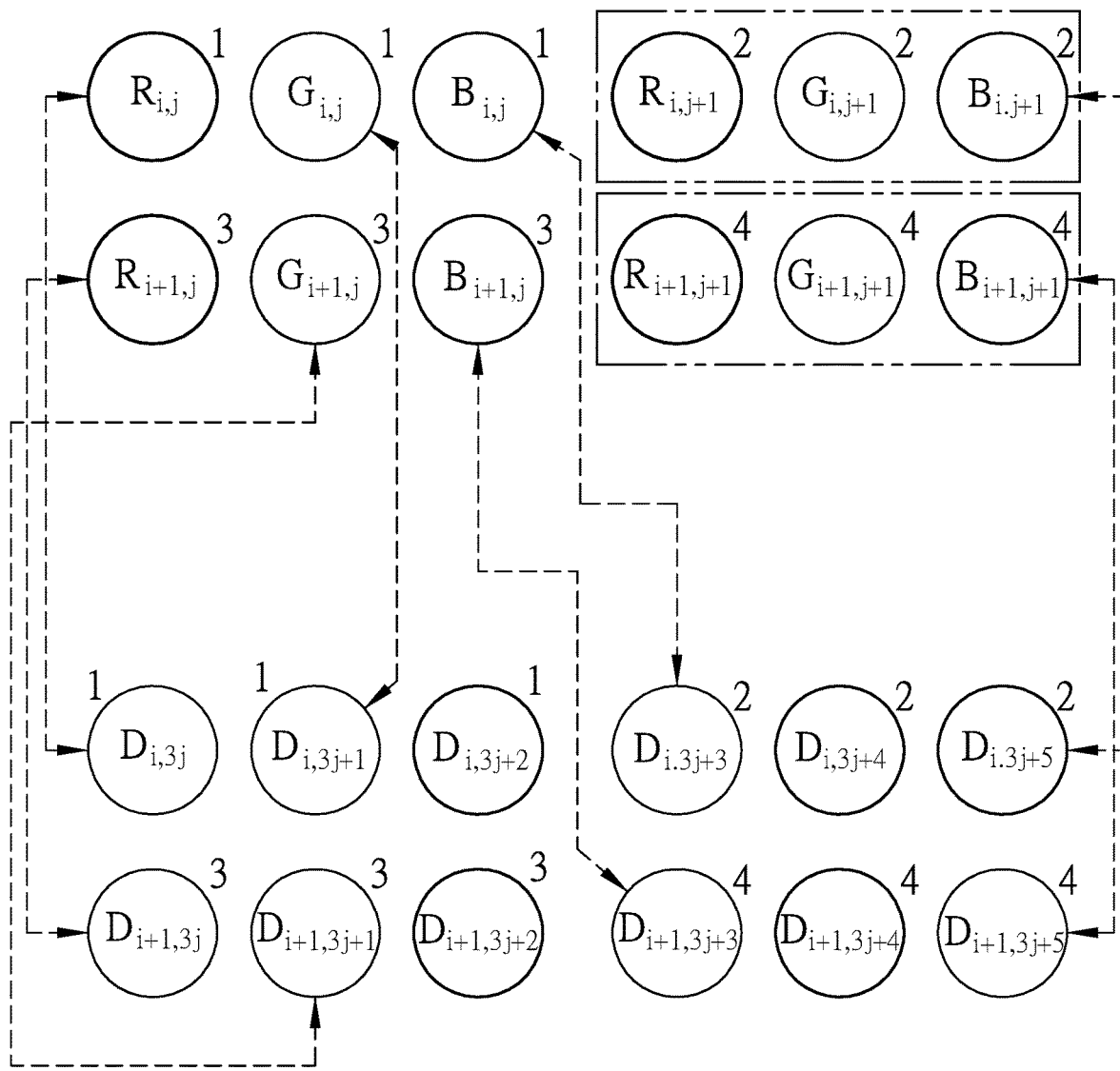
FIG. 9B is a schematic diagram showing the RGB format of a group of four pixels and the corresponding depth values of the geometrical positions thereof according to another embodiment of the disclosure.

FIG. 9B is a schematic diagram showing the RGB format of a group of four pixels and the corresponding depth values of the geometrical positions thereof according to another embodiment of the disclosure. In this embodiment, FIG. 9B shows four pixels arranged in horizontal and four pixel depth values.

In one group of four pixels of the depth frame, the R, G and B subpixels of each pixel are arranged in horizontal as shown in FIG. 9B, wherein the first pixel comprises $\{R_{i,j}, G_{i,j}, B_{i,j}\}$, the second pixel comprises $\{R_{i,j+1}, G_{i,j+1}, B_{i,j+1}\}$, the third pixel comprises $\{R_{i+1,j}, G_{i+1,j}, B_{i+1,j}\}$, and the fourth pixel comprises $\{R_{i+1,j+1}, G_{i+1,j+1}, B_{i+1,j+1}\}$. The geometrical positions of the first pixel, the second pixel, the third pixel and the fourth pixel correspondingly have a first pixel depth value, a second pixel depth value, a third pixel depth value and a fourth pixel depth value, respectively. Since each pixel comprises three subpixels, each pixel depth value corresponding to the geometrical position also comprises three depth values. In the horizontal arrangement (FIG. 9B), the first pixel depth value is $\{D_{i,3j}, D_{i,3j+1}, D_{i,3j+2}\}$, the second pixel depth value is $\{D_{i,3j+3}, D_{i,3j+4}, D_{i,3j+5}\}$, the third pixel depth value is $\{D_{i+1,3j}, D_{i+1,3j+1}, D_{i+1,3j+2}\}$, and the fourth pixel depth value is $\{D_{i+1,3j+3}, D_{i+1,3j+4}, D_{i+1,3j+5}\}$. Accordingly, the size thereof becomes H×3W. Herein, i=0, 2, 4 ..., (H−2), and j=0, 2, 4 ..., (W−2).

Specifically, when the coding and decoding system adopts the YCbCr 4:2:2 format, in the four pixels of the embodiment as shown in FIG. 9B, the obtaining unit 11 obtains the depth values of the geometrical position corresponding to the R subpixel and the G subpixel of the first pixel from the first pixel depth value, the depth values of the geometrical positions corresponding to the R subpixel and the B subpixel of the second pixel from the second pixel depth value, the depth values of the geometrical positions corresponding to the R subpixel and the G subpixel of the third pixel from the third pixel depth value, and the depth values of the geometrical position corresponding to the R subpixel and the B subpixel of the fourth pixel from the fourth pixel depth value. In other words, eight depth values $D_{i,3j}$, $D_{i,3j+1}$, $D_{i,3j+3}$, $D_{i,3j+5}$, $D_{i+1,3j}$, $D_{i+1,3j+1}$, $D_{i+1,3j+3}$ and $D_{i+1,3j+5}$ are obtained from the horizontally arranged pixel depth values. In this case, only eight depth values are selected from the horizontally arranged pixel depth values, and then used in the following packing and depacking processes.

Next, the depositing unit 12 is configured for assigning the depth value obtained from the first pixel depth value corresponding to the geometrical position of the R subpixel of the first pixel to the R-subpixel value of the first pixel in the converted RGB format, assigning the depth value obtained from the first pixel depth value corresponding to the geometrical position of the G subpixel of the first pixel to the G-subpixel value of the first pixel in the converted RGB format, assigning the depth value obtained from the second pixel depth value corresponding to the geometrical position of the R subpixel of the second pixel to the B-subpixel value of the first pixel in the converted RGB format, assigning the depth value obtained from the second pixel depth value corresponding to the geometrical position of the B subpixel of the second pixel to the R-subpixel value, the G-subpixel value and the B-subpixel value of the second pixel in the converted RGB format, assigning the depth value obtained from the third pixel depth value corresponding to the geometrical position of the R subpixel of the third pixel to the R-subpixel value of the third pixel in the converted RGB format, assigning the depth value obtained from the third pixel depth value corresponding to the geometrical position of the G subpixel of the third pixel to the G-subpixel value of the third pixel in the converted RGB format, assigning the depth value obtained from the fourth pixel depth value corresponding to the geometrical position of the R subpixel of the fourth pixel to the B-subpixel value of the third pixel in the converted RGB format, and assigning the depth value obtained from the fourth pixel depth value corresponding to the geometrical position of the B subpixel of the fourth pixel to the R-subpixel value, the G-subpixel value and the B-subpixel value of the fourth pixel in the converted RGB format. Specifically, in the packing step for the case of FIG. 9B (horizontal arrangement), the eight selected depth values are assigned (deposited) to the twelve RGB subpixels as follow:

$$R_{i,j}=D_{i,3j}, \tag{57}$$

$$G_{i,j}=D_{i,3j+1}, \tag{58}$$

$$B_{i,j}=D_{i,3j+3}, \tag{59}$$

$$R_{i+1,j}=D_{i+1,3j}, \tag{60}$$

$$G_{i+1,j}=D_{i+1,3j+1}, \tag{61}$$

$$B_{i+1,j}=D_{i+1,3j+3}, \tag{62}$$

$$R_{i,j+1}=G_{i,j+1}=B_{i,j+1}=D_{i,3j+5}, \tag{63}$$

$$R_{i+1,j+1}=G_{i+1,j+1}=B_{i+1,j+1}=D_{i+1,3j+5} \tag{64}$$

Accordingly, the twelve subpixel values in the assigned (converted) RGB format can be obtained according to the selected eight depth values.

Referring to FIG. 9B in view of FIGS. 5A and 5B, since the above equations (57)~(64) are to assign the same depth value to the RGB subpixel values of the second pixel and the fourth pixel, all Chroma parameter values (Cb, Cr) of these two groups will be equal to 128 after processed by the conversion matrix of RGB to YCbCr Chroma space conversion (Table 1). Accordingly, the four RGB format pixels having the selected depth values can be converted to obtain four YCbCr format data of $\{Y_{i,j}, Cb_{i,j}, Cr_{i,j}\}$, $\{Y_{i,j+1}, 128, 128\}$, $\{Y_{i+1,j}, Cb_{i+1,j}, Cr_{i+1,j}\}$ and $\{Y_{i+1,j+1}, 128, 128\}$. Normally, as shown in FIG. 5A, with ignoring the coding error, the four YCbCr format data of $\{Y_{i,j}, Cb_{i,j}, Cr_{i,j}\}$, $\{Y_{i,j+1}, 128, 128\}$, $\{Y_{i+1,j}, Cb_{i+1,j}, Cr_{i+1,j}\}$ and $\{Y_{i+1,j+1}, 128, 128\}$ can be processed by the image coding system to obtain four encoded data of $\{Y_{i,j}, Cb'_{i,j}, Cr'_{i,j}\}$, $\{Y_{i,j+1}, Cb'_{i,j}, Cr'_{i,j}\}$, $\{Y_{i+1,j}, Cb'_{i,j}, Cr'_{i,j}\}$ and $\{Y_{i+1,j+1}, Cb'_{i,j}, Cr'_{i,j}\}$. During the coding process, the image system provides two sampling modes including a direct subsampling mode and an average subsampling mode. In the direct subsampling mode, $Cb'_{i,j}=Cb_{i,j}$, $Cb'_{i+1,j}=Cb_{i+1,j}$, $Cr'_{i,j}=Cr_{i,j}$, and $Cr'_{i+1,j}=Cr_{i+1,j}$; in the average subsampling mode, $Cb'_{i,j}=Cb_{i,j}/2+64$, $Cb'_{i+1,j}=Cb_{i+1,j}/2+64$, $Cr'_{i,j}=Cr_{i,j}/2+64$, and $Cb'_{i+1,j}=Cb_{i+1,j}/2+64$.

After the receiving end receives these data followed by the decompression process, four data of $\{Y_{i,j}, Cb'_{i,j}, Cr'_{i,j}\}$, $\{Y_{i,j+1}, Cb'_{i,j}, Cr'_{i,j}\}$, $\{Y_{i+1,j}, Cb'_{i,j}, Cr'_{i,j}\}$ and $\{Y_{i+1,j+1}, Cb'_{i,j}, Cr'_{i,j}\}$ can be obtained (see FIG. 5A). Then, the Chroma parameters are adjusted to recover and obtain the four original YCbCr format data. If the coding system adopts the direct subsampling mode, the Chroma parameter adjustment in the depacking process can utilize the equations of $Cb_{i,j}=Cb'_{i,j}$, $Cb_{i+1,j}=Cb'_{i+1,j}$, $Cr_{i,j}=Cr'_{i,j}$, and $Cr_{i+1,j}=Cr'_{i+1,j}$ for obtaining the four original YCbCr format data of $\{Y_{i,j}, Cb_{i,j}, Cr_{i,j}\}$, $\{Y_{i,j+1}, 128, 128\}$, $\{Y_{i+1,j}, Cb_{i+1,j}, Cr_{i+1,j}\}$ and $\{Y_{i+1,j+1}, 128, 128\}$. If the coding system adopts the average subsampling mode, the Chroma parameter adjustment in the depacking process can utilize the equations of $Cb_{i,j}=2Cb'_{i,j}-128$, $Cb_{i+1,j}=2Cb'_{i+1,j}-128$, $Cr_{i,j}=2Cr'_{i,j}-128$, and $Cb_{i+1,j}=2Cb'_{i+1,j}-128$ for obtaining the four original YCbCr format data. To be noted, the decoding system of the receiving end of FIG. 5A should be acknowledged of the selected sampling mode in the coding process (the direct subsampling mode or the average subsampling mode). Afterwards, the inverse conversion matrix of YCbCr to RGB Chroma space conversion (Table 2) is applied to the obtained four original YCbCr format data for recovering the original four groups of RGB format subpixels (totally 12 subpixels) of $\{R_{i,j}, G_{i,j}, B_{i,j}\}$, $\{R_{i+1,j}, G_{i+1,j}, B_{i+1,j}\}$, $\{R_{i,j+1}, G_{i,j+1}, B_{i,j+1}\}$ and $\{R_{i+1,j+1}, G_{i+1,j+1}, B_{i+1,j+1}\}$. To be noted, the recovered twelve subpixel values can satisfy the above equations (57)~(64) and comprise the above-mentioned eight selected depth values ($D_{i,3j}$, $D_{i,3j+1}$, $D_{i,3j+3}$, $D_{i,3j+5}$, $D_{i+1,3j}$, $D_{i+1,3j+1}$, $D_{i+1,3j+3}$ and $D_{i+1,3j+5}$ in the horizontal arrangement).

Normally, as shown in FIG. 5B, with ignoring the coding error, the four YCbCr format data of $\{Y_{i,j}, Cb_{i,j}, Cr_{i,j}\}$, $\{Y_{i,j+1}, 128, 128\}$, $\{Y_{i+1,j}, Cb_{i+1,j}, Cr_{i+1,j}\}$ and $\{Y_{i+1,j+1}, 128, 128\}$ can be processed by the image coding system to obtain four encoded data of $\{Y_{i,j}, Cb'_{i,j}, Cr'_{i,j}\}$, $\{Y_{i,j+1}, Cb'_{i,j}, Cr'_{i,j}\}$, $\{Y_{i+1,j}, Cb'_{i,j}, Cr'_{i,j}\}$ and $\{Y_{i+1,j+1}, Cb'_{i,j}, Cr'_{i,j}\}$. During the coding process, the image system provides two sampling modes including a direct subsampling mode and an average subsampling mode. In the direct subsampling mode, $Cb'_{i,j}=Cb_{i,j}$, $Cb'_{i+1,j}=Cb_{i+1,j}$, $Cr'_{i,j}=Cr_{i,j}$, and $Cr'_{i+1,j}=Cr_{i+1,j}$; in the average subsampling mode, $Cb'_{i,j}=Cb_{i,j}/2+64$, $Cb'_{i+1,j}=Cb_{i+1,j}/2+64$, $Cr'_{i,j}=Cr_{i,j}/2+64$, and $Cb'_{i+1,j}=Cb_{i+1,j}/2+64$. After the Chroma space conversion (from YCbCr to RGB), four groups of R'G'B' format data can be obtained (see FIG. 5B).

Accordingly, the receiving end cannot directly obtain the above four data of $\{Y_{i,j}, Cb'_{i,j}, Cr'_{i,j}\}$, $\{Y_{i,j+1}, Cb'_{i,j}, Cr'_{i,j}\}$, $\{Y_{i+1,j}, Cb'_{i,j}, Cr'_{i,j}\}$ and $\{Y_{i+1,j+1}, Cb'_{i,j}, Cr'_{i,j}\}$ during the decomprssion procedure, but can obtain the converted four groups of R'G'B' format data only. Thus, an additional Chroma space conversion for converting the R'G'B' format data to the YCb'Cr' format data is performed in advance for obtaining $\{Y_{i,j}, Cb'_{i,j}, Cr'_{i,j}\}$, $\{Y_{i,j+1}, Cb'_{i,j}, Cr'_{i,j}\}$, $\{Y_{i+1,j}, Cb'_{i,j}, Cr'_{i,j}\}$ and $\{Y_{i+1,j+1}, Cb'_{i,j}, Cr'_{i,j}\}$. Then, the Chroma parameters are adjusted to recover and obtain the four original YCbCr format data. If the coding system adopts the direct subsampling mode, the Chroma parameter adjustment in the depacking process can utilize the equations of $Cb_{i,j}=Cb'_{i,j}$, $Cb_{i+1,j}=Cb'_{i+1,j}$, $Cr_{i,j}=Cr'_{i,j}$, and $Cr_{i+1,j}=Cr'_{i+1,j}$ for obtaining the four original YCbCr format data of $\{Y_{i,j}, Cb_{i,j}, Cr_{i,j}\}$, $\{Y_{i,j+1}, 128, 128\}$, $\{Y_{i+1,j}, 128, 128\}$ and $\{Y_{i+1,j+1}, 128, 128\}$. If the coding system adopts the average subsampling mode, the Chroma parameter adjustment in the depacking process can utilize the equations of $Cb_{i,j}=2Cb'_{i,j}-128$, $Cb_{i+1,j}=2Cb'_{i+1,j}-128$, $Cr_{i,j}=2Cr'_{i,j}-128$, and $Cb_{i+1,j}=2Cb'_{i+1,j}-128$ for obtaining the four original YCbCr format data. To be noted, the decoding system of the receiving end of FIG. 5B should be acknowledged of the selected sampling mode in the coding process (the direct subsampling mode or the average subsampling mode). Afterwards, the inverse conversion matrix of YCbCr to RGB Chroma space conversion is applied to the obtained four original YCbCr format data for recovering the original four groups of RGB format subpixels (totally 12 subpixels) of $\{R_{i,j}, G_{i,j}, B_{i,j}\}$, $\{R_{i+1,j}, G_{i+1,j}, B_{i+1,j}, R_{i,j+1}, G_{i,j+1}, B_{i,j+1}\}$ and $\{R_{i+1,j+1}, G_{i+1,j+1}, B_{i+1,j+1}\}$. To be noted, the recovered twelve subpixel values can satisfy the above equations (57)~(64) and comprise the above-mentioned eight selected depth values ($D_{i,3j}$, $D_{i,3j+1}$, $D_{i,3j+3}$, $D_{i,3j+5}$, $D_{i+1,3j}$, $D_{i+1,3j+1}$, $D_{i+1,3j+3}$ and $D_{i+1,3j+5}$ in the horizontal arrangement).

Accordingly, the eight selected depth values can be directly obtained without adjustment by the method of recovering the selected depth values from the RGB subpixels for colored depth frame packing and depacking of this disclosure. The detailed content of the method of recovering the selected depth values from the RGB subpixels will be described hereinafter with reference to FIG. 9B in view of FIGS. 9C and 6B.

FIG. 9C is a flow chart showing a method of recovering the selected depth values from the RGB subpixels for colored depth frame packing and depacking according to another embodiment of the disclosure. The recovering method of FIG. 9C can be applied to the four pixels arranged in horizontal, wherein the coding and decoding system adopts YCbCr 4:2:2 format. The recovering (inverse conversion) method of FIG. 9C is corresponding to the assigning (conversion) method of FIG. 9A.

As mentioned above, after the processes of the video compression and decompression system and the Chroma space conversion and inverse conversion as shown in FIGS. 5A and 5B, the twelve original RGB format subpixels of $\{R_{i,j}, G_{i,j}, B_{i,j}\}$, $\{R_{i+1,j}, G_{i+1,j}, B_{i+1,j}\}$, $\{R_{i,j+1}, G_{i,j+1}, B_{i,j+1}\}$ and $\{R_{i+1,j+1}, G_{i+1,j+1}, B_{i+1,j+1}\}$ can be obtained. The twelve subpixel values can satisfy the above equations (57)~(64) and comprise the above-mentioned eight selected depth values ($D_{i,3j}$, $D_{i,3j+1}$, $D_{i,3+3}$, $D_{i,3j+5}$, $D_{i+1,3j}$, $D_{i+1,3j+1}$, $D_{i+1,3j+3}$ and $D_{i+1,3j+5}$ in the horizontal arrangement). Accordingly, the method of recovering the selected depth values from the RGB subpixels of this disclosure can recover the obtained RGB format data to obtain eight selected depth values.

As shown in FIG. 9C, the method of recovering the selected depth values from the RGB subpixels for colored depth frame packing and depacking comprises a step Z01 and a step Z02. The step Z01 is to obtain the R-subpixel value, the G-subpixel value and the B-subpixel value of the first pixel of the group of four pixels in the RGB format, to obtain the B-subpixel value of the second pixel of the group of four pixels in the RGB format, to obtain the R-subpixel value, the G-subpixel value and the B-subpixel value of the third pixel of the group of four pixels in the RGB format, and to obtain the B-subpixel value of the fourth pixel of the group of four pixels in the RGB format. The step Z02 is to assign the R-subpixel value of the first pixel to a geometrical position in the first pixel depth value corresponding to the R-subpixel value of the first pixel, to assign the G-subpixel value of the first pixel to a geometrical position in the first pixel depth value corresponding to the G-subpixel value of the first pixel, to assign the B-subpixel value of the first pixel to a geometrical position in the second pixel depth value corresponding to the R-subpixel value of the second pixel, to assign the B-subpixel value of the second pixel to a geometrical position in the second pixel depth value corresponding to the B-subpixel value of the second pixel, to assign the R-subpixel value of the third pixel to a geometrical position in the third pixel depth value corresponding to the R-subpixel value of the third pixel, to assign the G-subpixel value of the third pixel to a geometrical position in the third pixel depth value corresponding to the G-subpixel value of the third pixel, to assign the B-subpixel value of the third pixel to a geometrical position in the fourth pixel depth value corresponding to the R-subpixel value of the fourth pixel, and to assign the B-subpixel value of the fourth pixel to a geometrical position in the fourth pixel depth value corresponding to the B-subpixel value of the fourth pixel.

Specifically, when the coding and decoding system adopts the YCbCr 4:2:2 format, in the four pixels of the embodiment as shown in FIG. 6B, the obtaining unit 21 of the circuit 2a is configured for obtaining the R-subpixel value, the G-subpixel value and the B-subpixel value of the first pixel of the group of four pixels in the RGB format, obtaining the B-subpixel value of the second pixel of the group of four pixels in the RGB format, obtaining the R-subpixel value, the G-subpixel value and the B-subpixel value of the third pixel of the group of four pixels in the RGB format, and obtaining the B-subpixel value of the fourth pixel of the group of four pixels in the RGB format. The depositing unit 22 is configured for assigning the R-subpixel value of the first pixel to a geometrical position in the first pixel depth value corresponding to the R-subpixel value of the first pixel, assigning the G-subpixel value of the first pixel to a geometrical position in the first pixel depth value corresponding to the G-subpixel value of the first pixel, assigning the B-subpixel value of the first pixel to a geometrical position in the second pixel depth value corresponding to the R-subpixel value of the second pixel, assigning the B-subpixel value of the second pixel to a geometrical position in the second pixel depth value corresponding to the B-subpixel value of the second pixel, assigning the R-subpixel value of the third pixel to a geometrical position in the third pixel depth value corresponding to the R-subpixel value of the third pixel, assigning the G-subpixel value of the third pixel to a geometrical position in the third pixel depth value corresponding to the G-subpixel value of the third pixel, assigning the B-subpixel value of the third pixel to a geometrical position in the fourth pixel depth value corresponding to the R-subpixel value of the fourth pixel, and assigning the B-subpixel value of the fourth pixel to a geometrical position in the fourth pixel depth value corresponding to the B-subpixel value of the fourth pixel.

The recovering method will be described hereinafter with reference to FIG. 9B. Specifically, in the depacking step for the case of FIG. 9B (horizontal arrangement), the subpixel values of the twelve RGB subpixels obtained by the Chroma space inverse conversion of the receiving end can be recovered to obtain the eight selected depth values as follow:

$$D_{i,3j}=R_{i,j}, \tag{65}$$

$$D_{i,3j+1}=G_{i,j}, \tag{66}$$

$$D_{i,3j+3}=B_{i,j}, \tag{67}$$

$$D_{i,3j+5}=B_{i,j+1}, \tag{68}$$

$$D_{i+1,3j}=R_{i+1,j}, \tag{69}$$

$$D_{i+1,3j+1}=G_{i+1,j}, \tag{70}$$

$$D_{i+1,3j+3}=B_{i+1,j}, \tag{71}$$

$$D_{i+1,3j+5}=B_{i+1,j+1} \tag{72}$$

Accordingly, the RGB format data obtained by the Chroma space inverse conversion of the receiving end can be directly recovered without any adjustment to obtain the above-mentioned eight selected depth values. The other four depth values can be obtained by interpolation method according to the eight selected depth values and the related conversion information, thereby obtaining a better conversion to recover the original depth values. Compared with the conventional art, which replaces the lacked Chroma values by the remained neighboring Chroma values, this embodiment can directly recover multiple depth values of the image data from the obtained RGB format data, thereby improving the distortion around the area having large (or dramatic) depth gap.

To be noted, the parameters listed in the matrix of Table 1 and Table 2 are for an example only, and the parameters in the matrix can be different in different video compression and transmission system. For example, the following Table 3 and Table 4 are the conversion matrix and inverse conversion matrix of RGB format to YCbCr format used in different video compression and transmission system. The user can calculate with the following Table 3 and Table 4 in view of the above embodiments to obtain the corresponding results.

TABLE 3 conversion from RGB to YUV $$\begin{bmatrix} Y_i \\ U_i \\ U_i \end{bmatrix} = \begin{bmatrix} 0.2999 & 0.587 & 0.114 \\ -0.169 & -0.331 & 0.500 \\ 0.500 & -0.419 & -0.081 \end{bmatrix} \begin{bmatrix} R_i \\ G_i \\ B_i \end{bmatrix} + \begin{bmatrix} 0 \\ 128 \\ 128 \end{bmatrix}$$

TABLE 4 inverse conversion from YUV to RGB $$\begin{bmatrix} R_i \\ G_i \\ B_i \end{bmatrix} = \begin{bmatrix} 1 & 0.00093 & 1.401687 \\ 1 & -0.3437 & -0.71417 \\ 1 & 2.0173 & 0.00099 \end{bmatrix} + \begin{bmatrix} Y_i \\ U_i - 128 \\ V_i - 128 \end{bmatrix}$$

To sum up, in the method and circuit of assigning selected depth values to RGB subpixels and recovering the selected depth values from the RGB subpixels for colored depth frame packing and depacking of this disclosure, the procedures of the conversion and inverse conversion between RGB format and YCbCr format in the conventional video compression system can be still used. Moreover, when the method and circuit of assigning selected depth values to RGB subpixels and recovering the selected depth values from the RGB subpixels applied to the packing and depacking of the conventional video compression and transmission system, multiple depth values can be directly recovered from the received RGB format without any adjustment. Compared with the conventional technology, which replaces the lacked chrominance values with the remained neighboring chrominance values, this disclosure can directly recover multiple depth values of the image data from the received RGB format, thereby improving the distortion around the area having large (or dramatic) depth gap.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A method of assigning selected depth values to RGB subpixels for a colored depth frame packing and depacking, wherein an RGB format comprises an R subpixel, a G subpixel and a B subpixel in order, a RGB depth frame comprises a group consisting of four pixels, the R subpixels, G subpixels and B subpixels of the group consisting of four pixels are vertically or horizontally arranged, the group consisting of four pixels comprises a first pixel, a second pixel, a third pixel and a fourth pixel, the first pixel is located neighboring the second pixel and the third pixel, the fourth pixel is located neighboring the second pixel and the third pixel, and geometrical positions of the first pixel, the second pixel, the third pixel and the fourth pixel correspondingly have a first pixel depth value, a second pixel depth value, a third pixel depth value and a fourth pixel depth value, respectively, the method comprising:

obtaining two depth values from each of the first pixel depth value and the fourth pixel depth value, and obtaining one depth value from each of the second pixel depth value and the third pixel depth value, wherein the six depth values obtained from the first pixel depth value, the second pixel depth value, the third pixel depth value and the fourth pixel depth value have interleaved positions; and assigning one of the two depth values obtained from the first pixel depth value to an R-subpixel value of the first pixel in a converted RGB format, assigning the other one of the two depth values obtained from the first pixel depth value to a B-subpixel value of the first pixel in the converted RGB format, assigning the depth value obtained from the second pixel depth value to an R-subpixel value, a G-subpixel value and a B-subpixel value of the second pixel in the converted RGB format, assigning the depth value obtained from the third pixel depth value to an R-subpixel value, a G-subpixel value and a B-subpixel value of the third pixel in the converted RGB format, assigning one of the two depth values obtained from the fourth pixel depth value to a G-subpixel value of the first pixel in the converted RGB format, and assigning the other one of the two depth values obtained from the fourth pixel depth value to an R-subpixel value, a G-subpixel value and a B-subpixel value of the fourth pixel in the converted RGB format;

wherein the step of obtaining the depth values is to obtain depth values of geometrical positions corresponding to the R subpixel and the B subpixel of the first pixel from the first pixel depth value, to obtain a depth value of a geometrical position corresponding go the G subpixel of the second pixel from the second pixel depth value, to obtain a depth value of a geometrical position corresponding to the G subpixel of the third pixel from the third pixel depth value, and to obtain depth values of geometrical positions corresponding to the R subpixel and the B subpixel of the fourth pixel from the fourth pixel depth value;

wherein the step of assigning to the pixels in the converted RGB format is to assign the depth value of the geometrical position corresponding to the R sub pixel of the first pixel obtained from the first pixel depth value to the R-subpixel value of the first pixel in the converted RGB format, to assign the depth value of the geometrical position corresponding to the B subpixel of the first pixel obtained from the first pixel depth value to the B-subpixel value of the first pixel in the converted RGB format, to assign the depth value of the geometrical position corresponding to the G subpixel of the second pixel obtained from the second pixel depth value to the R-subpixel value, the G-subpixel value and the B-subpixel value of the second pixel in the converted RGB format, to assign the depth value of the geometrical position corresponding to the G subpixel of the third pixel obtained from the third pixel depth value to the R-subpixel value, the G-subpixel value and the B-subpixel value of the third pixel in the converted RGB format, to assign the depth value of the geometrical position corresponding to the R subpixel of the fourth pixel obtained from the fourth pixel depth value to the G-subpixel value of the first pixel in the converted RGB format, and to assign the depth value of the geometrical position corresponding to the B subpixel of the fourth pixel obtained from the fourth pixel depth value to the R-subpixel value, the G-subpixel value and the B-subpixel value of the fourth pixel in the converted RGB format.

2. A method of assigning selected depth values to RGB subpixels for a colored depth frame packing and depacking, wherein an RGB format comprises an R subpixel, a G subpixel and a B subpixel in order, a RGB depth frame comprises a group consisting of four pixels, the R subpixels, G subpixels and B subpixels of the group consisting of four pixels are vertically or horizontally arranged, the group consisting of four pixels comprises a first pixel, a second pixel, a third pixel and a fourth pixel, the first pixel is located neighboring the second pixel and the third pixel, the fourth pixel is located neighboring the second pixel and the third pixel, and geometrical positions of the first pixel, the second pixel, the third pixel and the fourth pixel correspondingly have a first pixel depth value, a second pixel depth value, a third pixel depth value and a fourth pixel depth value, respectively, the method comprising:

obtaining two depth values from each of the first pixel depth value, the second pixel depth value, the third pixel depth value and the fourth pixel depth value; and assigning one of the two depth values obtained from the first pixel depth value to an R-subpixel value of the first pixel in a converted RGB format, assigning the other one of the two depth values obtained from the first pixel depth value to a B-subpixel value of the first pixel in the converted RGB format, assigning one of the two depth values obtained from the second pixel depth value to a G-subpixel value of the second pixel in the converted RGB format, assigning the other one of the two depth values obtained from the second pixel depth value to a B-subpixel value of the second pixel in the converted RGB format, assigning one of the two depth values obtained from the third pixel depth value to an R-subpixel value, a G-subpixel value and a B-subpixel value of the third pixel in the converted RGB format, assigning the other one of the two depth values obtained from the third pixel depth value to a G-subpixel value of the first pixel in the converted RGB format, assigning one of the two depth values obtained from the fourth pixel depth value to an R-subpixel value of the second pixel in the converted RGB format, and assigning the other one of the two depth values obtained from the fourth pixel depth value to an R-subpixel value, a G-subpixel value and a B-subpixel value of the fourth pixel in the converted RGB format;

wherein the step of obtaining the depth values is to obtain depth values of geometrical positions corresponding to the R subpixel and the B subpixel of the first pixel from the first pixel depth value, to obtain depth values of geometrical positions corresponding to the G subpixel and the B subpixel of the second pixel from the second pixel depth value, to obtain depth values of geometrical positions corresponding to the R subpixel and the G subpixel of the third pixel from the third pixel depth value, and to obtain depth values of geometrical positions corresponding to the R subpixel and the B subpixel of the fourth pixel from the fourth pixel depth value;

wherein the step of assigning to the pixels in the converted RGB format is to assign the depth value of the geometrical position corresponding to the R subpixel of the first pixel obtained from the first pixel depth value to the R-subpixel value of the first pixel in the converted RGB format, to assign the depth value of the geometrical position corresponding to the B subpixel of the first pixel obtained from the first pixel depth value to the B-subpixel value of the first pixel in the converted RGB format, to assign the depth value of the geometrical position corresponding to the G subpixel of the second pixel obtained form the second pixel depth value to the G-subpixel value of the second pixel in the converted RGB format, to assign the depth value of the geometrical position corresponding to the B subpixel of the second pixel obtained from the second pixel depth value to the B-subpixel value of the second pixel in the converted RGB format, to assign the depth value of the geometrical position corresponding to the R subpixel of the third pixel obtained from the third pixel depth value to the R-subpixel value, the G-subpixel value and the B-subpixel value of the third pixel in the converted RGB format, to assign the depth value of the geometrical position corresponding to the G subpixel of the third pixel obtained from the third pixel depth value to the G-subpixel value of the first pixel in the convened RGB format, to assign the depth value of the geometrical position corresponding to the R subpixel of the fourth pixel obtained from the fourth pixel depth value to the R-subpixel value of the second pixel in the converted RGB format, and to assign the depth value of the geometrical position corresponding to the B subpixel of the fourth pixel obtained from the fourth pixel depth value to the R-subpixel value, the G-subpixel value and the B-subpixel value of the fourth pixel in the converted RGB format.

3. A method of assigning selected depth values to RGB subpixels for a colored depth frame packing and depacking, wherein an RGB format comprises an R subpixel, a G subpixel and a B subpixel in order, a RGB depth frame comprises a group consisting of four pixels, the R subpixels, G subpixels and B subpixels of the group consisting of four pixels are vertically or horizontally arranged, the group consisting of four pixels comprises a first pixel, a second pixel, a third pixel and a fourth pixel, the first pixel is located neighboring the second pixel and the third pixel, the fourth pixel is located neighboring the second pixel and the third pixel, and geometrical positions of the first pixel, the second pixel, the third pixel and the fourth pixel correspondingly have a first pixel depth value, a second pixel depth value, a third pixel depth value and a fourth pixel depth value, respectively, the method comprising:

obtaining two depth values from each of the first pixel depth value, the second pixel depth value, the third pixel depth value and the fourth pixel depth value; and assigning one of the two depth values obtained from the first pixel depth value to an R-subpixel value of the first pixel in a converted RGB format, assigning the other one of the two depth values obtained from the first pixel depth value to a G-subpixel value of the first pixel in the converted RGB format, assigning one of the two depth values obtained from the second pixel depth value to a B-subpixel value of the first pixel in the converted RGB format, assigning the other one of the two depth values obtained from the second pixel depth value to an R-subpixel value, a G-subpixel value and a B-subpixel value of the second pixel in the converted RGB format, assigning one of the two depth values obtained from the third pixel depth value to an R-subpixel value of the third pixel in the converted RGB format, assigning the other one of the two depth values obtained from the third pixel depth value to a G-subpixel value of the third pixel in the converted RGB format, assigning one of the two depth values obtained from the fourth pixel depth value to a B-subpixel value of the third pixel in the converted RGB format, and assigning the other one of the two depth values obtained from the fourth pixel depth value to an R-subpixel value, a G-subpixel value and a B-subpixel value of the fourth pixel in the converted RGB format;

wherein the step of obtaining the depth values is to obtain depth values of geometrical positions corresponding to the R subpixel and the G subpixel of the first pixel from the first pixel depth value, to obtain depth values of geometrical positions corresponding to the R sub pixel and the B subpixel of the second pixel from the second pixel depth value, to obtain depth values of geometrical positions corresponding to the R subpixel and the G subpixel of the third pixel from the third pixel depth value, and to obtain depth values of geometrical positions corresponding to the R subpixel and the B subpixel of the fourth pixel from the fourth pixel depth value;

wherein the step of assigning to the pixels in the converted RGB format is to assign the depth value of the geometrical position corresponding to the R subpixel of the first pixel obtained from the first pixel depth value to the R-subpixel value of the first pixel in the converted RGB format, to assign the depth value of the geometrical position corresponding to the G subpixel of the first pixel obtained from the first pixel depth value to the G-subpixel value of the first pixel in the converted RGB format, to assign the depth value of the geometrical position corresponding to the R subpixel of the second pixel obtained from the second pixel depth value to the B-subpixel value of the first pixel in the converted RGB format, to assign the depth value of the geometrical position corresponding to the B subpixel of the second pixel obtained from the second pixel depth value to the R-subpixel value, the G-subpixel value and the B-subpixel value of the second pixel in the converted RGB format, to assign the depth value of the geometrical position corresponding to the R subpixel of the third pixel obtained from the third pixel depth value to the R-subpixel value of the third pixel in the converted RGB format, to assign the depth value of the geometrical position corresponding to the G subpixel of the third pixel obtained from the third pixel depth value to the G-subpixel value of the third pixel in the converted RGB format, to assign the depth value of the geometrical position corresponding to the R subpixel of the fourth pixel obtained from the fourth pixel depth value to the B-subpixel value of the third pixel in the converted RGB format, and to assign the depth value of the geometrical position corresponding to the B subpixel of the fourth pixel obtained from the fourth pixel depth value to the R-subpixel value, the G-subpixel value and the B-subpixel value of the fourth pixel in the converted RGB format.

* * * * *